April 14, 1959     L. J. GAVASSO     2,881,895
CARRIAGE CONTROL APPARATUS
Filed Jan. 29, 1958     26 Sheets-Sheet 2

INVENTOR
LOUIS J. GAVASSO
ATTORNEYS

April 14, 1959

L. J. GAVASSO 2,881,895

CARRIAGE CONTROL APPARATUS

Filed Jan. 29, 1958

INVENTOR
LOUIS J. GAVASSO
BY
ATTORNEYS

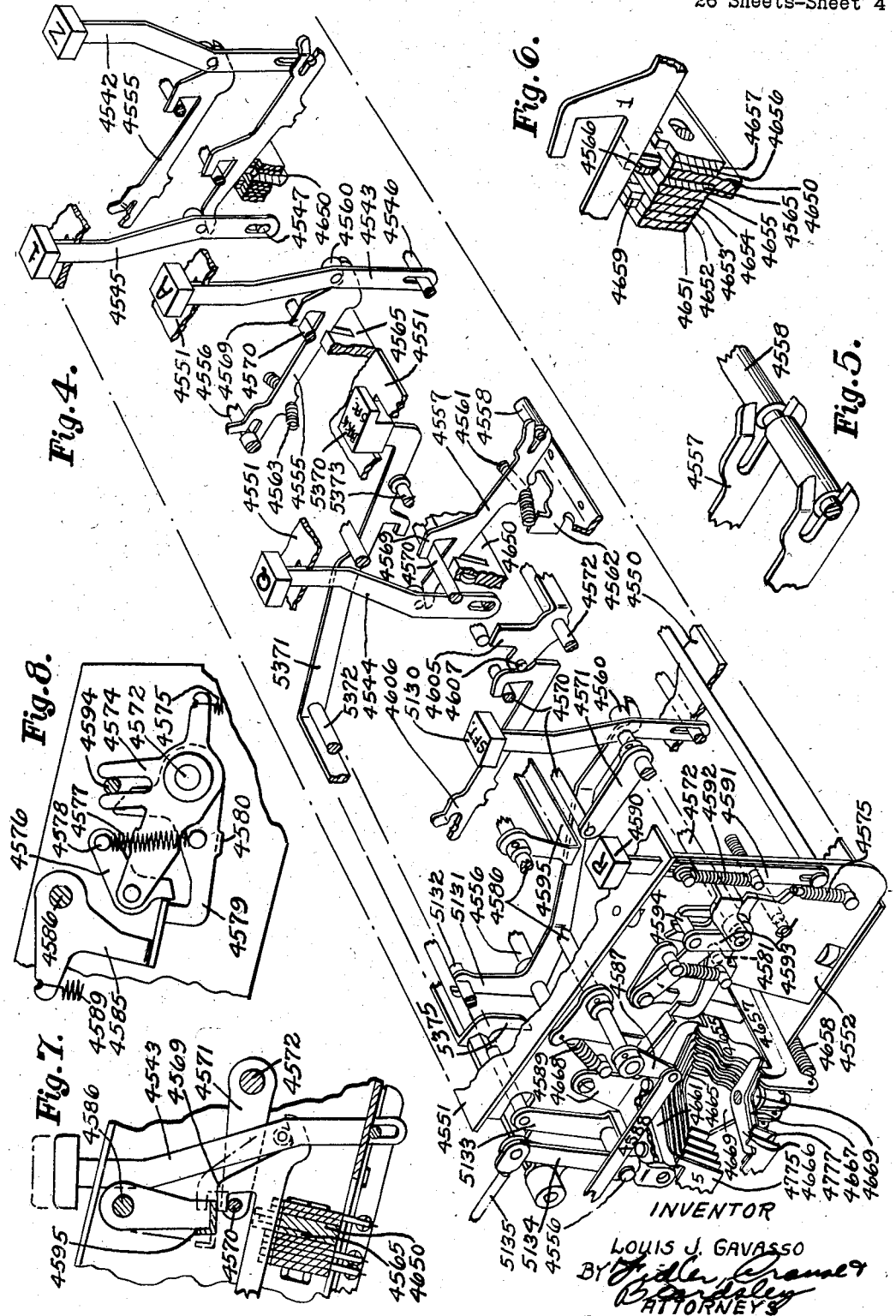

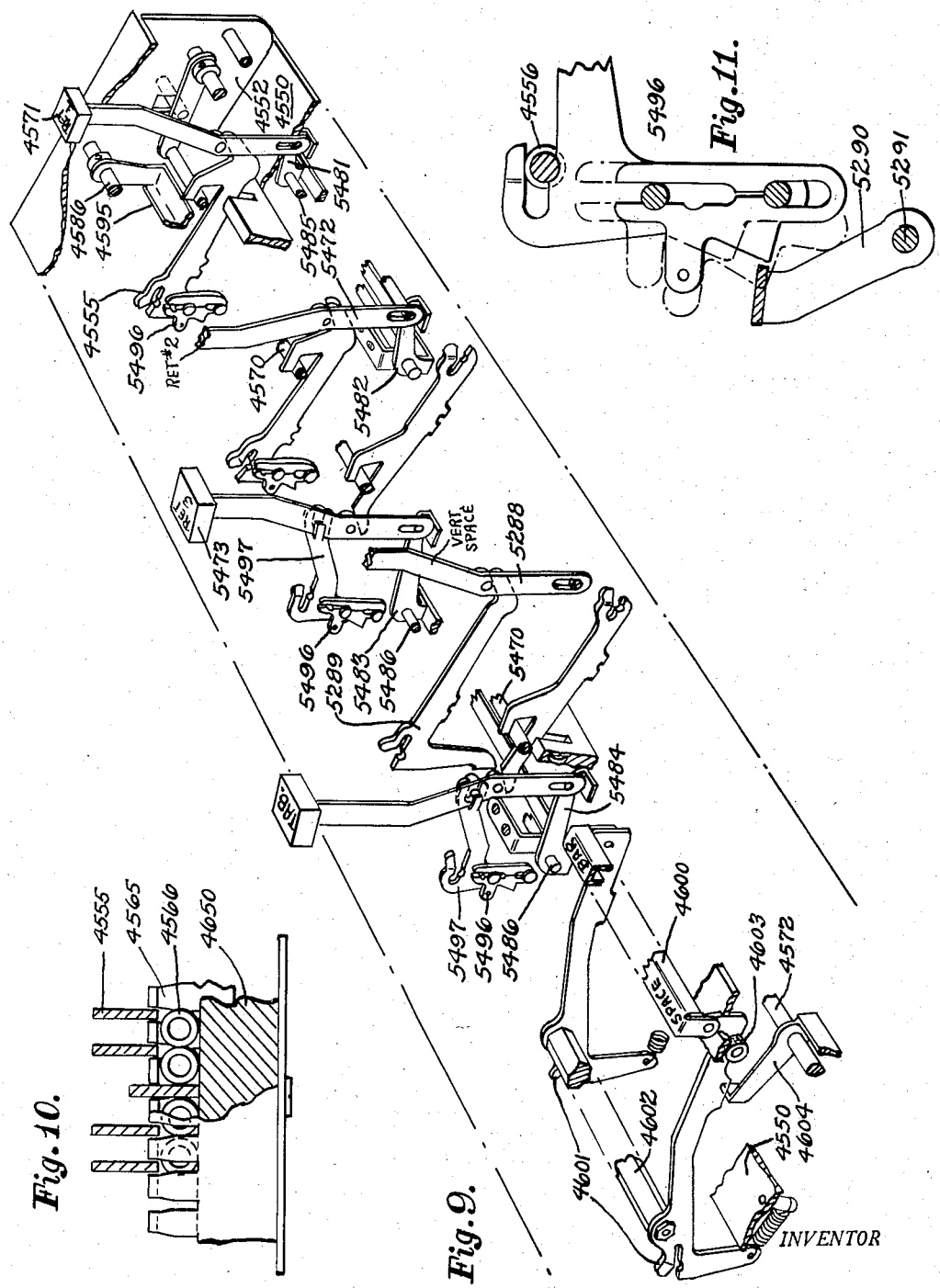

April 14, 1959

L. J. GAVASSO 2,881,895

CARRIAGE CONTROL APPARATUS

Filed Jan. 29, 1958

INVENTOR
LOUIS J. GAVASSO
BY Fidler, Crouser &
Beardsley
ATTORNEYS

April 14, 1959  L. J. GAVASSO  2,881,895
CARRIAGE CONTROL APPARATUS
Filed Jan. 29, 1958  26 Sheets-Sheet 9

INVENTOR
LOUIS J. GAVASSO
BY *Fidler, Crouse &*
*Beardsley*
ATTORNEYS

April 14, 1959  L. J. GAVASSO  2,881,895
CARRIAGE CONTROL APPARATUS
Filed Jan. 29, 1958  26 Sheets-Sheet 11

INVENTOR
LOUIS J. GAVASSO
BY Fidler, Crouse & Beardsley
ATTORNEYS

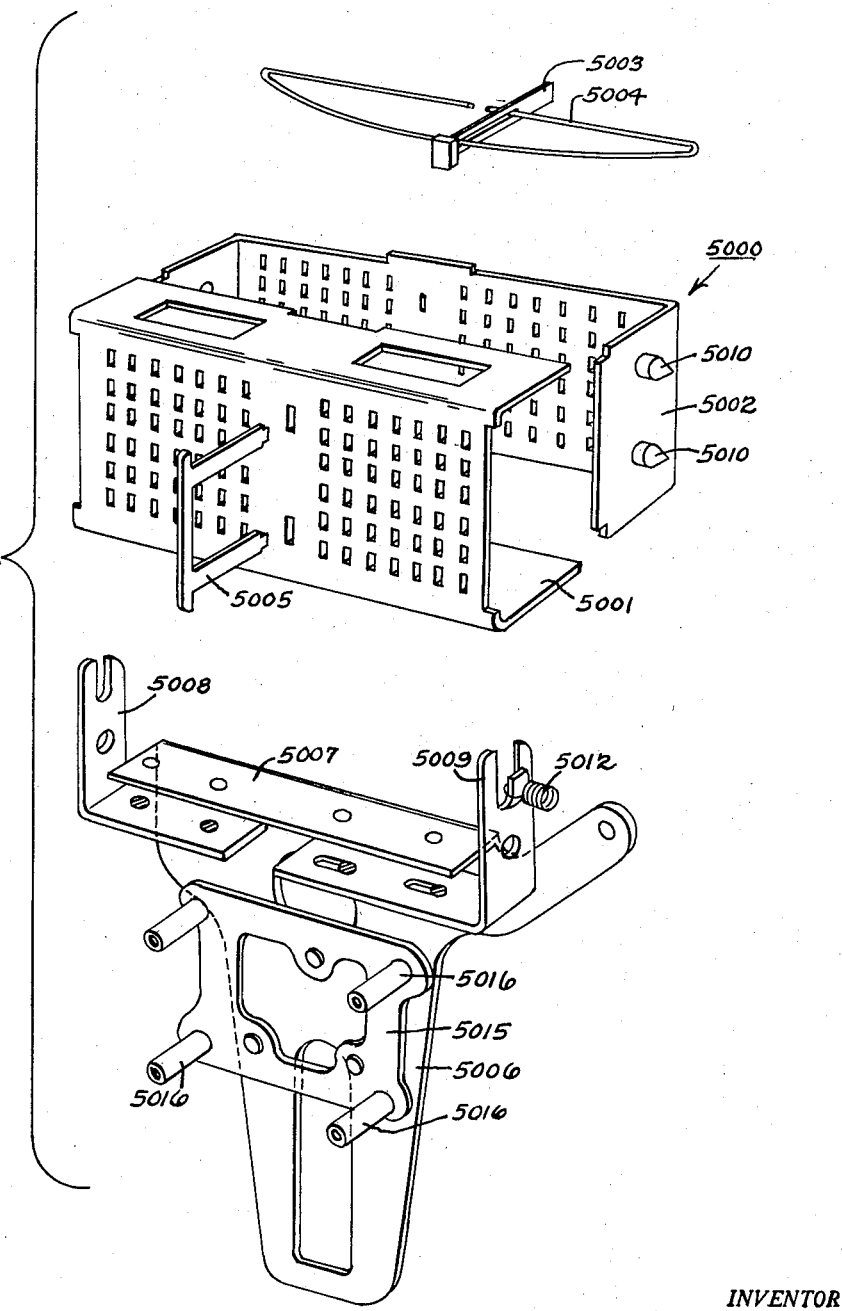

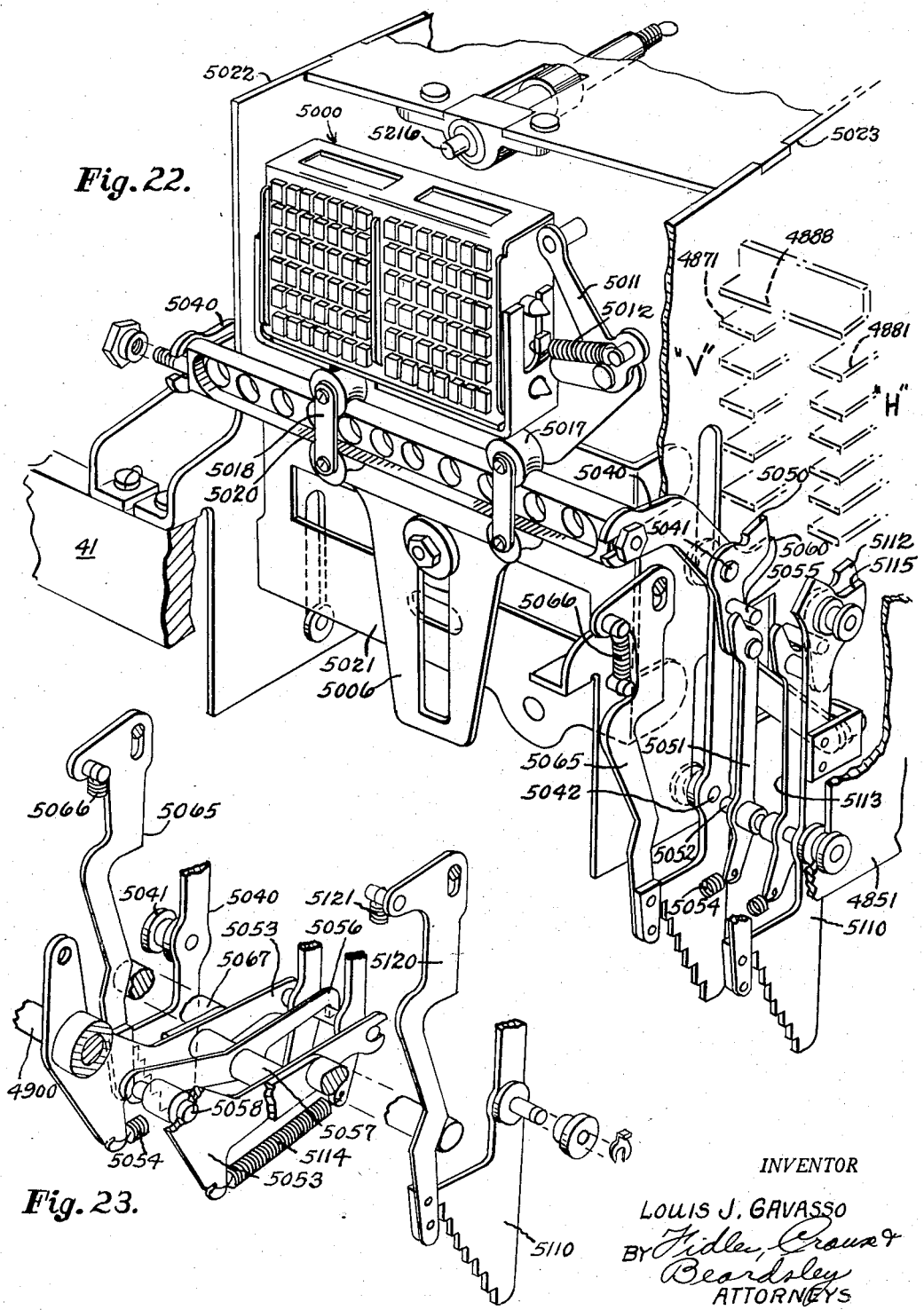

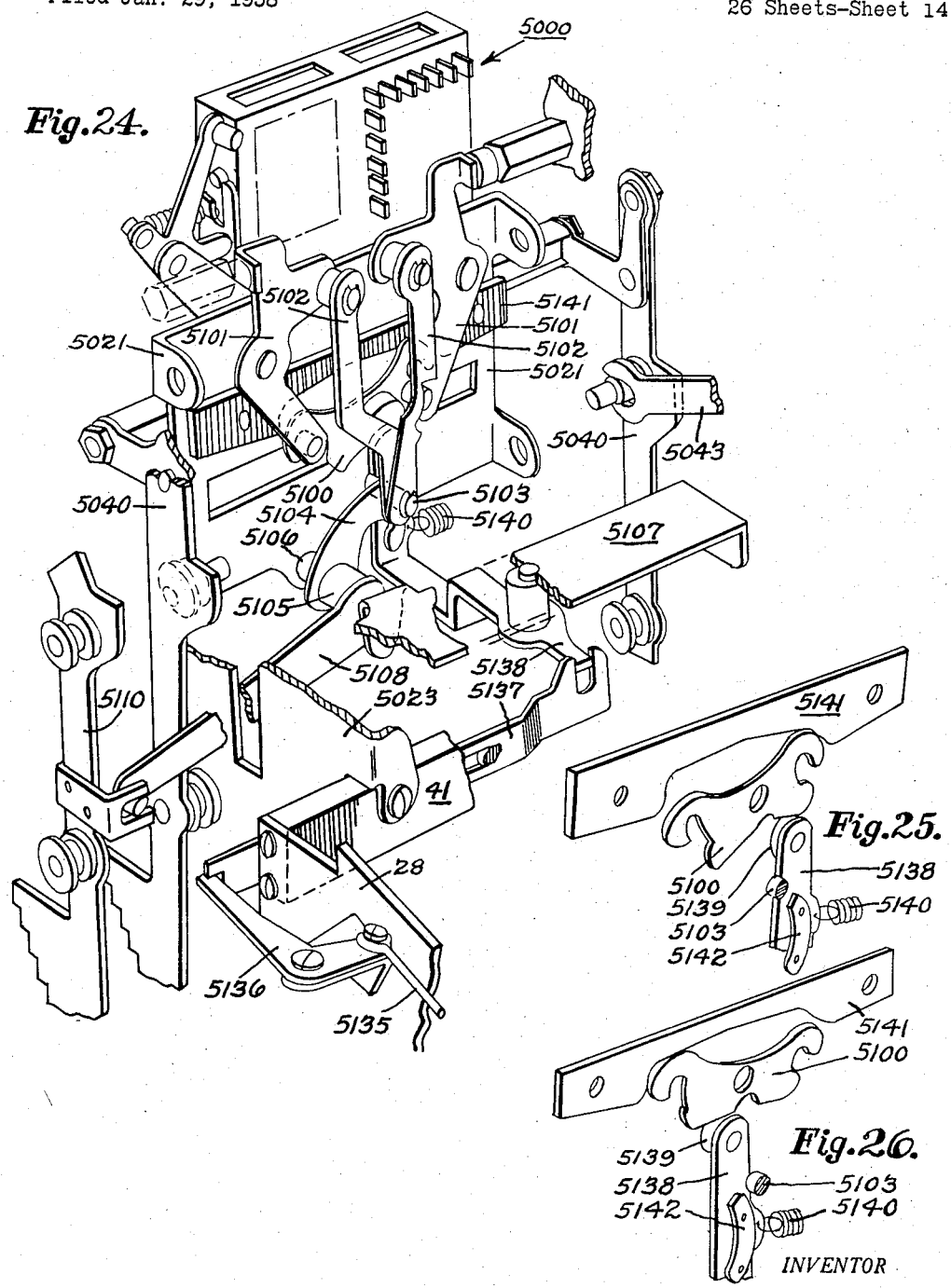

April 14, 1959 L. J. GAVASSO 2,881,895
CARRIAGE CONTROL APPARATUS
Filed Jan. 29, 1958 26 Sheets-Sheet 15

INVENTOR
LOUIS J. GAVASSO
BY
ATTORNEYS

April 14, 1959 L. J. GAVASSO 2,881,895
CARRIAGE CONTROL APPARATUS
Filed Jan. 29, 1958 26 Sheets-Sheet 16

INVENTOR
LOUIS J. GAVASSO
BY Fidler, Crouse &
Beardsley
ATTORNEYS

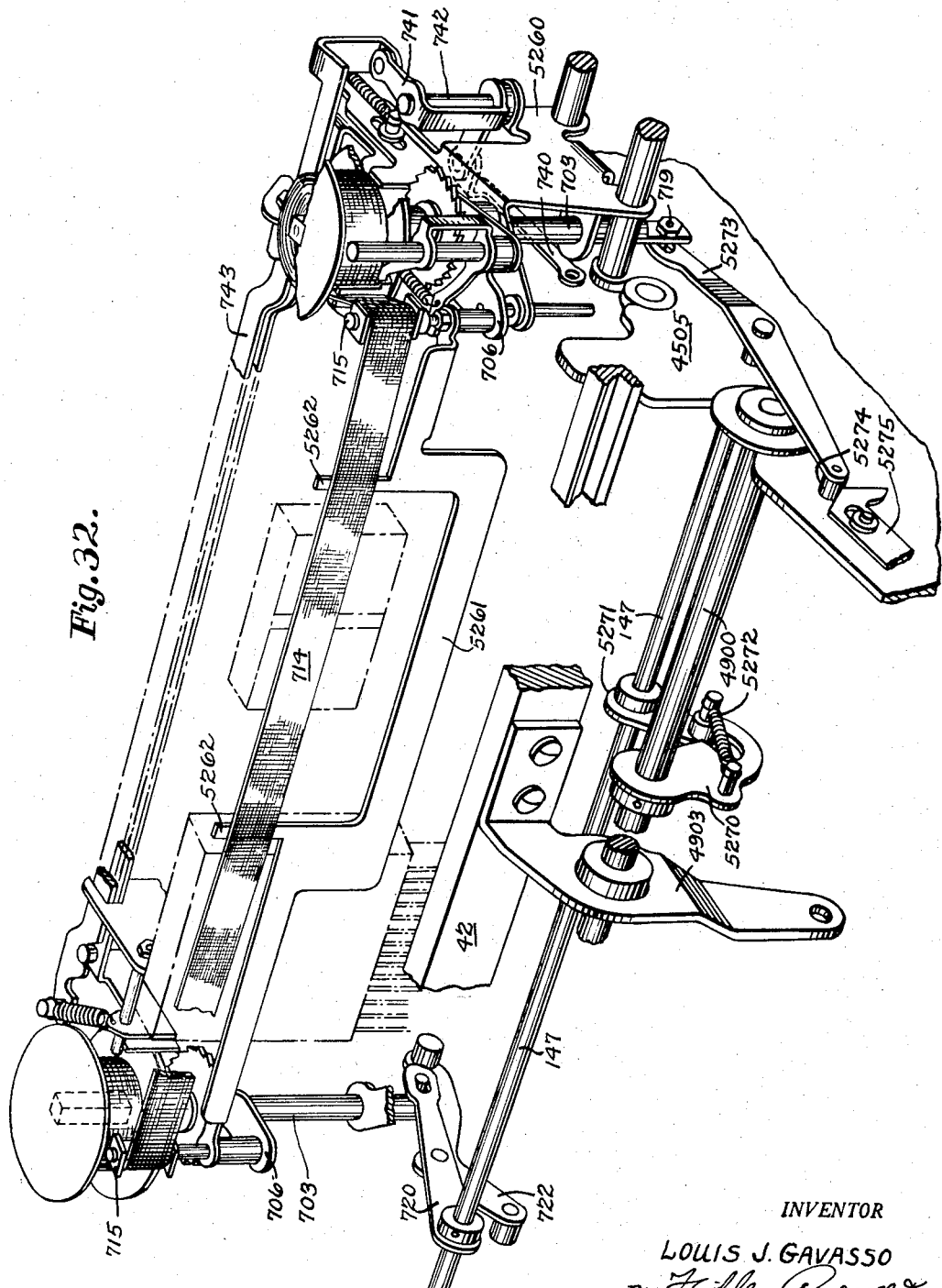

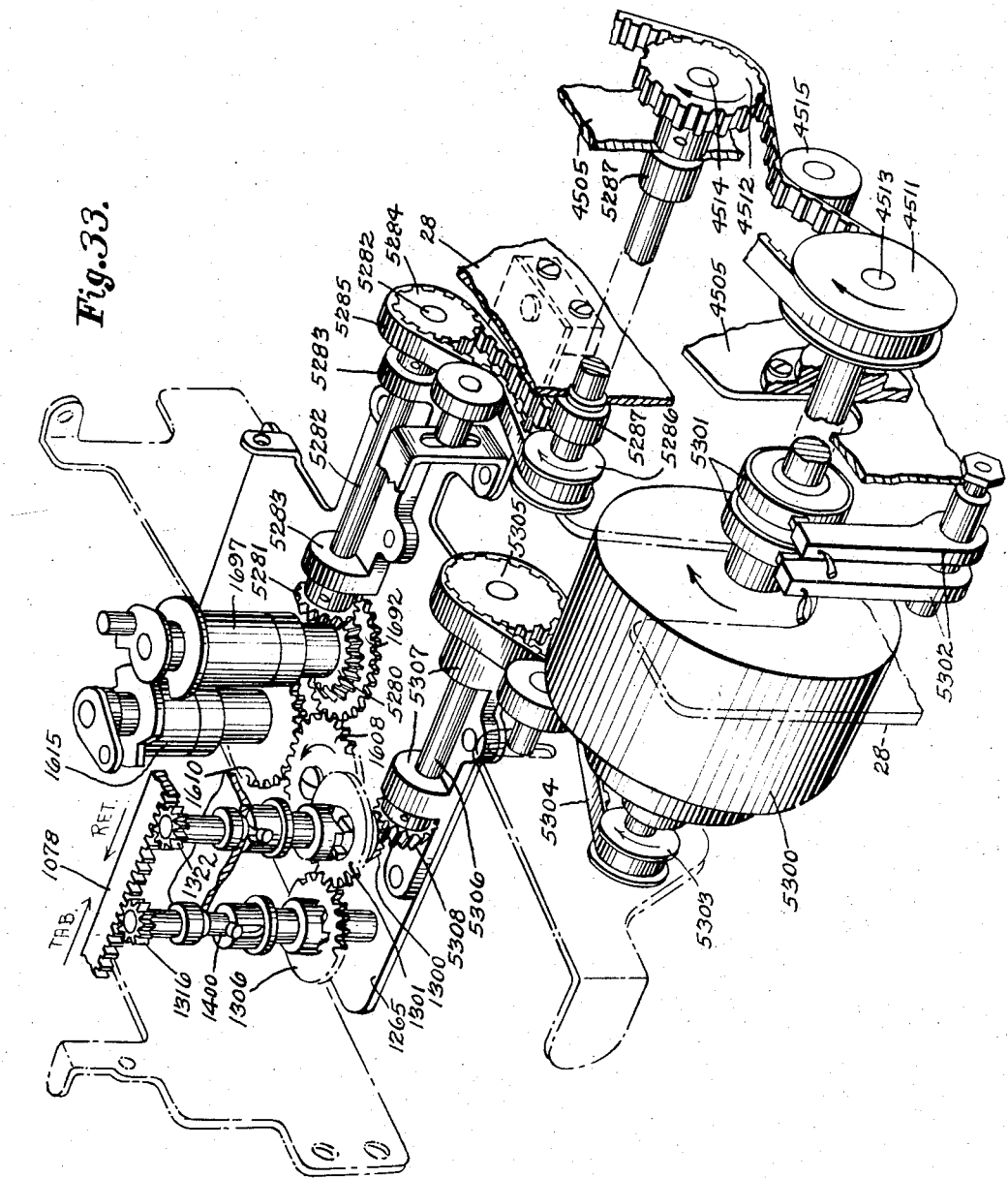

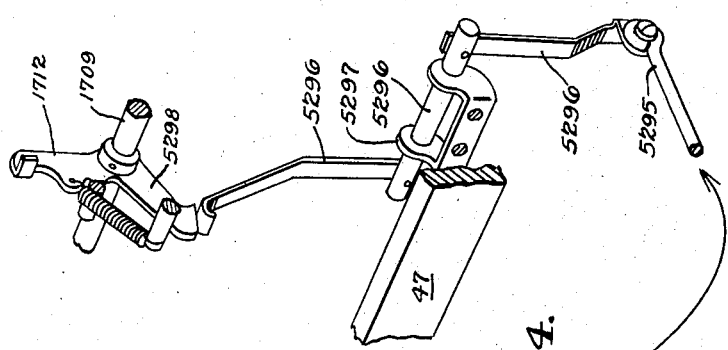
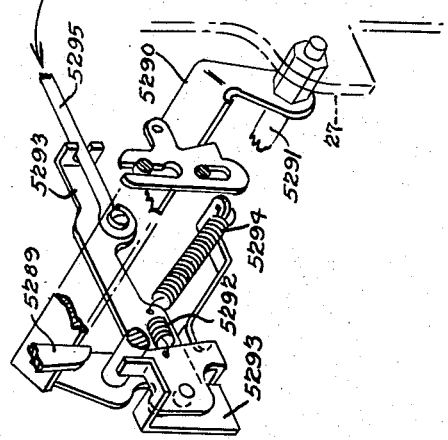
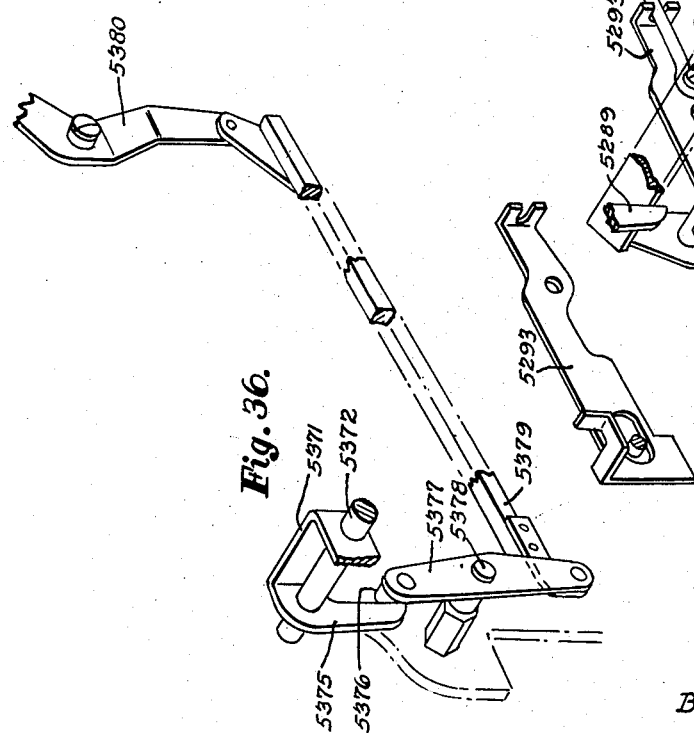

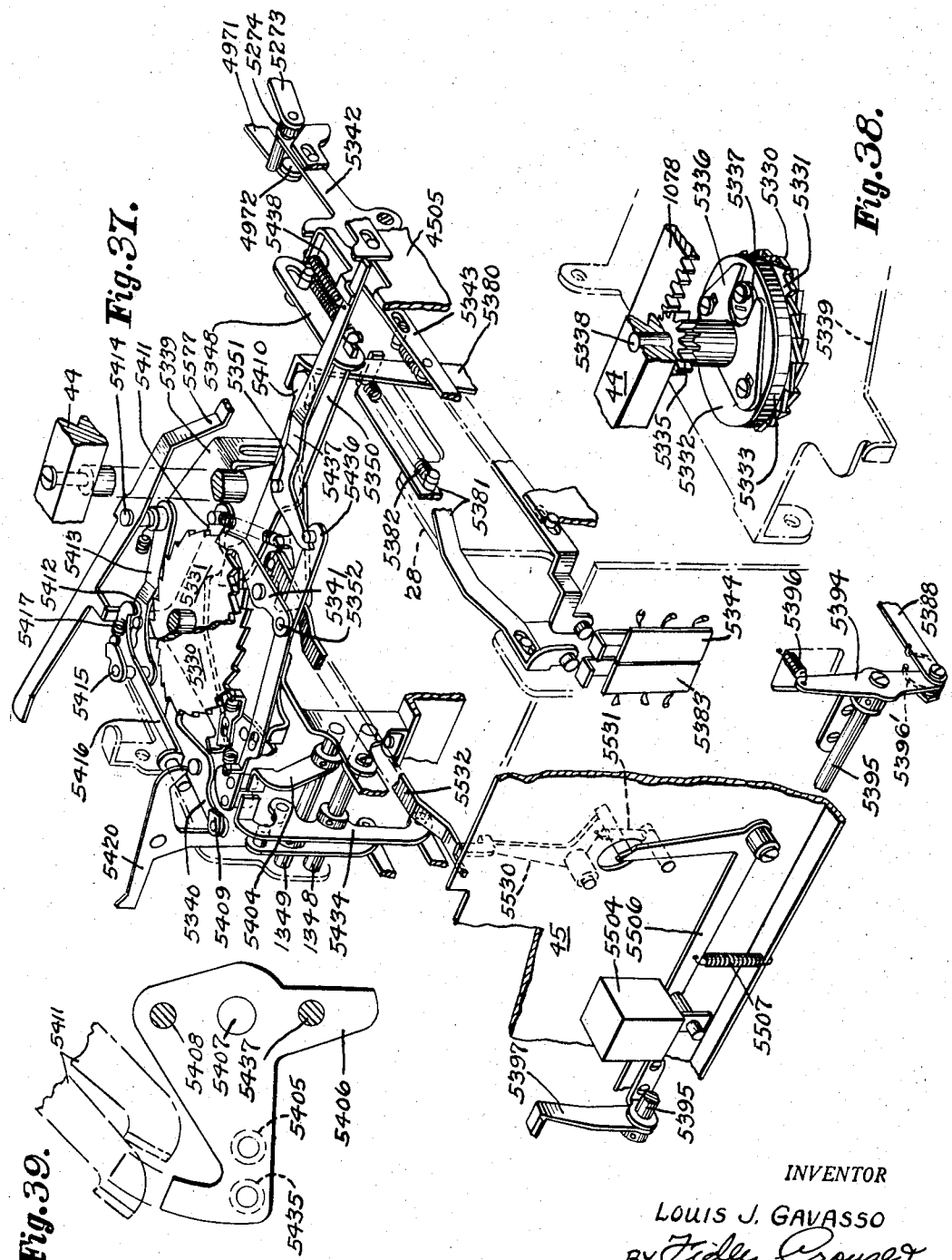

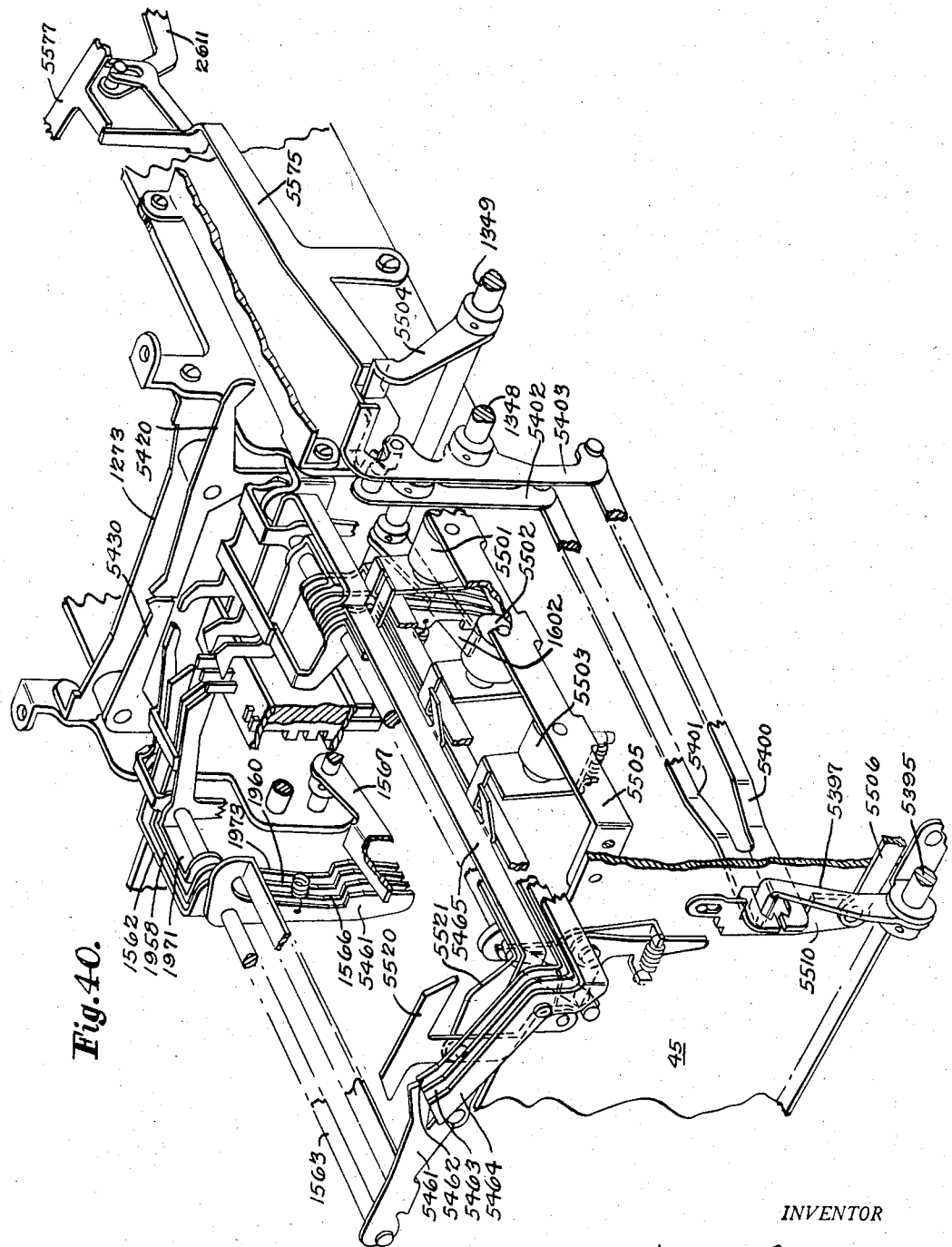

INVENTOR
LOUIS J. GAVASSO
BY
ATTORNEYS

April 14, 1959 L. J. GAVASSO 2,881,895
CARRIAGE CONTROL APPARATUS
Filed Jan. 29, 1958 26 Sheets-Sheet 23

INVENTOR
LOUIS J. GAVASSO
BY
ATTORNEYS

April 14, 1959  L. J. GAVASSO  2,881,895
CARRIAGE CONTROL APPARATUS
Filed Jan. 29, 1958  26 Sheets-Sheet 24

INVENTOR
LOUIS J. GAVASSO
BY *Fidler, Crouse &*
*Beardsley*
ATTORNEYS

April 14, 1959

L. J. GAVASSO 2,881,895

CARRIAGE CONTROL APPARATUS

Filed Jan. 29, 1958

INVENTOR
LOUIS J. GAVASSO
BY Fiedler, Krouse &
Beardsley
ATTORNEYS

April 14, 1959 L. J. GAVASSO 2,881,895
CARRIAGE CONTROL APPARATUS
Filed Jan. 29, 1958 26 Sheets-Sheet 26

INVENTOR
LOUIS J. GAVASSO
BY Fidler, Crowser
Beardsley
ATTORNEYS

United States Patent Office 2,881,895
Patented Apr. 14, 1959

2,881,895

CARRIAGE CONTROL APPARATUS

Louis J. Gavasso, Detroit, Mich., assignor to Burroughs Corporation, Detroit, Mich., a corporation of Michigan Application January 29, 1958, Serial No. 711,992

6 Claims. (Cl. 197—77)

This invention relates to control apparatus for the platen carriage of a calculating machine and it is an object of the invention to provide improved apparatus of that character.

The carriage control apparatus and the combination of said apparatus with a calculating machine are also disclosed, but not claimed, in application Serial No. 609,112 entitled "Combined Typewriter Printing and Calculating Machine" filed September 11, 1956, by Robert R. Henderson and the present applicant, and now abandoned. The basic machine disclosed herein and in said application Serial No. 609,112 is the joint invention of Robert R. Henderson and the present applicant, and only the time delay carriage control apparatus per se disclosed primarily in Figs. 48, 49 and 50 and its combination with such a machine are the sole invention of the present applicant. Carriage control apparatus constructed in accordance with the present invention may be used to advantage in a calculating machine such as that disclosed and claimed in Patent No. 2,629,549 entitled "Automatic Function Control Mechanism for Accounting Machines" issued February 24, 1953, to Thomas M. Butler and assigned to the same assignee as the present application. This patent is hereinafter referred to as the Butler patent and the machine disclosed therein is referred to as the Butler machine.

One characteristic of a calculating machine proper, such as that disclosed and claimed in the Butler patent is that a complete numerical entry is effected in a single printing operation whereby the platen carriage is always located in a predetermined position immediately following the printing of an entry. Subseqeunt carriage movement to another columnar position is always of a substantial length whether in the tabulating or return direction. In the case of a calculating machine having typewriter printing apparatus incorporated therein, it is obvious that the notations printed by the typewriter printing apparatus may be of various lengths, with the characters being printed seriatim. This means that the carriage may be in any one of various widely spaced positions following a typewriter printing operation. Accordingly, after a typewriter printing operation, tabulation to another columnar position, for a numerical entry, may call for large or small carriage movement in the tabulating direction or in the return direction or may call for the carriage to remain in its existing position, all depending upon the length of the last printed notation, the spacing of the columns, and the distance between the two sets of printing gear. It is therefore necessary to efficient operation that tabulating apparatus be provided which will selectively effect tabulating or return movement of the carriage of large or small amount, including non-movement, through control apparatus which is responsive to the existing position of the carriage.

It is another object of the invention to provide improved control apparatus in a calculating machine having typewriter printing apparatus incorporated therein by which individual letters and characters may be printed seriatim.

It is still another object of the invention to provide improved control apparatus in a combined calculating and typewriter printing machine which is common to the calculating machine proper and the typewriter printing apparatus.

It is a further object of the invention to provide improved control apparatus for a platen carriage, which apparatus may produce large or small carriage movement in either the tabulating or return direction.

It is a still further object of the invention to provide improved control apparatus for a combined typewriter printing and calculating machine in which the carriage is disconnected from the carriage drive in a carriage return movement prior to the carriage reaching the desired columnar position, which control apparatus delays reestablishment of normally engaged carriage tabulating drive until the carriage may move to the desired columnar position by inertia.

Control apparatus embodying the invention is illustrated by way of example in a combined calculating and typewriter printing machine in the accompanying drawings in which:

Fig. 4 is an exploded perspective view of certain internal typewriter printing keyboard apparatus as viewed from a point above, forward and to the left thereof;

Figs. 5 and 6 are enlarged perspective views of portions of the apparatus of Fig. 4;

Fig. 7 is a cross-sectional view of a portion of the apparatus of Fig. 4 as viewed from the left;

Fig. 8 is an enlarged left-side elevation of a portion of the apparatus of Fig. 4;

Fig. 9 is an exploded perspective view of certain internal typewriter keyboard apparatus as viewed from a point above, forward and to the left thereof;

Fig. 10 is an enlarged front view of the apparatus of Fig. 6;

Fig. 11 is an enlarged left-side elevation of a portion of the apparatus of Fig. 9;

Fig. 21 is an exploded perspective view of the type box and associated apparatus as viewed from a point above, rearward and to the left of the machine;

Fig. 22 is a perspective view of the type box and associated control apparatus as viewed from a point above, rearward and to the left of the machine;

Fig. 23 is an exploded perspective view of certain drive apparatus as viewed from a point above, rearward and to the left thereof and shown in part in Fig. 17;

Fig. 24 is a perspective view of the type box and certain control apparatus as viewed from a point above, forward and to the left thereof;

Figs. 25 and 26 are similar perspective views of a portion of the apparatus of Fig. 24, showing such apparatus in different operating positions;

Fig. 32 is a perspective view of the ribbon control apparatus as viewed from a point above, rearward and to the left thereof;

Fig. 33 is a perspective view of certain carriage control apparatus as viewed from a point above, rearward and to the left thereof;

Fig. 34 is a perspective view of certain control linkage for effecting line spacing as viewed from a point above, forward and to the right thereof;

Fig. 35 is a similar view of a portion of the apparatus of Fig. 34;

Fig. 36 is a perspective view of certain control linkage for effecting back spacing as viewed from a point above, forward and to the right thereof;

Fig. 37 is a perspective view of certain carriage control apparatus as viewed from a point above, rearward and to the left thereof;

Fig. 38 is a similar view of a portion of the apparatus of Fig. 37;

Fig. 39 is a plan view of a portion of the apparatus of Fig. 37;

Fig. 40 is a perspective view of certain carriage control apparatus as viewed from a point above, rearward and to the left thereof;

Figure 1:
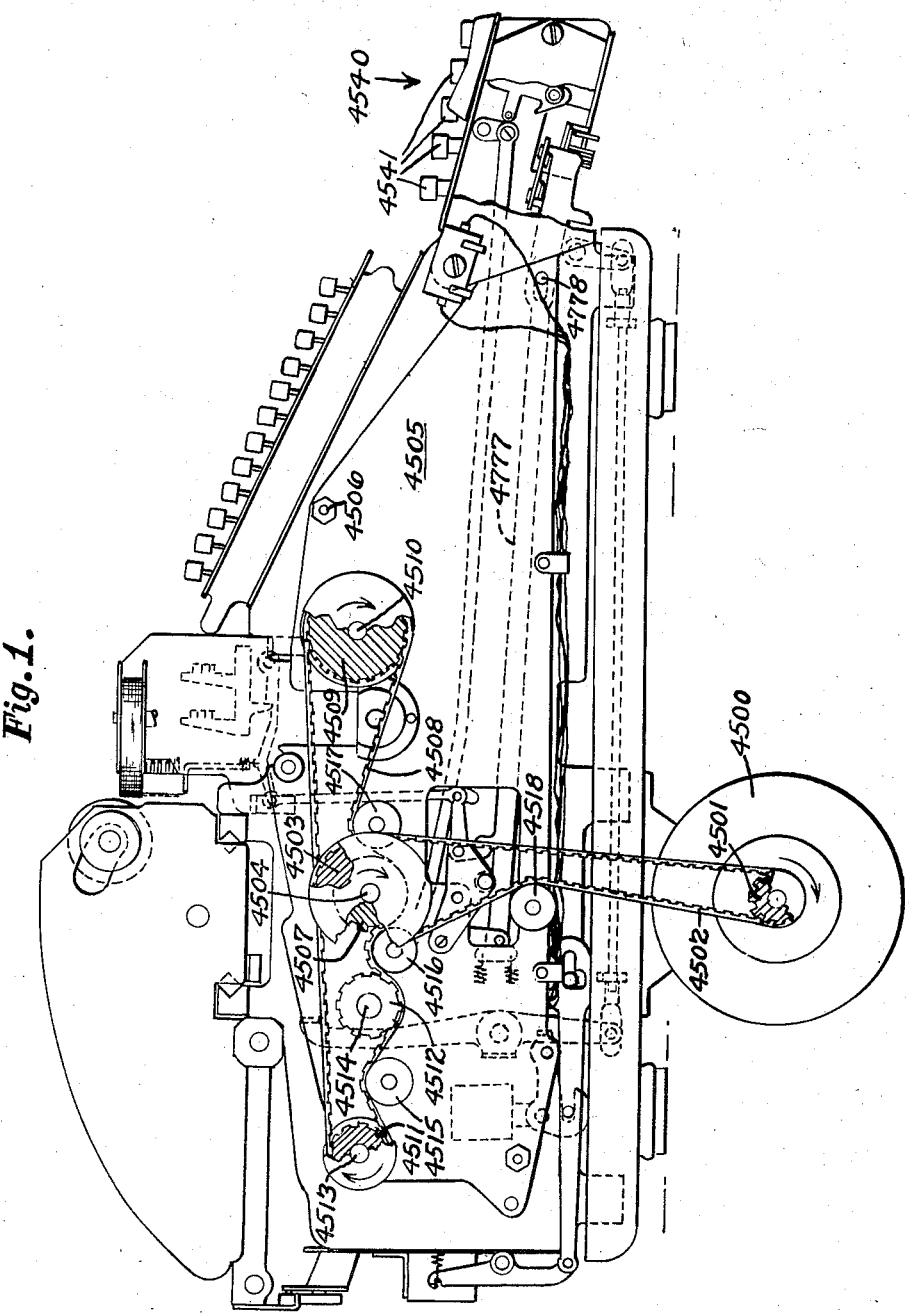
Figure 1 is a left-side elevation of the machine with certain portions removed or broken away.

In the following description of the machine shown in the drawings reliance will be placed upon description of the Butler machine contained in the Butler patent in order to avoid repeating a description of that machine. The reference numerals applied to the elements of the present machine which are not shown in the Butler patent are larger than the largest reference numeral in the Butler patent and specifically start with the reference numeral 4500. Accordingly, any reference numerals smaller than 4500 refer to elements of the Butler patent, and, in some instances, to a second Butler patent identified below.

As in the Butler patent, absolute directions are employed with respect to the overall machine regardless of the direction from which the machine or parts thereof may be viewed in the various figures. In particular, the words "clockwise" and "counterclockwise" will be used to describe positions and motions of elements of the machine as seen by an observer in front of, at the right of, or above the moving parts in the positions in which they are located in the machine. The words "right," "rightward," "left" and "leftward" are employed to describe positions and motions as seen by an observer in front of the machine. The words "above," "up," "upward," "below," "down," "downward," "front," "forward," "rear," "rearward" and "behind" are employed to describe positions and motions as they occur in the machine when it is in its normal upright position.

Drive apparatus

A single motor 4500 drives all power-driven parts of the calculating machine. On the left-hand end of the motor shaft there is secured a toothed pulley 4501 driving a belt 4502 which engages a toothed pulley 4503 secured to a shaft 4504. The shaft 4504 is journaled in an auxiliary side plate 4505 which is secured to and spaced from the side plate 28 of the Butler machine by suitable spacing studs 4506 seen in Figs. 1 and 2.

A second toothed pulley 4507 is also secured to the shaft 4504 and engages a second belt 4508. This belt passes over a toothed pulley 4509 which is secured to a shaft 4510 which is journaled in the auxiliary side plate 4505 and the side plate 28. The belt 4508 also passes over a toothed pulley 4511 and a toothed pulley 4512 secured to shafts 4513 and 4514 respectively. Suitable idler pulleys 4515, 4516, 4517 and 4518 maintain the belts 4502 and 4508 in driving engagement with the associated toothed pulleys and maintain the belts in proper tension, certain of the idler pulleys being adjustably positioned in a conventional manner. The toothed pulley 4511 is employed to drive the carriage laterally and the toothed pulley 4512 is employed to effect line spacing and carriage opening or throwback all as is explained subsequently. The toothed pulley 4509 drives the main drive shaft 126 of the calculating machine proper in a manner described immediately below.

Figure 3:
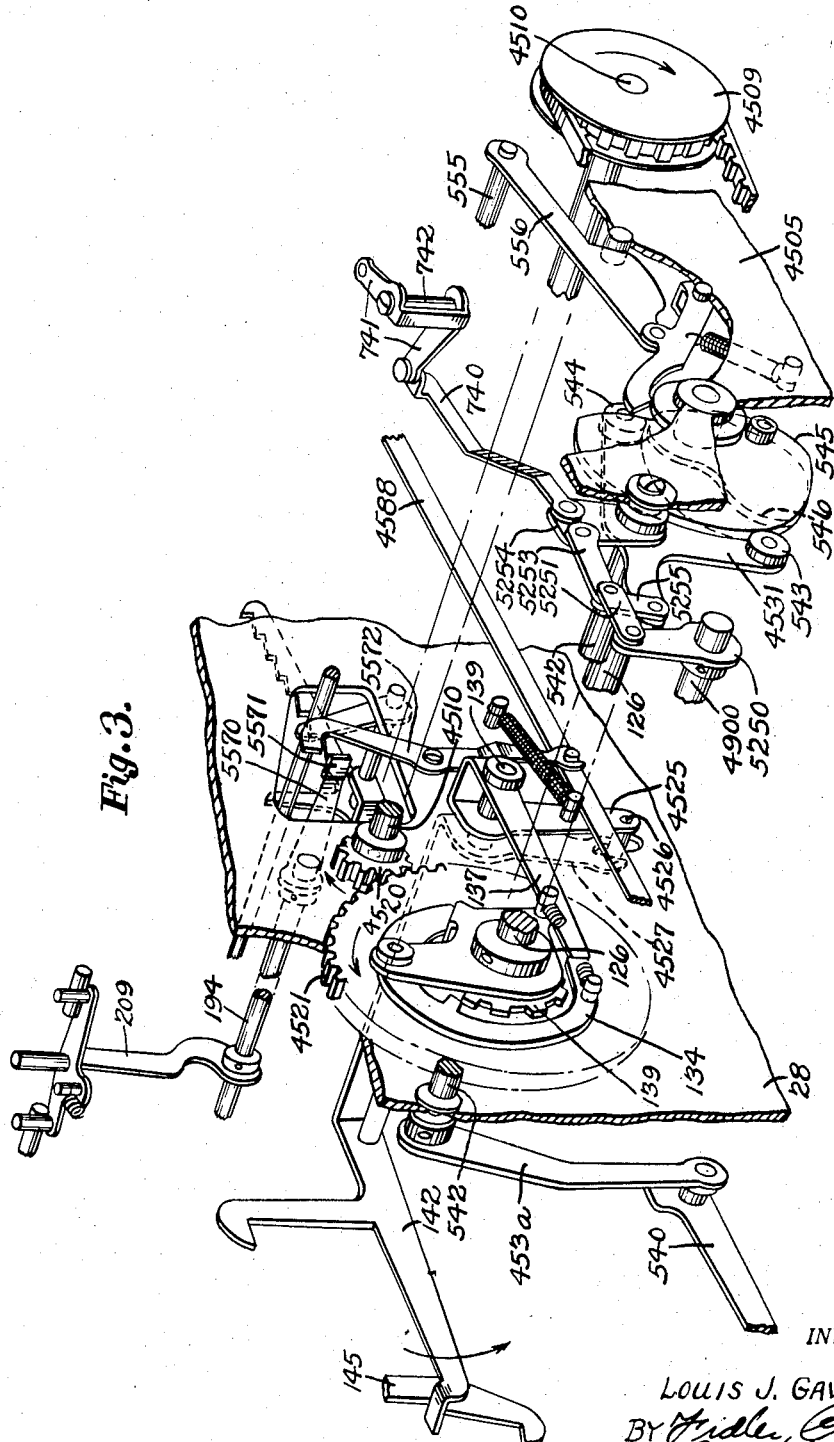
Fig. 3 is an exploded perspective view of certain drive apparatus as viewed from a point above, rearward and to the left thereof.
Figure 12:
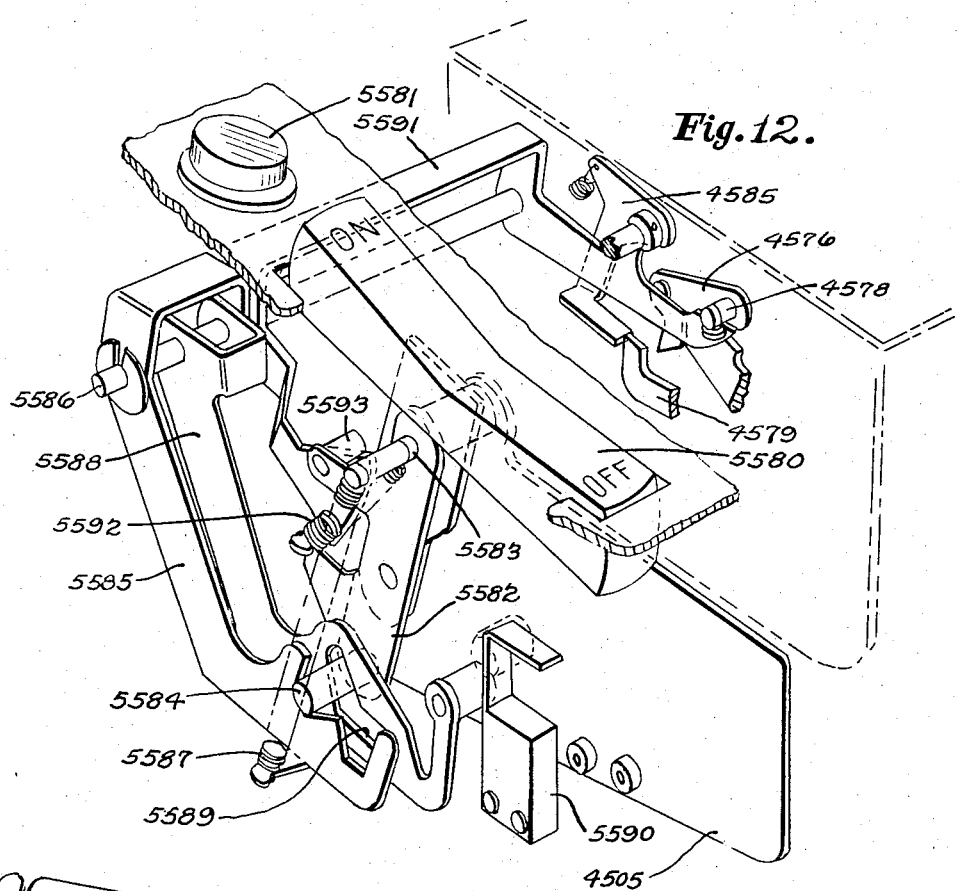
Fig. 12 is a perspective view of the main switch for the machine and associated parts as viewed from above, forward and to the left thereof.

Referring to Fig. 3, it will be seen that the toothed pulley 4509 is drivingly connected through the shaft 4510 to a pinion 4520 which is in constant engagement with a gear 4521. The gear 4521 is freely rotatable on the shaft 126 which is the main drive shaft of the Butler machine. Secured to the gear 4521 is the clutch member 129 of the Butler machine, the cooperating clutch member 134 also being seen in Fig. 3.

The shaft 126 is longer than in the Butler machine in order that the gear 4521 may be arranged outside or to the left of the main side plate 28, where it may readily engage the pinion 4520. Resultant placement of the clutch members 129 and 134 outside or to the left of the left-hand side plate 28 calls for a slight change in certain of the clutch control apparatus as seen in Fig. 3. The clutch trip arms 137 and 142 are, in the Butler patent, connected together and are integral with a yoke 138.

Because of the intervention in the present case of the side plate 28 between the arms 137 and 142, the arm 137 is bent to form a yoke having a second arm 4525 also outside or to the left of the side wall 28. The yoke is freely pivotable on the shaft 139 and the arm 4525 carries a stud 4526 secured to its lower end. This lug protrudes through an arcuate opening in the side plate 28 and engages the forked lower end of an arm 4527 which is integral with, and forms a yoke with, the arm 142 freely pivotable on the shaft 139. It will readily be seen that the arms 137 and 142 are thereby made to operate in unison as in the Butler machine.

Also seen in Fig. 3 are the left-hand cams 545 and 546 of the Butler machine which operate the left-hand lever 541 to drive the differential mechanism. In order to make room within the calculating machine of the Butler patent for additional apparatus required in the present machine, these cams 545 and 546 are positioned on the extension of the main drive shaft 126 to the left of the left main side wall 28 near the auxiliary side wall 4505. This in turn requires alteration of the drive connections between these cams and the associated Pitman or link 540. A simple lever 4530 is secured to the stud or shaft 542, which in the present machine is extended so that it may be journaled in the auxiliary side plate 4505 as shown in Fig. 3, and is connected to the left-hand link 540. At the left-hand end of the stud or shaft 542 is a three-armed lever 4531 which carries the roller 543 on its lower arm and the roller 544 on its forward arm, these rollers cooperating with the cams 545 and 546. Attention is directed to the fact that the right-hand lever 541 and cooperating cams 545 and 546 are arranged in the same positions in the present machine as in the Butler machine.

*Typewriter keyboard*

Figure 2:
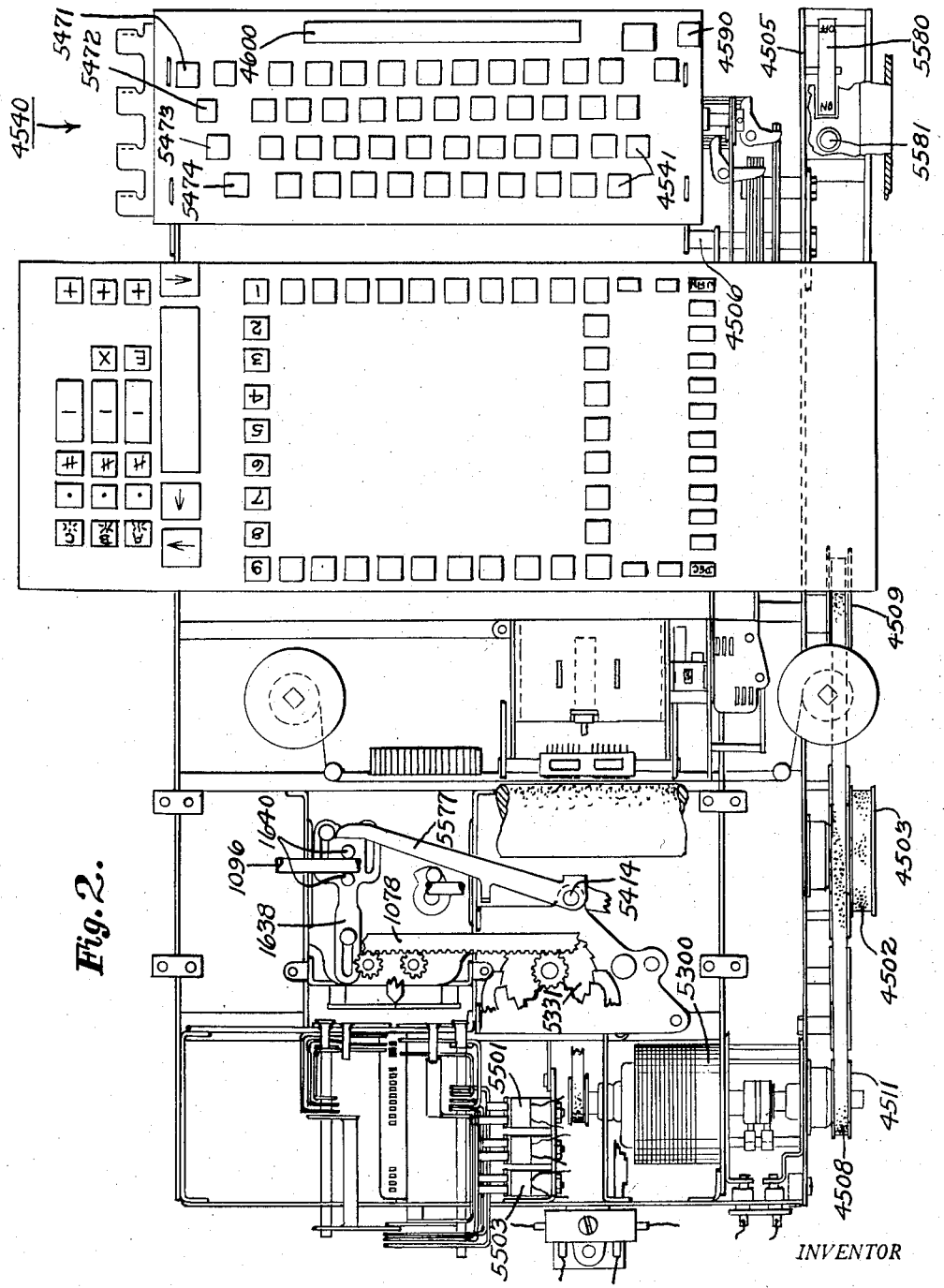
Fig. 2 is a plan view of the machine with certain portions removed or broken away.

At the front of the machine there is arranged a typewriter keyboard 4540 having individual keys 4541 which may be similar to a conventional typewriter. However, and as is subsequently described in detail, power for the printing of letters or symbols is derived from the main motor 4500, the motor automatically positioning the desired letter or character type piece in proper printing position and driving a hammer against the selected type piece to effect printing. As best seen in Figs. 1 or 2 the keys 4541 for the principal letters and characters are arranged in four rows.

Referring to Fig. 4 it will be seen that key stems 4542 for the first row of keys are bent rearwardly and that the key stems 4543 for the second row of keys are bent forwardly whereby the lower ends of the key stems 4542 and 4543 may receive and be guided by a common fixed bar or rod 4546. Similarly the key stems 4544 for the third row of keys are bent rearwardly while key stems 4545 of the fourth row of keys are bent forwardly whereby vertically extending slots in the key stems 4544 and 4545 may receive and be guided by a common fixed rod 4547.

Both of the rods 4546 and 4547 are located immediately below a bottom plate 4550 of the typewriter keyboard which is slotted to receive the various key stems. Similar slots are provided in an upper plate 4551 whereby the keys and key stems may slide vertically through the upper and lower plates 4551 and 4550. Suitable side plates 4552 are also provided for the typewriter keyboard, the side plates being secured to the upper and lower plates and serving to support various operating parts of the typewriter keyboard apparatus.

Associated with each of the key stems 4542 and 4543 of the first and second row of keys 4541 is a key lever 4555 pivotally mounted on the fixed rod 4556. Similar key levers 4557 are associated with each of the key stems 4544 and 4545 of the third and fourth row of keys 4541 and are pivotally mounted on a fixed rod 4558 near the forward end of the typewriter keyboard.

The preferred method of mounting key levers 4555 and 4557 on the rod 4556, and 4558, respectively, is clearly illustrated in Fig. 5. The rods 4556 and 4558 are provided with annular grooves, one groove for each key lever. The rod-engaging end of each key lever 4555 and 4557 is forked, the lower side of the fork having an arcuate recess matching the reduced diameter of the corresponding rod. The forked end of the key lever may readily be slid over the recessed portion of the associated rod after which the rod engaging end is raised to bring the reduced diameter portion of the rod into the arcuate recess of the key lever, and the upper arm of the forked end of the key lever is then laterally bent wherein it engages the outer surface of the adjacent normal portion of the associated rod. This locks the reduced diameter portion of the rod in the reduced arcuate portion of the arm of the forked end of the key lever whereby the key lever is firmly anchored through the associated rod but may freely pivot with respect thereto.

Each key stem 4542–4545 has a stud 4560 secured thereto for cooperating with the free end of the associated key lever 4555 or 4557 whereby the key and key stem when depressed force the associated key lever downwardly. The slots in the upper plate 4551 are T-shaped in order to permit passage therethrough of the key stems with stud 4560 fixed thereto, thereby facilitating assembly and disassembly. A coil spring 4561 stretched between the side walls 4552 and passing over suitable brackets 4562 urges the key levers 4557 and the associated key stems 4544 and 4545 upwardly toward their normal positions. A similar spring 4563 arranged and supported similar to the spring 4561 urges the key levers 4555 and hence the key stems 4542 and 4543 upwardly toward their normal positions.

When a key and key lever are depressed, the key lever is moved downwardly between the teeth of a comb construction 4565 which may be seen best in Figs. 4 and 10. The comb construction is double walled as seen best in Fig. 10 and a series of rollers 4566 are contained therein. The rollers 4566 are restrained at the end of the comb construction and are of such dimensions with respect to the length of the comb construction that there is room for the width of only one key lever 4555 or 4557 between the rollers. Accordingly, if any one key is depressed, depression of another key is prevented since the second key lever cannot be forced between the rollers 4566.

Each of the key levers 4555 and 4557 is provided with a forwardly extending arm 4569 arranged above the main body of the corresponding key lever and overlying a rod or bail 4570. The ends of the bail 4570 are secured in left and right arms 4571, the left arm being shown in Fig. 4 and the right arm 4571 appearing in Fig. 44. Both arms 4571 are fixedly secured to a shaft 4572 which is rotatable in the side plates 4552. Depression of a key 4541 and lowering of the corresponding key lever 4555 or 4557 brings the corresponding arm 4569 into engagement with the top of the bail 4570 and depresses the bail such that the arms 4571 and the shaft 4572 are caused to rotate in a clockwise direction (counterclockwise as viewed in Figs. 4, 7 and 8). As seen best in Fig. 7 there is a substantial clearance between the lower surface or edge of the arm 4569 of the key lever 4555 or 4557 and the upper surface of the main portion of the key lever. Accordingly depression of the bail 4570 by any one key and key lever is permitted without the bail 4570 engaging and lowering the other key levers.

The clockwise rotation of the shaft 4572 caused by depression of a key 4541 triggers operation of the type printing mechanism through control means, a portion of which is located at the left-hand side of the typewriter keyboard and may be seen in Figs. 4 and 8. Rigidly secured to the left-hand end of the shaft 4572 outside or to the left of the left-hand side plate 4552 is a lever 4574. The lever 4574 has a forwardly extending arm to which is connected a spring 4575, the upper end of the spring being engaged with the forward arm of the lever 4574 and the lower end of the spring being fastened to a stud which is secured in the side plate 4552. The arm 4574 and the shaft 4572 are thereby urged in a counterclockwise direction (clockwise as viewed in Figs. 4 and 8). An L-shaped pawl 4576 is pivotally mounted on a rearwardly and upwardly extending arm of the lever 4574 as by a headed screw. A forwardly and upwardly extending arm of the pawl 4576 is biased downwardly by a spring 4577 which is secured at its upper end to the pawl 4576 through a suitable stud 4578 and which is secured at its lower end to an arm 4579 through a similar stud. The arm 4578 is freely pivotally supported by the shaft 4572 and is arranged inside or to the right of the lever 4574. Downward movement of the forward end of the pawl 4576 is limited by engagement of the stud 4578 with the upper edge of the rearward arm of the lever 4574. Upward movement of the arm 4579 is limited by engagement of a rightwardly turned ear 4580 on the lower edge thereof with a pin or stud 4581 seen in Fig. 4. When these parts are in their normal position, the arm 4579 is raised upwardly such that its ear 4580 engages the stud 4581, as seen in Fig. 4, and the pawl 4576 has its stud 4578 in contact with the upper edge of the rearward arm 4574. The lever 4574 is in its full counterclockwise position wherein the bail 4570 bears against the arm 4579 of the key levers 4555 and 4557. These normal positions of the lever 4574 and the pawl 4576 are assumed because the spring 4575 dominates the spring 4577. In these positions of the parts, the lower arm of the pawl 4576 is raised upwardly, clear of an upwardly turned end of the arm 4579, and the upwardly turned rear end of the arm 4579 lies in the path of a forwardly extending portion of an arm 4585, the arm 4585 being secured to a shaft 4586, rotatively supported by the side plates 4552. Also secured to the shaft 4586, outwardly of the arm 4585, is an arm 4587 to which a link 4588 is pivotally connected.

The lever 4585 is biased in a clockwise direction by a spring 4589 secured at its upper end to the arm 4585 and at its lower end to a stud secured in the left-hand side wall 4552. As previously indicated when the arm 4579 is in its normal position, its upwardly turned rear end lies in the path of the outwardly turned and forwardly extending portion of the lever 4585 whereby clockwise rotation of the lever 4585 by the spring 4589 is restrained. The link 4588 serves to trigger the printing mechanism when it is permitted to move forwardly, as is subsequently explained in detail.

It may now be understood that when any one of the keys 4541 is depressed it rocks the associated key lever 4555 or 4557 and depresses the bail 4570. This rotates the shaft 4572 and the lever 4574 in a clockwise direction. The downwardly extending arm of the pawl 4576 engages the upwardly turned rear end of the arm 4579 whereby such clockwise movement of the lever 4574 depresses the arm 4579 below the forwardly extending portion of the lever 4585. The lever 4585 may then pivot in a clockwise direction under the influence of its spring 4589, the pawl 4576 being forced forwardly against the action of the spring 4577. This in turn rotates the shaft 4586 and the arm 4587 whereby the triggering link 4588 is dawn forwardly to trigger the printing mechanism.

Upon the completion of a printing operation the lever 4585 is returned to its normal position against the action of its spring 4589, by means subsequently described, and its forwardly extending portion is withdrawn from above the arm 4579. Since the lower arm of the pawl is no longer in position to contact the upwardly extending rear portion of the arm 4579, the arm 4579 will rise under the influence of the spring 4577 when the arm 4585 is restored to its normal position even though the operator holds a key 4541 depressed throughout the operating cycle of the machine. The arm 4579 is thus returned to its normal position where it lies in the path of the arm 4585. Accordingly, even though the operator holds a key 4541 depressed, the arm 4579 will return to its normal position at the end of an operating cycle and prevent a repeat cycle. Accidental repetition of the printing of a given letter or character is thereby prevented.

Figure 13:
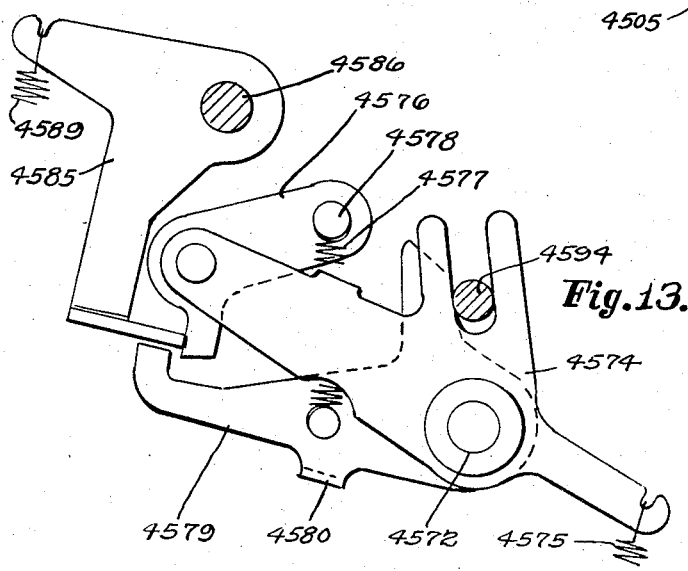
Fig. 13 is a view similar to Fig. 8 but showing the parts in a different operating position.

In the event, however, that repeated printing of a selected character is desired, this can be accomplished by depressing the repeat key 4590 at the left-hand forward corner of the keyboard 4540. The repeat key 4590 has a key stem 4591 slidably mounted on the outside of the left-hand side plate 4552, the key stem 4591 being suitably slotted to permit depression of the key 4590 and being biased in an upwardly direction by a spring 4592 seen in Fig. 4. A forwardly extending arm of the key stem 4591 depresses a link 4593 which is pivotally connected thereto and which carries a stud 4594. The stud 4594 is engaged in a forked upwardly extending arm of the lever 4574 and the lever 4579 has an upwardly extending arm which is engageable by the stud 4594 when the latter is drawn downwardly by the link 4593 and the key stem 4591. The stud 4594 is shown in its normal position in Fig. 8, wherein the arm 4579 is free to pivot in a counterclockwise direction with respect to the lever 4574. In Fig. 13 the stud 4594 is shown in actuated position wherein such movement of the arm 4579 is prevented.

It will now be seen that continued depression of the repeat key 4590 maintains the arm 4579 in its clockwise position with respect to the lever 4574, with the result that clockwise movement of the lever 4585 at the end of a printing cycle does not permit arm 4579 to rise into the path of the lever 4585. Accordingly, repeat operations for the printing of a given character or letter is permitted by continued depression of the repeat key 4590 and continued depression of any one of the character keys 4591.

Means are provided for maintaining a depressed key in its depressed position throughout the operating cycle of a printing apparatus. A blade 4595, seen in part in Figs. 4 and 9 and in cross section in Fig. 7, has upturned arms at the ends thereof which are secured to the shaft 4586. As best seen in Fig. 7 the blade 4595 is swung forwardly when the lever 4585 swings forwardly at the beginning of a printing cycle. The blade therefore moves forwardly to overlie the upper edge of the lug 4569 of any depressed key lever 4555 or 4557 and to underlie the lugs 4569 of any lever 4555 or 4557 which has not been depressed. This assures that any depressed key lever will remain depressed and index the printing apparatus throughout the printing cycle and further assures that a second key may not be depressed during the printing cycle. It will be apparent that at the end of the printing cycle the shaft 4586 will swing the blade 4595 rearwardly and release the depressed key lever and permit depression of any key.

A space bar 4600 may be seen in Fig. 9, whose function is of course to cause the operation of the machine through a printing cycle with no character being printed. The space bar is secured to a pair of arms 4601 which are firmly secured together by a rod 4602. The arms 4601 are pivotally mounted on the rod 4556 in the same manner as are the key levers 4555, and a pair of studs 4603 are secured to the arms 4601, these studs being covered with a resilient material and arranged to engage the under side of the upper plate 4551 of the keyboard to prevent undue noise or shock when the space bar returns to its upward or normal position.

Arranged immediately below the left-hand arm 4601 is the rightwardly turned end of an arm 4604 pivotally mounted on the shaft 4572. The arm 4604 forms a yoke with a second arm 4605 seen in Fig. 4. The arm 4605 is operatively connected to a special lever 4606 through a stud 4607, the special lever being very similar to the key levers 4555 except that the forward end is removed. More particularly, the special lever 4606 has a lug 4569 which cooperates with the bail 4570 in the same manner as do the lugs of the key levers 4555. It will now be apparent that when the space bar 4600 of Fig. 9 is depressed, the arms 4601 pivot downwardly causing downward movement of the arm 4604 and the arm 4605. The stud 4607 presses the forward end of the special lever 4606 downwardly and causes the bail 4570 to move downwardly and start a machine operation in the same manner as does the depression of any of the keys 4541. The printing apparatus then passes through a cycle of operation. The difference between the operation of the printing apparatus upon depression of a key 4541 and the space bar 4600 lies in the fact that depression of a key 4541 causes the indexing of a selected one of the printing bars, all as is subsequently described, whereas depression of the space bar does not cause such indexing.

Various other special keys in addition to the repeat key 4590 and the space bar 4600 are arranged on the keyboard. Their construction and operation are described subsequently in connection with the description of their functions and their association with other operating parts of the machine.

*Typewriter code indexing*

Figure 14:
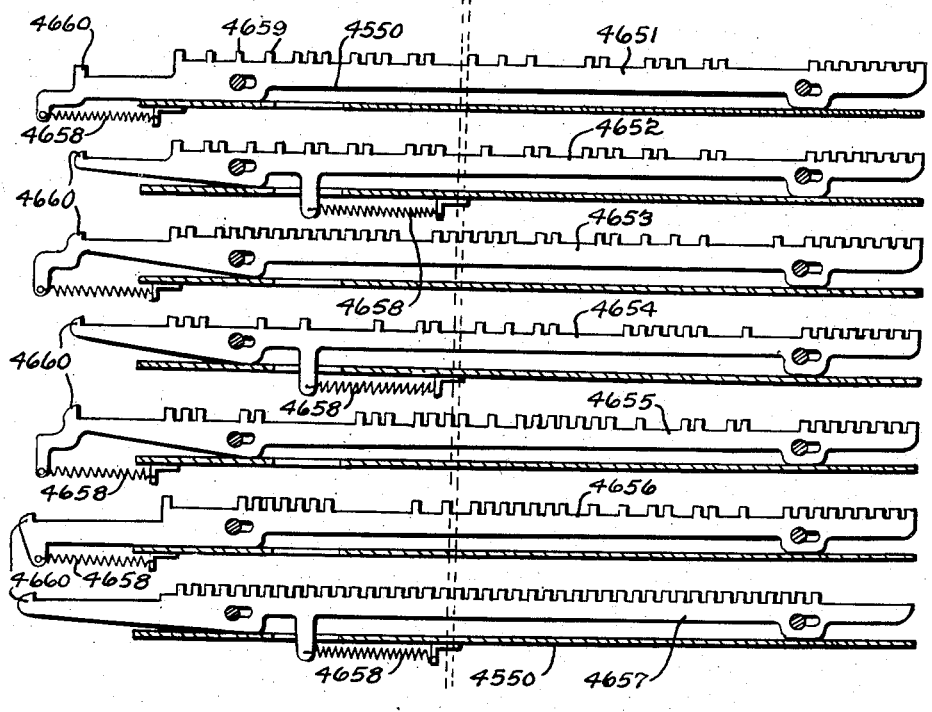
Fig. 14 is a front elevational view of certain coding slides associated with the typewriter printing keyboard, the various slides being vertically displaced in the interest of clarity.

Extending across the typewriter keyboard and arranged next to the bottom plate 4550 and secured thereto is a heavy plate or bar 4650 seen in Figs. 4, 6 and 7. This bar supports the rollers 4566 previously described. Associated with the bar 4650 are seven coding slides 4651–4657, illustrated individually in Fig. 14. Sliding movement of the individual coding slides is permitted by suitable slot and stud arrangements as shown in Figs. 6 and 14, and each coding slide is urged toward the right by a spring 4658 which is connected to a suitable depending arm on the associated coding slide and to a suitable bracket on the bottom of the bottom plate 4550.

Extending from the upper edge of each coding slide 4651–4657 are teeth 4659. The coding slides and the key levers 4555 and 4557 are so positioned with respect to each other that the teeth 4659 on the various coding slides may move under any of the key levers 4555 and 4557 which are not depressed. However, a depressed key lever is arranged in the path of the teeth 4659 such that it bars movement to the left of any coding slide which may have a tooth 4659 immediately to the right of the depressed key lever. It will be noted by reference to Fig. 14 that the teeth 4659 on the first six coding slides 4651–4656 are irregularly spaced such that selected ones of these six coding slides may move to the left or be restrained by a depressed key lever depending upon the lateral position of the depressed key lever. Accordingly, when any given key and key lever is depressed, selected ones of the coding slides 4651–4656 may slide to the left while others may be barred from movement to the left. In Fig. 14 a typical key lever is schematically illustrated in phantom lines. Such a key lever when depressed would prevent leftward movement of slides 4651, 4653, 4655 and 4657 and would permit leftward movement of slides 4652, 4654 and 4656. The seventh coding slide 4657 has a tooth for each key 4541 and accordingly is always barred from sliding to the left when a key 4541 is depressed.

At the left end of each of the coding slides 4651–4657 is an upwardly extending lug 4660 which may be seen in Fig. 4 to cooperate with corresponding L-shaped levers 4661–4667. These L-shaped levers are pivotally mounted on upper and lower brackets 4668 and 4669 which are secured to the left side wall 4552 of the typewriter keyboard. The first five levers 4661–4665 are mounted on a first pin extending between the two brackets 4668 and 4669 while the two levers 4666 and 4667 are mounted on a second pin extending between the same two brackets.

Figure 15:
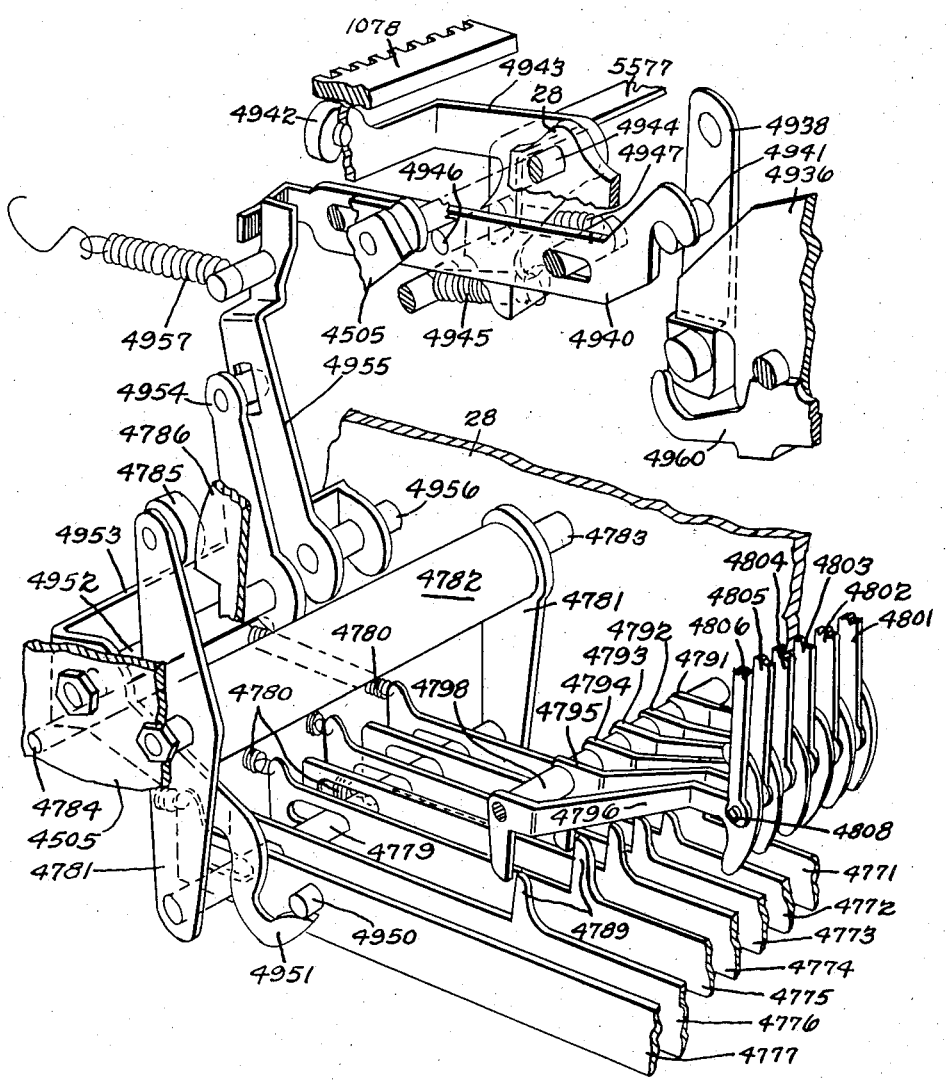
Fig. 15 is a perspective view of certain typewriter printing control apparatus as viewed from a point above, forward and to the left thereof.

The left rear arms of the L-shaped levers 4661–4667 engage upwardly extending lugs on a series of coding slides 4771–4777 seen best in Figs. 1, 4 and 15. The forward ends of these last-mentioned coding slides are supported on a suitable fixed stud 4778 extending through slots in the respective slides as seen in Fig. 1. The rearward ends of these same coding slides are similarly slotted and are supported by a bail 4779 extending through these slots, all as best seen in Fig. 15. Each of these coding slides is urged rearwardly by a corresponding spring 4780 connected between a coding slide and a suitable fixed member such as a stud 4784.

The bail 4779 is supported in a pair of downwardly extending arms 4781 secured to a sleeve 4782 which is rotatable on a shaft 4783. The outer or left-hand arm 4781 extends above the sleeve 4782 and has a cam roller 4785 rotatably supported thereon. This cam roller cooperates with a continuous cam 4786 which is pivotally supported on the shaft 4504 and which is rotated once during each operating cycle of the typewriter printing apparatus, all as is described in detail below.

When the cam roller 4785 is engaged by the high point of the cam 4786 as shown in Fig. 15, the bail 4779 and hence the coding slides 4771–4777 are maintained in their forward positions against the action of the springs 4780. However, when the cam 4786 is rotated such that the cam roller 4785 is permitted to engage a low point on the cam, the bail 4779 is free to move rearwardly and is drawn rearwardly by the springs 4780 acting through any of the coding slides 4771–4777 which are free to move rearwardly. The particular key 4541 and corresponding key lever 4555 or 4557 which has been depressed determines which of the coding slides 4651–4657 may move to the left and accordingly determines which of the coding slides 4771 and 4777 may move rearwardly under the influence of the springs 4780. It is to be understood that the springs 4780, which urge the coding slides 4771–4777 rearwardly, are sufficiently strong that they readily overcome the springs 4658 which urge the coding slides 4651–4657 to the right. Those coding slides 4771–4777 which are thus released by the bail 4779 and the slides 4651–4657 to move rearwardly under the influence of their springs 4780 may move a sufficient distance rearwardly to accomplish their control functions. Downwardly extending lugs on the slides 1471–1477 near their forward ends, as seen in Fig. 1, are engageable with a fixed cross stud to limit rearward movement of the slides.

Each of the first six coding slides 4771–4776 has an upwardly directed lug 4789 aligned with and arranged to engage a downwardly extending arm of corresponding levers 4791–4796. Each of these levers is secured to a respective sleeve 4798 rotatably mounted on a shaft extending between and secured to the walls 28 and 4505. As will readily be seen in Fig. 15 rearward movement of any of the coding slides 4771–4776, acting through their upwardly directed lugs 4789, cause downward movement of the forward arms of the corresponding levers 4791–4796.

A series of six links 4801–4806 are pivotally connected to the forward arms of the corresponding levers 4791–4796 through suitable studs 4808. The upward ends of the links 4801–4806 (see Fig. 16) are pivotally connected to slides 4811–4816 through suitable studs 4817 connected to the individual slides, the upper ends of the links 4801–4806 being arranged to snap over the respective studs for ready assembly or disassembly.

The slides 4811–4816 extend forwardly from their pivotal connection with the links 4801–4806 and are urged upwardly at their rearward ends by springs 4818 which are connected at their lower ends to the slides and at their upper ends to a saddle 4819 which is in turn supported by a fixed rod extending between the walls 28 and 4505. At their forward ends the slides 4811–4816 are pivotally connected to corresponding slides 4821–4826 through suitable pins 4828. The slides 4821–4826 are slidably supported by fixed pins 4829 extending through slots therein, the pins 4829 being secured at their ends to a fixed, U-shaped frame member 4830.

The slides 4811–4816 have upwardly extending ears 4833 intermediate their worward and rearward ends, these ears extending up through a slot in the upper side of the U-shaped frame member 4830 when the slides are in their normal or raised positions. Each of the slides 4811–4816 also has a notch 4831 in the lower surface thereof. When any one or more of the slides 4811–4816 are lowered by individual ones of the links 4801–4806 the corresponding slots 4831 engage an upwardly directed blade 4832 pivotally mounted on studs 4834 secured in the frame member 4830. It will be apparent that if the blade 4832 is made to move forwardly it will carry with it any one or more of the slides 4811–4816 which has been lowered by the corresponding link 4801–4806 such that the corresponding slot 4831 has received the blade 4832. Such forward movement of selected slides 4811–4816 produces forward movement of the corresponding slides 4821–4826. Means for operating the blade 4832 are described below.

It will now be apparent that when the cam 4786 of Fig. 15 causes rearward movement of the bail 4779 selected ones of the coding slides 4771–4777 will be permitted to move rearwardly under the influence of the corresponding springs 4780 as determined by engagement of the teeth on the upper edges of the coding slides 4651–4657 of Fig. 14 with a depressed key lever 4555 or 4557. Such rearward movement of selected ones of the coding slides 4771–4776 causes downward movement of the corresponding links 4801–4806 of Fig. 15. The selected links 4801–4806 lower the rearward ends of the corresponding slides 4811–4816 against the action of the springs 4818 to bring the slots 4831 into engagement with the blade 4832 whereby subsequent forward movement of the blade 4832 will cause a forward sliding movement of the selected slides 4811–4816 and of the corresponding slides 4821–4826.

The first three slides 4821–4823 of the latter group have upwardly extending arms each carrying a forwardly directed finger 4834 arranged to engage and operate the upper three of a series of levers 4841–4845 each of which is secured to a collar 4846 pivotally mounted on a fixed vertical shaft 4847, this shaft being secured in suitable brackets 4848. Each of the levers 4841–4845 is urged in a counterclockwise direction by an individual spring 4849. It will be seen that forward movement of any one of the levers 4821–4823 will cause clockwise rotation of the corresponding lever 4841–4843 against the action of the corresponding springs 4849.

Each of the lower two levers 4844 and 4845 has an upturned arm 4850 lying immediately to the right of rearwardly extending arms on various of the upper three levers 4841–4843. The upwardly turned arm 4850 of the lever 4845 lies in the path of the rearwardly extending arms of all three of the upper three levers, whereas the upwardly turned arm 4850 of the next lowermost lever 4844 lies in the path of the rearwardly extending arms of two levers 4842 and 4843. Accordingly, clockwise rotation of any of the upper three levers induces clockwise rotation of the lever 4845, while clockwise rotation of either of the levers 4842 or 4843 induces clockwise rotation of the lever 4844.

The coding slides 4824–4826 also have upwardly extending arms with forwardly protruding fingers near their upper ends, the upwardly extending arms of the slides 4824–4826 being arranged considerably to the rear of the upwardly extending arms of the slides 4821–4823. The upwardly extending arms of the slides 4824–4826 cooperate with a separate set of six levers 4861–4866, each of these levers being secured to a separate sleeve 4867 which is in turn rotatable about a fixed shaft, as shown. Each of these six levers is urged in a counterclockwise direction by individual springs 4868, as shown.

Figure 16:
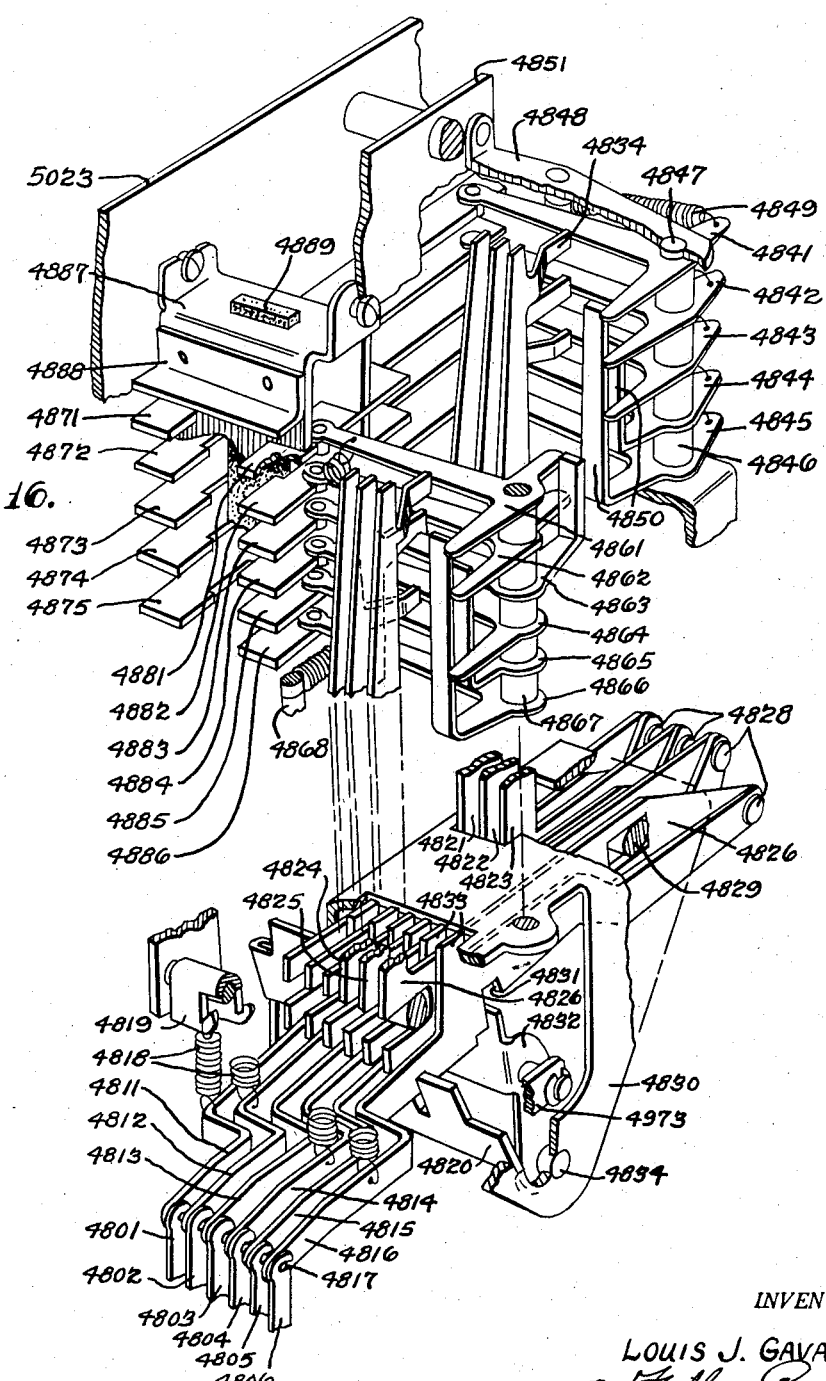
Fig. 16 is a perspective view of further typewriter printing control apparatus as viewed from a point above, rearward and to the left thereof.

As may be seen in Fig. 16 the three forwardly directed fingers on the upwardly extending arms of the slides 4824–4826 engage rightwardly extending arms of the three levers 4861, 4862 and 4864. The levers 4863, 4865 and 4866 have upwardly turned arms lying in the path of forwardly or rearwardly extending arms of the other three levers of this group and are selectively operated thereby.

The levers 4841–4845 are pivotally connected at the free ends of their rightwardly extending arms to respective slides 4871–4875, and the levers 4861–4866 are pivotally connected at the free ends of their rightwardly extending arms to another set of slides 4881–4886 respectively. The slides 4871–4875 and 4881–4886 are slidably supported in a boxlike construction 4887 and serve to control the positioning of the type box immediately prior to a printing operation. More particularly, the slides 4871–4875 serve to control the vertical positioning of the type box, while the slides 4881–4886 serve to control the horizontal positioning of the type box. A fixed bracket 4888 serves to control the vertical and/or horizontal positioning of the type box when all of the slides 4871–4875 and/or 4881–4886 are moved forwardly. A nylon pin 4889 extends vertically through the box 4887 and through notches in the sides of the slides 4871–4875 and 4881–4886 to limit movement of these slides.

Apparatus has now been described which serves to control the positioning of the type box, this apparatus culminating in the slides 4871–4875 for controlling the vertical positioning of the type box, and the slides 4881–4886 for controlling the horizontal positioning. The manner in which these slides control the positioning of the type box is explained below following a description of the drive means for the type box, and a description of the type box itself.

*Type box drive means*

Figures 17, 18:
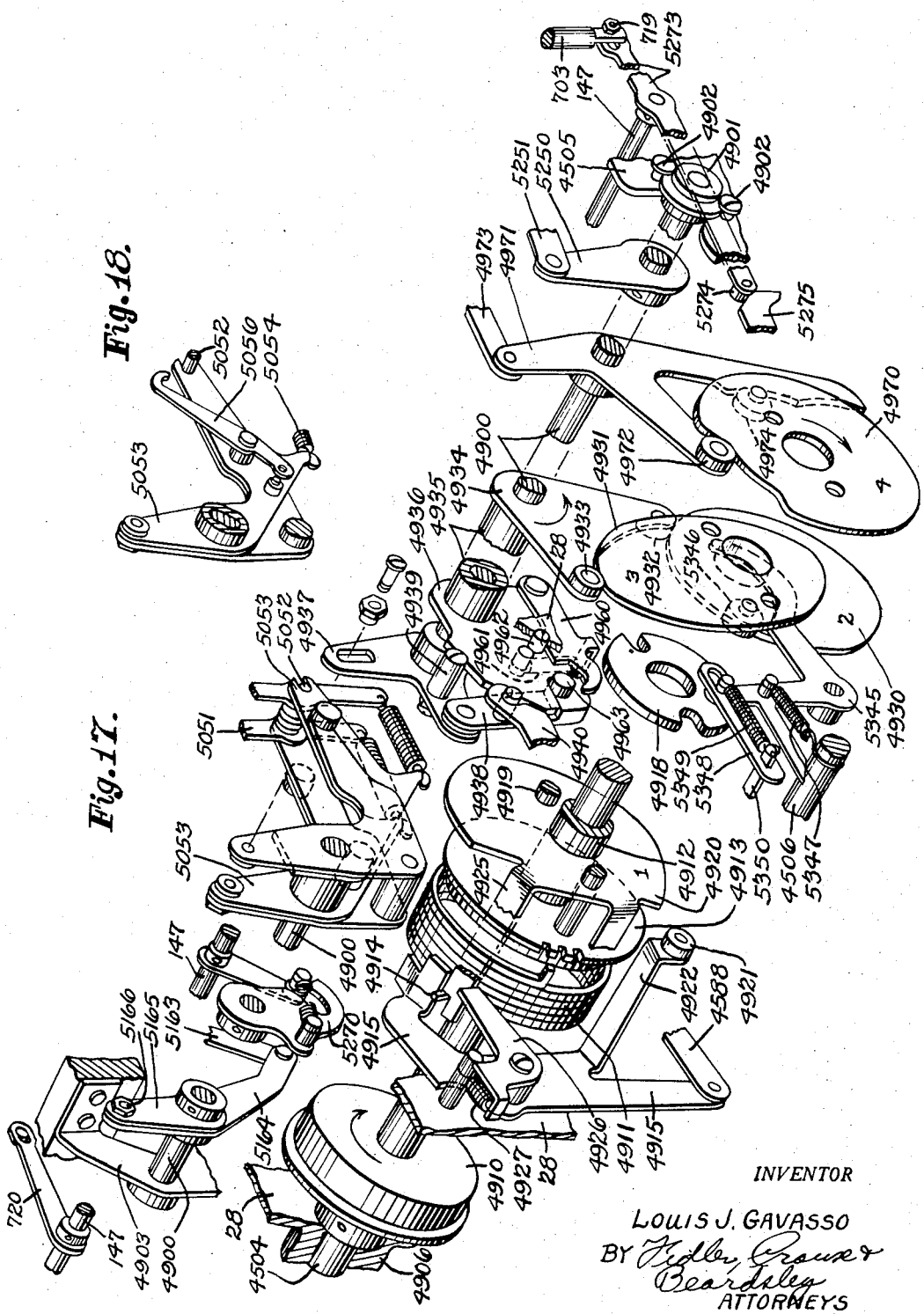
Fig. 17 is an exploded perspective view of certain drive apparatus as viewed from a point above, rearward and to the left thereof.
Fig. 18 is a smiilar view of one portion of the apparatus of Fig. 17.

The type box is driven from a shaft 4900 seen in Fig. 17. This shaft 4900 is rotatably supported at its outer end in a bearing 4901 mounted in a notch in the side wall 4505, as by a pair of screws 4902, and at its inner end by a bearing supported by a bracket 4903 secured to the cross bar 42 of the Butler machine.

Figure 19:
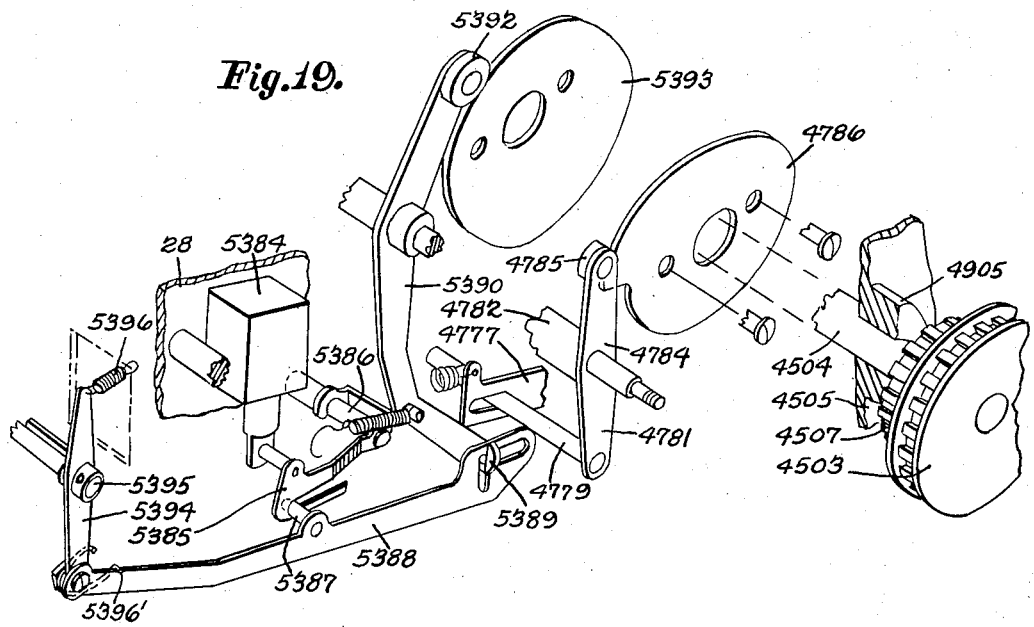
Fig. 19 is an exploded perspective view of certain drive apparatus as viewed from a point above, rearward and to the left thereof and is an extension of Fig. 17.
Figure 20:
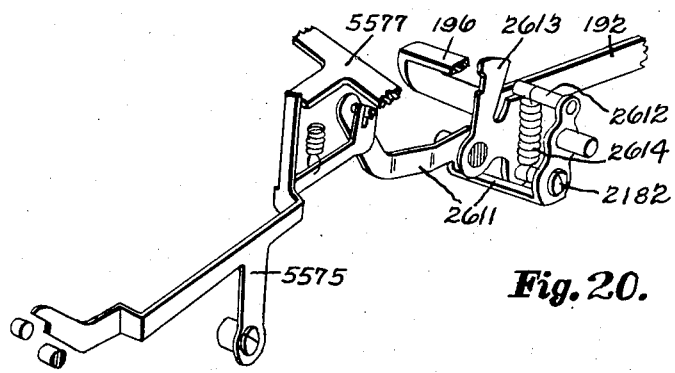
Fig. 20 is a perspective view of certain control apparatus as viewed from a point above, rearward and to the left of the machine.

Power for driving the shaft 4900 is derived from the previously mentioned shaft 4504, shown in Figs. 1, 17 and 19. The outer or left-hand end of the shaft 4504 carries the pulley wheels 4503 and 4507 as previously described, and is rotatably supported in a bearing 4905 secured to the side wall 4505. The shaft 4504 extends through an opening in the side wall 28 and is rotatably supported by a bearing 4906 secured to the inner side thereof.

A drum 4910 is fixed to the shaft 4504 adjacent the side wall 28, and a coil spring 4911 is wound thereabout. A sleeve 4912 is rotatably mounted on the shaft 4504 and has secured thereto a disc 4913 closely adjacent the drum 4910. The disc 4913 is notched to receive an outwardly turned end of the spring 4911 whereby rotation of the spring by the drum 4910 causes rotation of the disc 4913 and the sleeve 4912.

The spring 4911 tends to grip the periphery of the drum 4910 such that it may be rotated thereby. However, a radially outwardly turned end 4914 of the spring may be engaged by a leftwardly turned lug on a lever 4915 which is pivotally mounted on the side wall 28.

As may be seen in Fig. 17, the lower arm of the lever 4915 is pivotally connected to the rear end of the link 4588 which, as previously explained, serves to trigger an operating cycle of the typewriter printing apparatus. More specifically, the link 4588 extends forwardly to the typewriter keyboard where it is connected through the arm 4587 to the shaft 4586 and the lever 4585, all as previously described. When an operating cycle is triggered at the keyboard, the link 4588 moves forwardly and shifts the lever 4915 whereby its leftward extending lug is removed from the path of the upturned end 4914 of the spring 4911. This permits the right-hand coils of the spring to grasp the drum 4910 such that the drum may drive the spring and hence the disc 4913 and the sleeve 4912.

As previously explained, the link 4588 will be permitted to return to its normal rearward position prior to the end of an operating cycle. Accordingly when the upturned end 4914 of the spring 4911 returns to the position of Fig. 17, the lever 4915 will have returned to its normal position such that its leftwardly extending lug will lie in the path of the spring end 4914 and stop rotation of the spring 4911 with the drum 4910. It will be understood that as the spring bears against the lever 4915, it tends to expand and loosen its grip on the drum 4910.

A series of cams and suitable spacers 4918 are secured to the disc 4913, and hence to the sleeve 4912, by a pair of screws 4919 which pass through holes or slots in the cams and spacers, and are secured to the disc 4913. The first or inner cam 4920 operates against a roller 4921 on a leftwardly extending arm 4922 forming a part of the lever 4915. A high point on the cam 4920 engages the roller 4921 prior to the end of an operating cycle and drives the lever back to its spring-engaging position and pulls the link 4588 rearwardly. Referring again to Fig. 4, it will be seen that this permits the link 4588 to be retained in its rearward position through engagement of the forwardly extending arm of the lever 4585 with the upwardly turned end of the arm 4579, all provided that a repeat operation has not been called for.

The cam 4920 also has a rightwardly extending arm 4925 which is positioned to engage the rearward side of the radially outwardly turned spring end 4914. The arm 4925 cooperates with a pawl 4926 to prevent rebounding of the spring 4911 and associated parts at the end of an operating cycle. The pawl 4926 is pivotally mounted on the same pivotal axis as the lever 4915, and is spring-biased in a counterclockwise direction by a spring 4927 as shown. When the spring 4911, and hence the cam arm 4925, approach the end of an operating cycle, the cam arm 4925 wedges the pawl 4926 upwardly to permit passage of the arm thereunder. However, the pawl 4926 immediately springs back to its normal position under the influence of the spring 4927 and therefore prevents rebounding of the cam arm 4925, and hence of the spring 4911, the cam 4920 and the sleeve 4912.

It will now be seen that the sleeve 4912 may be made to turn through one complete revolution by actuation of the link 4588 from the keyboard, or the sleeve 4912 may be made to operate through two or more operating cycles, provided the repeat key 4590 is depressed such that the link 4588 may return to its forward position after the high point of the cam 4920 has passed the roller 4921 well in advance of the end of an operating cycle.

Twin cams 4930 and 4931 are secured to and driven by the sleeve 4912. These cooperate with the cam rollers 4932 and 4933 respectively, mounted on a lever 4934 which is secured to a sleeve 4935 rotatable on the shaft 4900. Reference to Fig. 17 reveals that as the sleeve 4912, and hence the cams 4930 and 4931, rotate in a counterclockwise direction through one revolution, the lever 4934 will be rotated first in a clockwise direction and then in a counterclockwise direction back to its starting point.

A plate 4936 is also secured to the sleeve 4935, and hence oscillates with the lever 4934. The plate 4936 transmits oscillatory motion to the shaft 4900 through a lever 4937 and through certain interruptible linkage. The lever 4937 is secured to the shaft 4900 through a suitable hub, and its rearwardly extending arm pivotally supports a link 4938. The lower end of the link 4938 has a thickened portion forming a dog engageable with a lower edge of the plate 4936.

The lever 4937 also carries a stud 4939 which is positioned to engage an upper edge of the plate 4936. Accordingly, the plate 4936 normally drives the lever 4937 and hence the shaft 4900 in a clockwise direction by its engagement with the link 4938, and in the return or counterclockwise direction by engagement with the stud 4939. However, this drive means may be interrupted by pivotal movement of the link 4938 such that it no longer engages the plate 4936.

The link 4938 may be drawn rearwardly out of engagement with the plate 4936 to interrupt the drive connection between the plate 4936 and the shaft 4900 on the occurrence of any of several events. In one such case the carriage may be moved to the right such that the left-hand end of the carriagt is beyond the typewriter printing position, in which case the operating cycle of the typewriter printing apparatus should be interrupted for obvious reasons. A second case involves the depression of the space bar, in which case the printing drive should be interrupted since no printing operation is to be effected. Other cases in which the drive is interrupted are described below.

In any such case the link 4938 is drawn rearwardly out of engagement with the plate 4936 by rearward movement of a slide 4940 seen in part in Fig. 17 and in its entirety in Fig. 15. The slide 4940 is slidably mounted on the side wall 28 through suitable pin and slot connections as shown, and at its forward end has a hook which engages a stud 4941 secured to the link 4938.

When the carriage is moved sufficiently far to the right that its left-hand end lies to the right of the typewriter printing apparatus, the carriage rack 1078, which normally overlies a roller 4942, moves beyond the roller to release it. The roller is rotatably supported in a lever 4943 which is pivotally mounted on a rod 4944 extending between the side wall 4505 and the side wall 28. A spring 4945 connected to a downwardly extending arm of the lever 4943 urges this lever in a counterclockwise direction such that the roller 4942 normally bears against the lower surface of the rack 1078. The downwardly extending arm of the lever 4943 also bears against the forward side of a stud 4946 secured to the slide 4940.

Accordingly, when the rack 1078 is moved to the right such that the roller 4942 is free thereof and the lever 4943 may be rotated in a counterclockwise direction by the spring 4945, the lever 4943 bears against the stud 4946 and draws the slide 4940 rearwardly against the action of a spring 4947 which urges the slide 4940 forwardly. Such rearward movement of the slide 4940 pivots the link 4938 rearwardly and out of engagement with the plate 4936 whereby the plate 4936 may not drive the lever 4937 and the shaft 4900.

The slide 4940 is also moved rearwardly to interrupt the drive in the event that the space bar 4600 is depressed. The seventh coding slide 4657 of Fig. 14 has a tooth for each key lever other than the special key lever for the space bar. Accordingly, when the space bar is depressed, and only when the space bar is depressed, the coding slide 4657 may be moved to the left by the corresponding lever 4667, the corresponding code slide 4777 and the associated spring 4780. When the coding slide 4777, Fig. 15, is thus permitted to move rearwardly a stud 4950 adjacent its rearward end is caused to ride into a recess in the hooked end of an arm 4951. This arm is pivotally mounted on a stud 4952 supported by the side wall 4505. The arm 4951 is integral with a bail portion 4953 and with a second, upwardly extending arm 4954 also pivotally supported on the stud 4952. The upper end of the arm 4954 carries a stud engaged in a slot in an arm 4955 which is bent at its lower end to form a bail pivotable on a stud 4956 secured to the side wall 28. The upper end of the arm 4955 is urged rearwardly by a spring 4957, secured at its rearward end to a spacing stud 4506, and engages the forward side of a leftwardly bent lug on the rear end of the slide 4940.

Accordingly, when the slide 4777 moves rearwardly carrying the stud 4950 into the recess of the hooked end of the arm 4951, the arm 4951 may pivot forwardly and the arms 4954 and 4955 may pivot rearwardly all under the influence of the spring 4957 such that the slide 4940 is moved rearwardly and the link 4938 is pivoted rearwardly out of engagement with the plate 4936. Thus, depression of the space bar 4600 interrupts the drive for the printing mechanism.

When the link 4938 is not pivoted rearwardly by any of the conditions referred to immediately above it is of course desired that it remain in drive connection with the plate 4936 throughout the operating cycle. In order to assure that the link 4938 will not fall clear of the plate 4936, an arm 4960 is pivotally mounted on the plate 4936 and its rearward end is biased upwardly by a spring 4961.

Upward movement of the rearward end of the arm 4960 is limited by its engagement with a stud 4962 secured to the side wall 28 such that a rearward hooked end of the arm 4960 is normally disengaged from a stud 4963 on the lower end of the link 4938. This permits the link 4938 to be moved rearwardly by the slide 4940. However, once the plate 4936 drives the link 4938 a short distance downwardly, the stud 4963 engages the hooked rearward end of the arm 4960 whereby the stud 4963 is held forwardly and the link 4938 is held in engagement with the plate 4936. When the shaft 4900 returns the plate 4936 back to its raised position at the end of an operating cycle the arm 4960 follows the stud 4963 upwardly until it again strikes the fixed stud 4962. The stud 4963 then breaks contact with the hooked rearward end of the arm 4960. Upon completion of the operating cycle the stud 4963 is free of the arm 4960 whereby the link 4938 may be pivoted rearwardly by the slide 4940 to break the drive connection upon occurrence of any of the conditions referred to above.

Another cam 4970 driven with the sleeve 4912 effects operation of the blade 4832 of Fig. 16 which moves the slides 4811–4816 first forwardly and then rearwardly. A lever 4971 is pivotally supported by the shaft 4900 and carries a cam roller 4972 on a rearwardly extending arm, which cam roller cooperates with the cam 4970. A link 4973 is pivotally secured to an upwardly extending arm of the lever 4971 and extends forwardly to the blade 4832 of Fig. 16 where it is pivotally connected thereto through a suitable stud.

When the sleeve 4912 and the cam 4970 rotate through 360° during an operating cycle of the typewriting apparatus, the lever 4971 is first moved in a counterclockwise direction as the cam roller 4972 rides up onto the extended, raised portion of the cam 4970. This moves the link 4973 and the blade 4832 of Fig. 16 forwardly. Near the end of the operating cycle a stud 4974 secured to the cam 4970 bears against the rearward edge of a downwardly extending arm on the lever 4971 to force the lever 4971 in a clockwise direction. This pulls the link 4973 rearwardly and moves the blade 4832 rearwardly to its normal position. It is through these drive means that selected ones of the slides 4811–4816 and associated slides and levers are actuated.

The previously mentioned cam 4786 which operates the bail 4779 and selected slides 4771–4777 of Fig. 15 is also driven through the clutch 4910–4911 as shown in Fig. 19.

It has now been explained that the continuously rotating power shaft 4504 may, upon selective operation of control apparatus, be made to oscillate the shaft 4900 first clockwise and then counterclockwise. This oscillation of the shaft 4900 is employed to drive the type box and the printing hammer all as is explained below.

*Type box and associated drive and control apparatus*

The type box 5000 includes a rearward case portion 5001 and a forward case portion 5002 which, between them, form the six sides of the type box, as shown in Fig. 21. Type bars 5003 extend through aligned slots in the forward and rearward surfaces of the type box and are biased forwardly by suitable springs 5004. A separate bar 5003 is of course employed for each character which it is desired to be printed by the typewriter printing apparatus. With the type bars and springs properly mounted in the type box, the rearward and forward case portions may be locked in assembled position by any suitable means such as a U-shaped member 5005 which extends through openings in the forward and rearward walls of the case box and may be peened, staked or otherwise deformed to hold the case members securely together.

The assembled type box is supported by a T-shaped member 5006 having a rearwardly bent flange 5007 at its upper end. An L-shaped bracket 5008 is secured to the bottom of the flange 5007 as by screws or rivets and a similar L-shaped bracket is slidably secured to the bottom of the other end of the flange 5007 through a suitable slot and pin arrangement as shown. On each end of the type box 5000 there are a pair of studs 5010 which are arranged to engage in holes and slots in the upwardly extending arms of the brackets 5008 and 5009. It will be seen that the type box 5000 may be held in position on the flange 5007 when the bracket 5009 is moved inwardly to the position illustrated in Fig. 22, and that the type box may be removed from its support 5006 when the bracket 5009 is moved outwardly a sufficient distance to clear the studs 5010.

The bracket 5009 may be held securely inwardly by a toggle lever 5011, seen in Fig. 22, which is pivotally supported on a leftwardly extending arm of the type box support 5006. The lever 5011 may be moved manually in a counterclockwise direction to release the bracket 5009 and the type box 5000, and may be moved in a clockwise direction such that its rightwardly extending arm bears against the bracket 5009 and forces it to the right to a type box locking position. A spring 5012 resiliently maintains the lever 5011 in either released or locking position.

Secured to the rear of the T-shaped support 5006 is a plate 5015 having four studs 5016 extending rearwardly therefrom. These studs support rollers 5017 seen in Fig. 22 and the rearward or free ends of the studs are locked together by suitable links 5018 in the interest of greater rigidity. Each of the two pairs of vertically displaced rollers 5017 is arranged to engage the upper and lower surfaces of a bar 5020 whereby the type box is vertically positioned by the bar 5020 but may roll along the length thereof.

Figure 28:
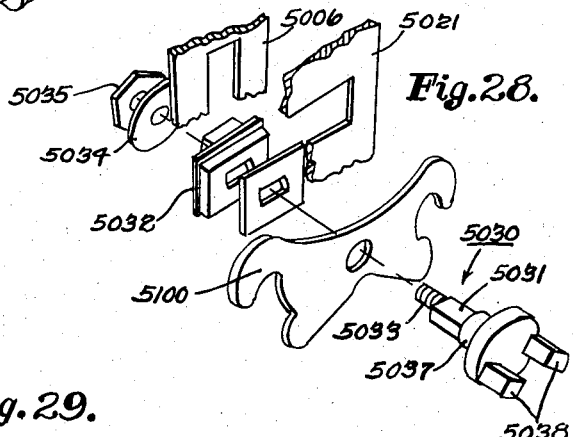
Fig. 28 is an exploded perspective view of a portion of the apparatus of Fig. 27 as viewed from the same angle.

The type box support 5006 and hence the type box 5000 are supported against pivotal movement about the bar 5020 by a frame member 5021 which is secured to opposite side walls 5022 and 5023 which are secured to cross-bar 41 and generally house the typewriter printing apparatus. The type box support 5006 is slidably secured to the frame member 5021 through apparatus best seen in Fig. 28. This includes a pin 5030 having a rectangular shank portion 5031 arranged to fit within a small plate 5032 and having a threaded portion 5033 arranged to extend through a large washer 5034 and to receive a nut 5035. The small plate 5032 has a rearward rectangular portion arranged to fit snugly but slidably within a slot in the frame member 5021. It also has a forward rectangular portion for fitting snugly but slidably within a slot in the type piece support 5006. A flange intermediate the forward and rearward rectangular portions of the plate 5032 is larger than the width of either of the slots and spaces the elements 5006 and 5021 apart to prevent any improper interlocking of the various parts. The pin 5030 also has a round shank 5037 and forwardly extending square cornered prongs 5038 whose functions are explained subsequently.

It will now be seen that the type box 5000 may roll to the left and right along the bar 5020 as permitted by the sliding connection between the support 5006 and the frame member 5021. The same sliding connections will permit vertical movement of the support 5006 and the type box 5000 upon vertical movement of the bar 5020. Such vertical movement of the bar 5020 is explained immediately below.

Opposite ends of the bar 5020 are secured to corresponding arms 5040 by suitable nuts as seen in Fig. 22. Each of the arms 5040 is connected for vertical sliding movement with one of the side plates 5022 or 5023 through pin and slot connections. Each of these side walls has two vertical slots as shown and each of the arms 5040 has an upper pin 5041 and a lower pin 5042 secured thereto and extending through one of these slots. Each of the pins 5041 and 5042 has an enlarged portion bearing against the outer surface of the corresponding side wall 5022 or 5023 and a narrower portion extending through one of the slots in the corresponding side wall and, finally, a second enlarged portion which rides against the inner surface of the corresponding side wall. The latter, enlarged portion is a separate collar as indicated in the right-hand portion of Fig. 23 wherein a similar construction is shown in an exploded view.

Figure 27:
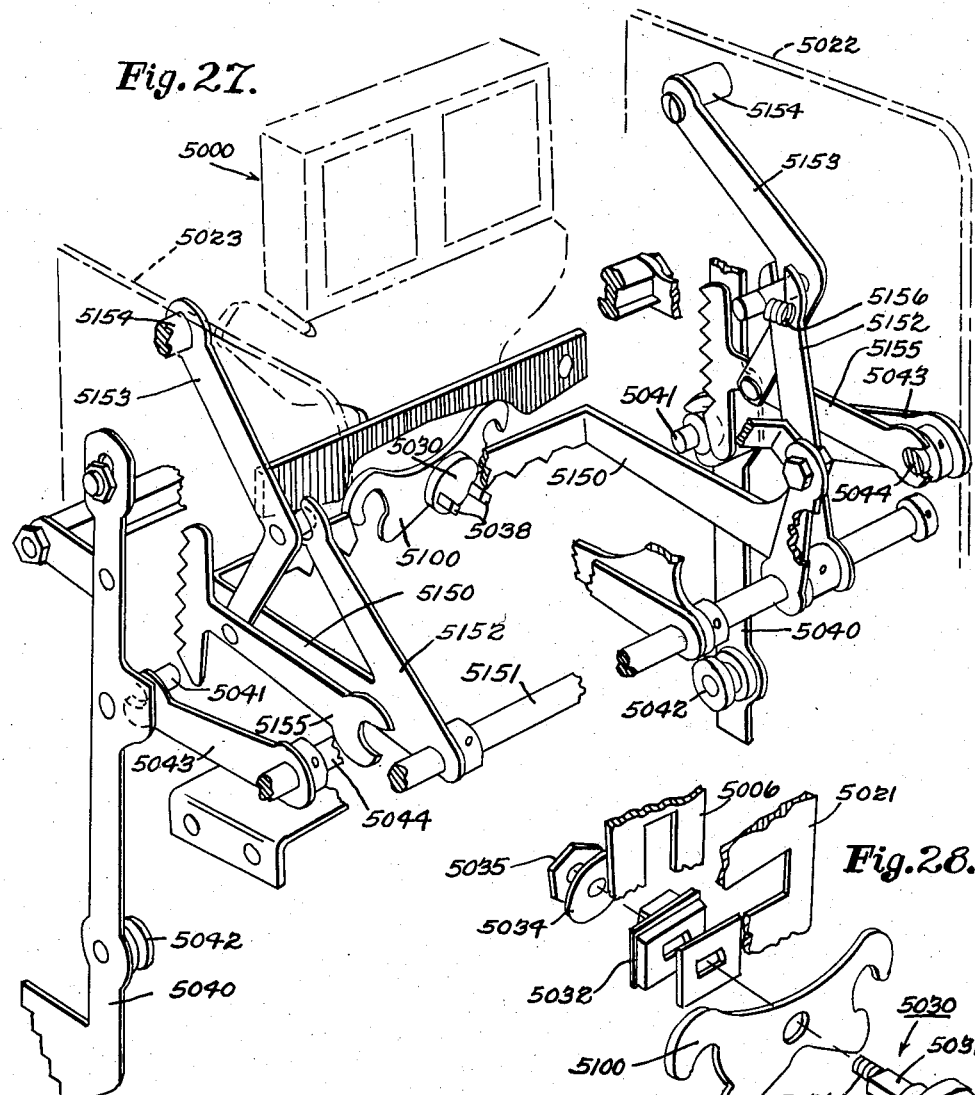
Fig. 27 is a perspective view of certain type box control apparatus as viewed from a point above, forward and to the left thereof.

The enlarged inner portion or collar of the upper pins 5041 receive the forked ends of arms 5043 seen best in Fig. 27. These arms are secured to a shaft 5044 which is rotatably supported on the side walls 5022 and 5023. The purpose of the arms 5043 is to help maintain the arms 5040 at the same height as they slide vertically on the side plates and hence to maintain the bar 5020 in a horizontal position at all times. Such support is desirable since power for raising and lowering the type box 5000 is applied only to the left-hand arm 5040 as will now be described in detail.

Pivotally secured to the left-hand arm 5040 through the stud 5041 is a pawl 5050, seen in Fig. 22. A push rod or link 5051 is pivotally secured to the downwardly extending arm of the pawl 5050 through a suitable pin. The push rod 5051 is secured to a stud 5052 which is in turn supported in the forward forked ends of a pair of levers 5053 shown in Figs. 23 and 17, which are secured to the previously described oscillating shaft 4900. Each of the levers 5053 is preferably in two parts, one being secured to the shaft 4900 and the other being pivotable thereon and connected to the push rod 5051. The two parts are connected by a suitable eccentric, all as shown in Fig. 18, such that the elevation of the push rod 5051 with respect to the angular position of shaft 4900 may be accurately adjusted.

A tension spring 5054 is connected to the lower end of the push rod 5051 at a point below the stud 5052 and its rearward end is connected to a downwardly extending arm of the right-hand lever 5053. The spring 5054 urges the push rod 5051 to rotate in a counterclockwise direction whereby the upper end of the push rod 5051 is biased forwardly to the point at which an upwardly extending ear on the push rod 5051 engages a stud 5055 secured to the pawl 5050. In this position of the push rod 5051 and the pawl 5050 these two elements are toggled, whereby upward movement of the push rod 5051 will cause upward movement of the pawl 5050, the arms 5054 and hence the type box 5000. Such upward movement of the push rod 5051 is induced by clockwise rotation of the power shaft 4900 during the first portion of an operating cycle of the printing apparatus, following which the push rod 5051 is again drawn downwardly by counterclockwise rotation of the power shaft 4900 during the second portion of the operating cycle.

The stud 5052 to which the push rod 5051 is secured is prevented from slipping forwardly out of the forked ends of the arms 5053 by a latch 5056 which is pivotally mounted on a pin 5057 connected between the two arms 5053. The rearward end of the latch 5056 is releasably secured to the rearward end of the left-hand lever 5053 through a suitable connecting pin 5058. The rearward end of the latch 5056 may readily be sprung sideways to the right to release its connection with the left-hand lever 5053 whereby the forward end of the latch 5056 may be raised to release the stud 5052.

Means have now been shown whereby the power shaft 4900 may supply the power necessary to raise the type box 5000 during the first portion of an operating cycle and to return the type box to its normal, lower position during the second portion of an operating cycle.

The height to which the type box is raised during the first portion of the operating cycle is controlled by the coding slides 4871–4875 shown in detail in Fig. 16 and shown in phantom lines in Fig. 22. Assuming that a selected one or more of the coding slides 4871–4875 have been left in their rearward positions they will lie in the vertical path of the pawl 5050 and of a forwardly protruding shoulder 5060 on the arm 5040. The pawl 5050 extends above the shoulder 5060 when in its operating position illustrated in Fig. 22 and accordingly it will engage the first rearwardly extending coding slide 4871–4875 prior to engagement thereof by the shoulder 5060. When the pawl 5050 thus engages a rearwardly extending coding slide, further upward movement of the push bar 5051 causes counterclockwise rotation of the pawl 5050 with the result that the toggle joint formed by the pawl 5050 and the push bar 5051 is broken. Further upward movement of the push bar thereafter merely causes further counterclockwise rotation of the pawl 5050 and leaves the arms 5040 and hence the type box 5000 at the elevation attained at the time the toggle joint was broken. Engagement of the shoulder 5060 with the same rearwardly extending coding slide positively limits further upward movement of the arms 5040 and the type box 5000.

It will be apparent that as soon as the toggle joint formed by the pawl 5050 and the push bar 5051 is broken, the weight of the type box 5050 and associated parts can no longer be carried by the push bar 5051 and hence the type box must be supported at its maximum attained height by other means. For this purpose the lower rearward edge of the left arm 5040 is provided with a series of notched steps, one step for each horizontal row of type bars 5003 in the type box 5000. A lever 5065 is arranged immediately to the rear of the arm 5040 and has a pin and slot connection with the left side wall 5023 as shown in Fig. 22.

A spring 5066 is connected at one end to a stud secured to the side wall 5023 and at its other end to a stud in the rearwardly extending arm of the lever 5065, the spring thereby urging the lower end of the downwardly extending arm of the lever 5065 forwardly. A shoulder on the lower end of the lever is thereby urged forwardly such that it tends to move under the successive steps at the lower end of the arm 5040 and thereby serves to maintain the arm 5040 and hence the type box 5000 at its maximum attained elevation.

The lever 5065 operates under the influence of a stud 5067 extending rightwardly from the lever 5053 as seen in Fig. 23. During the first portion of the operating cycle the stud 5067 is carried upwardly by the lever 5053 and ultimately engages a downwardly facing shoulder on the arm 5065. The stud 5067 then continues upwardly, raising the lever 5065 as permitted by its pin and slot connection with the left side wall 5023. Prior to this time the shoulder on the lower end of the lever 5065 will have engaged a selected one of the steps on the lower end of the left-hand arm 5040, depending upon the maximum height attained by the arm 5040 as determined by the coding slides 4871–4875.

Continued upward movement of the stud 5067 and hence of the lever 5065 to an accurately determined height raises or maintains the arm 5040 to or at a selected one of six accurately determined heights such that the shoulder 5060 on the arm 5040 lies immediately below the selected coding slide. In actual practice it has been found that the shoulder 5060 may be brought within .010″ of the operative coding slide without actually jamming the shoulder 5060 against the coding slide. Accordingly, the level of the arm 5040 and hence of the type box 5000 may be very accurately controlled in any one of its six operating levels. The printing operation preferably takes place while the stud 5067 maintains the lever 5065 and hence the arms 5040 and the type box 5000 at its selected height. Still further means, subsequently to be described, are provided, first, for accurately positioning the right-hand arm 5040 and hence the right-hand end of the bar 5020 to correct for any error resulting from any flexibility of the type box supporting structure and, secondly and alternatively, to position both arms 5040 still more accurately than may be possible through the use of the lever 5065 alone. Such apparatus is described below in connection with the horizontal positioning of the type box.

When the shaft 4900 returns counterclockwise to its normal or initial position the stud 5067 permits the lever 5065 to drop to its lowermost position as determined by its pin and slot connection with the left side wall 5023, and bears against the forward edge of the lever 5065 to cam the lever rearwardly such that the shoulder near the lower end of the lever 5065 is withdrawn from operative engagement with the steps on the lower end of the left-hand arm 5040. Accordingly, the arms 5040 and the type box 5000 are allowed to drop to their lowermost or normal positions.

Horizontal positioning of the type box 5000 is accomplished through apparatus best seen in Fig. 24. Rotatably supported on the round shank portion 5037 of the pin 5030 shown in Fig. 28 and previously referred to, is a rocker arm 5100 which is normally rocked to its counterclockwise position but which may be rocked to its clockwise position all by apparatus subsequently to be described. On each lateral end of the rocker arm 5100 there is a hook-like formation engageable with respective studs on the lower ends of a pair of levers 5101 which are pivotally supported on the frame member 5021 as seen in Fig. 24.

The upper, inwardly extending arms of these levers are pivotally connected to respective links 5102 whose lower ends are pivotally connected to a stud 5103 secured to an arm 5104. The arm 5104 is secured to a sleeve 5105 rotatably supported on a shaft 5106 which is secured between the frame member 5021 and a forward frame member 5107.

Also secured to the sleeve 5105 is an arm 5108 which extends leftwardly through a slot in the left side wall 5023. At its left-hand end the arm 5108 carries a stud engaging the forked rightwardly extending end of a bracket secured to a vertically slidable arm 5110. The arm 5110 is very similar to the previously described arms 5040 and is slidably supported in the side wall 4851 through pin and slot connections similar to those for the arms 5040. The arm 5110 also carries a pawl 5112 similar to the pawl 5050 and is operated by a push bar 5113 similar to the push bar 5051 all as seen in Fig. 22. The push bar 5113 is connected to the same stud 5052 as is the push bar 5051 and its lower end is urged rearwardly by a spring 5114. The push bar 5113 is operated at the same time and in the same manner as is the push bar 5051.

The pawl 5112 is arranged to engage any rearwardly extending one of the coding slides 4881–4886, the pawl 5112 extending upwardly beyond a shoulder 5115 on the upper end of the arm 5110.

Associated with the arm 5110 is a lever 5120 mounted on the side wall 4851 for limited vertical sliding movement by a pin and slot connection as shown in Figs. 22 and 23. The lower end of the lever 5120 is biased forwardly by a spring 5121 and carries at its lower end, an upwardly facing shoulder for engaging any one of a series of seven steps on the lower rearward edge of the arm 5110.

All of these parts operate in the same manner as do the previously mentioned arm 5040, the push bar 5051, the lever 5065 and other associated parts which control the vertical positioning of the type box 5000. However, in the case of the arm 5110 which controls the horizontal positioning of the type box, there are six coding slides 4881–4886 plus the fixed plate 4888 with the result that there are seven different horizontal positions for the type box and seven steps on the lower rearward edge of the arm 5110.

The limited and controlled upward movement of the arm 5110 as controlled by the coding slides 4881–4886 is transmitted to the left-hand end of the arm 5108 of Fig. 24. This pivots the arm 5104 clockwise through a selected and accurately controlled angle. This in turn draws the links 5102 downwardly and swings the lower ends of the levers 5101 outwardly. Assuming that the rocker arm 5100 is rocked to its normal counterclockwise position, its left-hand hooked end will be in engagement with the stud at the lower end of the left-hand lever 5101 such that the rocker arm will be drawn to the left a selected and accurately controlled distance as determined by the coding slides 4881–4886. This in turn draws the plate 5032 of Fig. 28 and hence the type box support 5006 and the type box 5000 to the left to align one vertical column of the type bars 5003 with the printing hammer subsequently to be described.

It will be noted in Fig. 22 that there are two sets of seven vertical rows of type bars 5003. Any one of the seven vertical rows of type bars in the right-hand group (the left-hand group as viewed in Fig. 22) may be selected when the rocker arm 5100 is in its normal counterclockwise position illustrated in Fig. 24 wherein it engages the stud on the lower end of the left-hand lever 5101.

In order to select one of the seven vertical rows in the left-hand group of type bars for printing it is necessary that the rocker arm 5100 be rocked to its clockwise position wherein it engages the stud on the lower end of the right-hand lever 5101. In such case counterclockwise movement of the right-hand lever 5101 draws the rocker arm to the right a selected and accurately controlled distance as determined by the coding slides 4881–4886 to move a selected vertical column of typing bars 5003 of the left-hand group into a position in front of the printing hammer subsequently to be described.

Such rocking of the rocker arm 5100 is controlled by a shift key 5130, shown in Fig. 4. The shift key 5130 carries a stud 4560 identical to those on the other keys 4541, the stud being engageable with the upper edge of a special key lever 5131.

This special key lever is pivotally mounted on the shaft 4556 and the forked end of its upwardly extending arm engages a stud 5132 extending through a slot in the side wall 4552 and secured to the upper end of an arm 5133 outside the side wall. The arm 5133 is pivotally mounted on the shaft 4556 and is integral with a yoke portion and a second upwardly extending arm 5134. Pivotally secured to the upper end of the arm 5134 is the forward end of a link 5135 which extends rearwardly therefrom.

The rearward end of the link 5135 may be seen in Fig. 24 where it is shown connected to the rightwardly extending arm of a lever 5136 which is pivotally secured to a bracket fastened to the side wall 28. A rearwardly extending arm of the lever 5136 bears against a slide 5137 which is mounted on the cross bar 41 for sliding movement to the left and to the right through suitable pin and slot connections.

The right-hand end of the slide 5137 has an upwardly opening forked construction receiving the forward end of a lever 5138 which is pivotally mounted on the frame member 5107. The rearward end of the lever 5138 carries an upwardly extending arm, best seen in Figs. 25 and 26. A roller 5139 is rotatably mounted on the upper end of the upwardly extending arm of the lever 5138 in a position to engage lower left and right-hand cam edges of the rocker arm 5100.

When the shift key 5130 of Fig. 4 is in its normal raised position, the link 5135 is in its rearward position whereby the slide 5137 is permitted to move to the left under the influence of a spring 5140 which acts on the rearward end of the lever 5138. This places the roller 5139 under the right-hand lower cam edge of the rocker arm 5100 and tilts the rocker arm counterclockwise such that its left-hand hooked end engages the stud secured to the lower end of the left-hand lever 5101.

Accordingly, operation of the horizontal positioning apparatus for the type box moves the type box to the left such that a selected one of the right-hand group of vertical columns of type bars is positioned in front of the printing hammer.

When the shift key 5130 of Fig. 4 is depressed, the link 5135 is drawn forwardly, pivoting the lever 5136 of Fig. 24 clockwise and forcing the slide 5137 to the right. This moves the roller 5139 under the left-hand lower cam edge of the rocker arm 5100, all against the action of the spring 5140. The rocker arm 5100 is thus tilted clockwise such that its right-hand hooked end engages the stud in the lower end of the right-hand lever 5101. Accordingly, operation of the horizontal positioning apparatus for the type box causes movement of the type box to the right to arrange a selected one of the seven vertical columns of the type bars in the left-hand side of the type box in alignment with the printing hammer.

Means are also provided to assure that the lever 5138 and hence the rocker arm 5100 will remain in their selected positions throughout an operating cycle of the machine. For this purpose a plate 5141 is secured to the forward side of the frame member 5021 immediately above the rocker arm 5100. The lower edge of the plate 5141 serves as a cam to maintain the rocker arm in either of its tilted positions after it has been moved a short distance to the right or left. Earlier in an operating cycle the rocker arm 5100 is locked in its tilted position (clockwise or counterclockwise) through a small cam 5142 which is secured to the forward side of the rearward upwardly extending portion of the lever 5138. The cam 5142 is arranged immediately below the pin 5103 which ties the arm 5104 to the links 5102. When horizontal positioning of the type box 5000 is instigated, the pin 5103, as it swings downwardly, passes to either side of the cam 5141, depending upon the condition of the shift key 5130, and retains the lever 5138 in its selected position substantially throughout the printing cycle.

It will be seen that the sides of the cam 5141 are arcuate to match the path of the pin 5103 as it pivots about the shaft 5106. It will be noted furthermore that the left and right-hand lower cam edges of the rocker arm 5100 are sufficiently extended that as the rocker arm and the type box are moved in either direction, the selected cam edge of the rocker arm will remain in contact with and be supported by the roller 5139 until the left or right upper edge of the rocker arm is engaged by the lower edge of the plate 5141.

Means are preferably employed for locking the type box in its selected position after horizontal movement to bring the selected vertical column of type bars in alignment with the printing hammer. Associated apparatus may also more accurately position and lock the type box in its selected vertical position to assure that the selected horizontal row of type bars is accurately positioned and maintained in alignment with the printing hammer, as suggested above.

Figure 29:
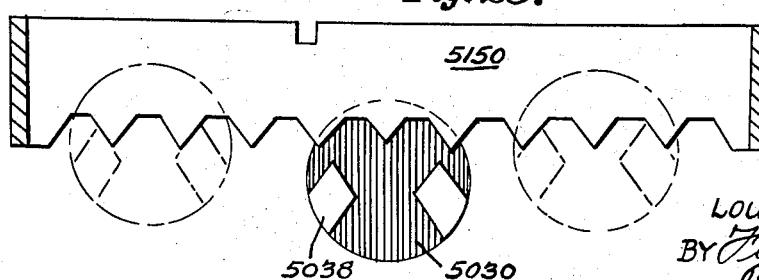
Fig. 29 is a front elevational view of certain of the apparatus of Fig. 27.

A yoke 5150 may be seen in Fig. 27 secured to a shaft 5151 which is rotatably mounted in the side walls 5022 and 5023 of the typewriter printing apparatus. When the yoke 5150 is lowered, spaced apart teeth on the lower edge of the rearward member thereof may engage the upper square-cornered edges of the prongs 5038 previously described in connection with Fig. 28. An enlarged view showing various positions of the pin 5030 and its prongs 5038 as the rocker arm 5100 is moved to the right or left by the type box horizontal positioning apparatus, is shown in Fig. 29. The positions of the pin 5030 suggested by the phantom lines in Fig. 29 illustrate that the prongs 5038 may engage the outer edges of two adjacent teeth on the yoke 5150 as shown at the left, or may engage the inner edges of two teeth spaced apart by one tooth. This provides a large number of positions of the pin 5030 in which the pin may be locked by the yoke 5150. The teeth on the yoke 5150 are, of course, so spaced that when the yoke 5150 locks the prongs 5038, and hence the pin 5030, in a selected position, the pin 5030, and hence the type box 5000, are necessarily arranged in precise position for a printing operation.

When the shaft 5151 rotates in a clockwise direction to move the teeth on the yoke 5150 downwardly into locking position with respect to the prongs 5038, it also moves other type box locking apparatus into locking position to position and maintain the type box accurately in its selected vertical position. For this purpose the yoke 5150 is provided with a pair of arms 5152 which extend diagonally upwardly and rearwardly from the shaft 5151. The rearward and upward forked ends of the arms 5152 receive studs secured to a pair of levers 5153 which are pivotally mounted on studs 5154 secured to the respective side walls 5022 and 5023.

The levers 5153 extend downwardly and rearwardly from their point of engagement with the forked ends of the arms 5152 and, at their lower ends, pivotally support the rearward ends of corresponding locking members 5155. The locking members 5155 have forked forward ends which receive the shaft 5151 whereby they may pivot freely with respect to that shaft and may also slide rearwardly without disengaging therefrom. A spring 5156 is connected to the right-hand lever 5153 to urge it toward its forward or released position.

It will now be seen that when the shaft 5151 rotates in a clockwise direction to lower the yoke 5150 into locking engagement with the prongs 5038, the arms 5152 will depress the levers 5153, and the locking members 5155 will be thrust a short distance rearwardly while remaining in engagement with the shaft 5151, all against the action of the spring 5156. The rearward ends of the locking members 5155 have rearwardly facing teeth which are engageable with the pins 5041 and the arms 5040 when they are thus thrust rearwardly.

In accordance with one embodiment of the invention, the left-hand locking member 5155 may be eliminated, in which case the principal function of the right-hand locking member 5155 would be to assure proper vertical positioning of the right-hand arm 5040 in spite of flexibility of the type box supporting structure, particularly as to vertical flexibility between the right and left-hand arms 5040. In other words, if the weight of the type box 5000 and other associated parts causes sagging of the right-hand arm 5040 when the left-hand arm 5040 raises the structure, the right-hand locking member 5155, upon engaging the upper right-hand pin 5041, will bring the type box and its supporting structure into a true relationship. In another embodiment of the invention, two locking members 5155 may be employed as shown in Fig. 27. In such case, both of the arms 5040 may be brought into a more precise vertical position than may practically be attained where full reliance is placed on the precise raising of the arm 5065 of Figs. 22 and 23 by the stud 5067.

Power for actuating the shaft 5151 is transmitted through a sleeve 5161 (Fig. 30) rotatably supported on a shaft 5160 which is secured in auxiliary side plates 5180 and 5181, subsequently described. An arm 5162 is secured to the left end of the sleeve 5161 and is pivotally connected to a link 5163. The lower rearward end of the link 5163 may be seen in Fig. 17 where it is shown pivotally connected to a lever 5164. The lever 5164 is freely pivotable on the shaft 4900 and is connected to an arm 5165 which is secured to the shaft 4900. The connection between the lever 5164 and the arm 5165 is through an eccentric 5166 which may be rotated manually to adjust the angle between the arms and the lever.

Figure 30:
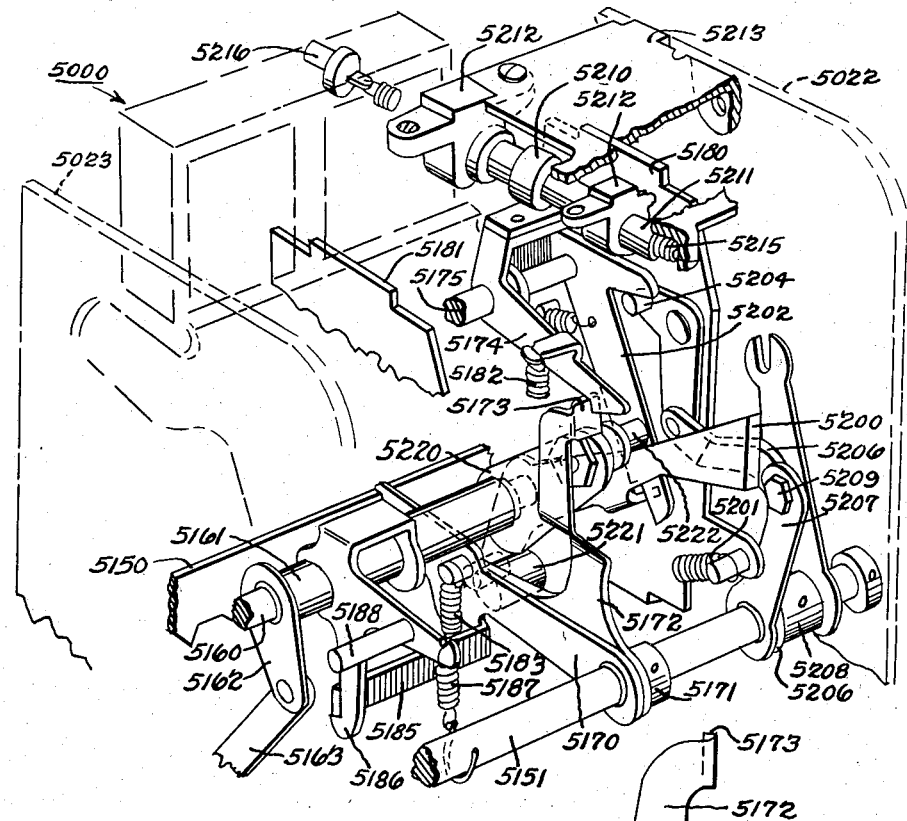
Fig. 30 is a perspective view of the printing hammer and associated control apparatus as viewed from a point above, forward and to the left thereof.

It will now be seen that during the first portion of the printing cycle the shaft 4900 will rotate the lever 5164 in a clockwise direction to raise the link 5163 and rotate the sleeve 5161 of Fig. 30 in a clockwise direction. During the second portion of the operating cycle the sleeve 5161 will, of course, be returned in a counterclockwise direction to its original position.

An arm 5170, seen in Fig. 30, is secured to the shaft 5151 through a hub 5171. The hub 5171 has an annular recess immediately adjacent the arm 5170 whereby a lever 5172 may be pivotally supported thereby. An upwardly extending arm on the lever 5172 has a rightwardly bent lug 5173 which is normally engaged by a latch 5174 pivotally mounted on a short shaft 5175 secured between two inner walls 5180 and 5181 of the typewriter printing structure. These inner walls are rigidly supported within the outer walls 5022 and 5023 in the positions shown in Fig. 30. A spring 5182 engages a leftwardly bent lug on the latch 5174 and urges it downwardly. It will therefore be seen that the latch 5174 is normally in latching engagement with the lug 5173 and hence the lever 5172.

Figure 31:
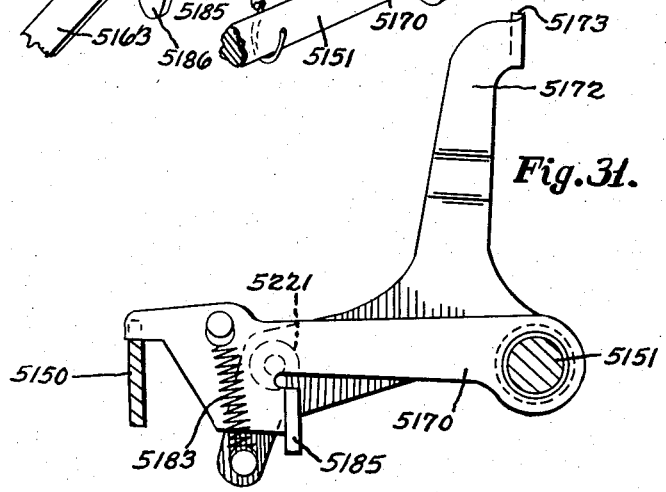
Fig. 31 is a left-side elevational view of a portion of the apparatus of Fig. 30.

As best seen in Fig. 31, a spring 5183 is connected between studs secured respectively to the arm 5170 and a rearwardly extending arm of the lever 5172. Accordingly, it will be seen that when the lever 5172 is retained in its clockwise position, the spring 5183 is tensioned to urge the arm 5170 downwardly. Since the arm 5170 is secured to the same shaft 5151 to which the yoke 5150 is connected, and since the rearward end of the arm 5170 is furthermore connected to the yoke 5150 as shown, the spring 5183 urges the yoke 5150 and the locking members 5155 toward their type box locking positions. It should be noted that the spring 5183 is sufficiently strong to overcome the spring 5156 of Fig. 27 which urges the type box locking devices toward their normal or released positions.

Such downward movement of the arm 5170 under the influence of the spring 5183 is normally prevented by a leftwardly extending lug 5185 integral with the arm 5170 and normally engaging a latch lever 5186 which is secured to the sleeve 5161 and urged in a counterclockwise direction by a spring 5187 as shown. The forwardly extending arm of the latch lever 5186 carries a leftwardly extending stud 5188 which lies in the path of the arm 5162. Accordingly, when a printing cycle is instigated, the arm 5162 strikes the stud 5188 near the end of the first portion of the operating cycle and pivots the latch lever 5186 clockwise to release the lug 5185 and the arms 5170. The arm 5170 is thereupon drawn downwardly by the spring 5183 and moves the yoke 5150 and the locking members 5155 into type box locking position against the action of the spring 5156 of Fig. 27.

A printing hammer 5200 is pivotally supported on the shaft 5160, and a downwardly extending arm thereof is connected to one end of the spring 5201 whose other end is connected to a stud secured in the side wall 5180. The spring 5201 thereby urges the upper end of the printing hammer 5200 rearwardly. A latch lever 5202 which is pivotally supported on the shaft 5175, has on its lower end a shoulder engageable with a rightwardly turned lug on the printing hammer 5200 as seen in Fig. 30. The latch lever 5202 is urged rearwardly by a spring 5203, but may be moved forwardly and upwardly to release the printing hammer by a stud 5204 secured to a rearwardly extending arm on a level 5205 which is pivotally mounted on the side wall 5180.
to a rearwardly extending arm on a lever 5205 which is pivotally connected to a rearwardly extending arm of a lever 5206 which is pivotally mounted on the shaft 5151. Arranged immediately alongside the forward portion of the lever 5206 is an arm 5207 which is secured to the shaft 5151 through a hub 5208. The hub 5208 is similar to the hub 5171 in that it is recesssed closely adjacent the arm 5207 to receive the arm 5206 and permit pivotal movement thereof. However, the arm 5207 is connected to the arm 5206 through an eccentric 5209 such that the angular position of the arm 5206 with respect to the arm 5207 and the shaft 5151 may be manually adjusted.

Accordingly, clockwise movement of the shaft 5151 forces the arm 5206 rearwardly, pivots the lever 5205 in a counterclockwise direction, and swings the latch lever 5202 forwardly to release the hammer 5200. The spring 5201 then swings the printing hammer 5200 forcibly to the rear to effect a printing operation.

Near the rearward extremity of its movement, the hammer 5200 strikes an annular flange 5210 which is integral with a tube 5211 slidably supported in bearings 5212. These bearings are secured to an upper frame member 5213 which is in turn supported by the side walls 5022 and 5023. A spring 5215 extends through the tube 5211, the forward end of the spring being connected to a downwardly extending lug on the upper frame member 5213 and its rearward end being connected to a plug 5216 which is received in the rearward end of the tube 5211. The plug 5216 is arranged to strike the rearward end of a selected type bar 5003 immediately after the hammer 5200 strikes the annular flange 5210.

The plug 5216 has only a short and rounded shank extending into the tube 5211 such that it may readily rock with respect to the tube, the spring 5215 stretching to permit such rocking and contracting to draw the plug back into alignment. This prevents damage of the type bars in the event that the rapidly moving type box should start its return movement before the tube 5211 and the plug 5216 are drawn back out of engagement with the type bars.

When the printing hammer 5200 strikes the flange 5210 to effect a printing operation, it also strikes a rightwardly extending arm on the latch lever 5174 to raise the latch lever against the action of the spring 5182. This releases the lug 5173 and the lever 5172. Even though the arm 5170 has previously been permitted to swing downwardly under the influence of the spring 5183, the latter spring still has sufficient energy stored therein to thrust the lever 5172 forward with substantial force. The stud carried by the rearwardly extending arm of the lever 5172 strikes the lower edge of the arm 5170 and thereby gives the arm 5170, the yoke 5150, and other associated parts an upward impetus which assists the spring 5156 of Fig. 27 to return the type box locking apparatus and the shaft 5151 to their normal positions.

During the return stroke of the arm 5162 and the sleeve 5161, the latch lever 5186 moves rearwardly such that its hook underlies the leftwardly extending lug 5185 of the arm 5170. An arm 5220, connected to the right-hand end of the sleeve 5161, has a cam surface engageable with a stud 5221 carried by the rearwardly extending arm of the lever 5172. The cam surface of the arm 5220 cams the stud 5221 downwardly during the return movement of the sleeve 5161 to return the lug 5173 of the lever 5172 to a rearward position wherein it may again be engaged by the latch 5174.

A stud 5222 extends rightwardly from the free end of the arm 5220 such that it may engage the rearward or upward edge of the printing hammer 5200 and return the latter to its energized position against the action of the spring 5201 as the sleeve 5161 returns to its normal or starting position.

The operation of the printing hammer and of the type box locking devices and their associated parts will now be described in detail with particular emphasis on the sequence of the operations. At the beginning of the operating cycle the link 5163 of Fig. 30 begins to move upwardly and withdraws the stud 5222 from its position above and to the rear of the printing hammer 5200. No further action takes place until the arm 5162 engages the stud 5187. During this interval the type box 5000 is moved vertically and horizontally to its proper position as previously described.

When the arm 5162 raises the stud 5187 and moves the latch lever 5186 to release the arm 5170, the spring 5183 draws the arm 5170 downwardly. This moves the yoke 5150 and the latch members 5155 into locking position to hold the type box firmly in its selected position. Downward movement of the arm 5170 rotates the shaft 5151 through an appreciable angle in a clockwise direction, which releases the hammer through the action of the arms 5207 and 5206, the lever 5205, and the latch lever 5202. The hammer 5200 then effects the printing operation through the flange 5210, the rod 5211, and the plug 5216 as previously described.

The hammer 5200 also rotates the latch 5174 to release the lug 5173 and the lever 5172 such that the latter may be impelled forward by the remaining energy in the spring 5183. This not only removes the downward force of the spring 5183 on the arm 5170, but kicks the arm 5170 upwardly such that the spring 5156 of Fig. 27 may more rapidly return the yoke 5150, the locking devices 5155, and the shaft 5151 back to their normal or starting positions.

During the return movement of the sleeve 5161, the latch lever 5186 is returned to its normal or rearward position, and the arm 5220 cams the lever 5172 back into latching engagement with the latch lever 5174 and, through the stud 5222, forces the printing hammer 5200 forwardly and downwardly to its energized position where it may again be latched by the latch lever 5202.

The apparatus for controlling and driving the type box 5000 now having been described in detail, a full understanding of the operation of the control apparatus may best be obtained by description of the various possible operations thereof. Let it be assumed that a character is to be printed by one of the type bars 5003 in the upper row of the standard or right-hand group. When the key 4541 corresponding to any one of the seven type bars of that class is depressed all of the three coding slides 4651–4653, which control vertical movement of the type box, are retained in their right-hand position by engagement of corresponding teeth with the depressed key lever 4555 or 4557.

Accordingly, none of these coding slides may move to the left and none of the coding slides 4771–4773 of Fig. 15 may be drawn rearwardly and none of the coding slides 4811–4813 of Fig. 16 are lowered. Accordingly, all of these latter slides remain locked in position with respect to the frame member 4830. None of the slides 4821–4823 are moved and all levers 4841–4845 and all coding slides 4871–4875 remain stationary, the latter thereby being in their rearward positions whereby the lowermost coding slide 4875 is engageable by the pawl 5050 and the shoulder 5060 of Fig. 22. This interrupts vertical movement of the type box 5000 at its lowest possible level, under which conditions the upper row of type bars is arranged in front of the printing hammer.

If a character is to be printed by a type bar in the second horizontal row of the type box any one of the corresponding keys 4541 and the corresponding key lever will prevent movement of the coding slides 4651 and 4652 of Fig. 14 but will allow leftward movement of the coding slide 4653. This permits movement of the coding slide 4773, the link 4803 and downward pivotal movement of the coding slide 4813 of Fig. 16 whereby the latter is unlocked and is brought into engagement with the blade 4832 such that it may be moved forwardly. This draws the slide 4823 forwardly which actuates the lever 4841 and the lever 4845, the latter through its upwardly extending arm 4850. Accordingly, the coding slide 4875 is drawn forwardly whereas the coding slide 4874 remains stationary. This of course interrupts upward movement of the type box 5000 at its next lowermost printing position wherein the second row of type bars is at the proper elevation for printing.

If a character is to be printed by a type bar in the third row, any one of the corresponding keys 4541 upon being depressed actuates the associated key lever such that the coding slides 4651 and 4653 are prevented from moving to the left whereas the coding slide 4652 is free to move to the left. Skipping the intermediate chain of operating parts shown in Fig. 15 and in the lower part of Fig. 16, it will be seen that this causes the slide 4822 to move rearwardly and actuate the lever 4842 and the levers 4844 and 4845 through the arms 4850. Accordingly, the two lowermost slides 4874 and 4875 are drawn forwardly while the third coding slide 4873 remains in its rearward position. The type box 5000 is therefore permitted to move upwardly past its first two printing positions to its third printing position wherein the third row of type bars is arranged at printing level.

If a character is to be printed by a type bar in the fourth row, the corresponding key 4541 and the associated key lever permits leftward movement of the coding slide 4651 but bars leftward movement of the coding slides 4652 and 4653. Accordingly, the slide 4821 of Fig. 16 moves rearwardly and actuates the lever 4843 and the levers 4844 and 4845 through the arms 4850. This draws the lower three coding slides 4873–4875 forwardly such that upward movement of the type box is interrupted by the coding slide 4872. This brings the fourth row of type bars in front of the printing hammer.

A character may be printed by a type bar in the next lowermost row of type bars by depression of a corresponding key 4541 and associated key lever which permits coding slides 4651 and 4652 to move to the left which restrains the coding slide 4653. Forward movement of the slides 4821 and 4822 of Fig. 16 actuates the levers 4842–4845 and withdraws forwardly the four lowermost coding slides 4872–4875 such that upward movement of the type box 5000 is interrupted by the uppermost coding slide 4871. This brings the fifth or next lowermost row of type bars into printing position.

Finally, if a character is to be printed by the lowermost row of type bars, any one of the corresponding keys 4541 and associated key levers permits leftward movement of all three coding slides 4651–4653. The resulting forward movement of the slides 4821–4823 of Fig. 16 actuates all of the levers 4841–4845 and moves forwardly all of the coding slides 4871–4875 such that upward movement of the type box 5000 is interrupted only by the fixed plate 4888. This permits the type box 5000 to rise to its maximum elevation wherein the lowermost row of type bars is arranged in printing position.

Control of the horizontal movement of the type box may be traced similarly. In the following description it will be assumed that the shift key 5130 of Fig. 4 is not depressed whereby the rocker arm 5100 of Figs. 24–28 is in its counterclockwise position such that the standard or right-hand group of type bars will be brought into printing position.

If a character is to be printed by the left-hand column of type bars as seen in Fig. 24, minimum leftward movement of the type box is required to bring that vertical row of type bars into printing position. Accordingly, depression of a key 4541 corresponding to one of these characters or type bars prevents leftward movement of all three coding slides 4654–4655 which control horizontal movement. This prevents rearward movement of the coding slides 4774–4776 of Fig. 15 whereby the links 4804–4806 of Fig. 16 and the associated coding slides 4814–4816 remain in their raised positions such that they are locked by the frame member 4830. Accordingly, the associated slides 4824–4826 remain in their rearward positions and the levers 4861–4866 and the coding slides 4881–4886 remain in their normal positions. The pawl 5112 and the shoulder 5115 of Fig. 22 are thereby restrained by the lowermost coding slide 4886 with a resulting minimum leftward movement of the type box 5000. This brings the left-hand row of type bars into printing position.

If a character is to be printed by the second vertical column of type bars, depression of any one of the corresponding keys 4541 operating through its associated key lever restrains movement of the coding slides 4654 and 4655 but permits leftward movement of the coding slide 4656. This in turn permits rearward movement of the coding slide 4776 of Fig. 15, downward movement of the link 4806 and pivotal movement of the slide 4816 of Fig. 16. The latter slide is thereby unlocked from the casing 4830 and is brought into engagement with the plate 4832 such that it may be moved rearwardly thereby. The slide 4826 is thereby moved rearwardly to actuate the lever 4861. The lever 4861 in turn actuates the levers 4863 and 4866 through their upwardly extending arms. As a result, the lowermost coding slide 4886 is drawn forwardly and the next lowermost coding slide 4885 remains rearwardly to interrupt leftward movement of the type box 5000 when the second row of type bars reaches printing position.

If a character is to be printed by the third vertical column of type bars depression of any corresponding key and key lever prevents leftward movement of the coding slides 4654 and 4656 but permits leftward movement of the coding slide 4655. Skipping the chain of operating parts shown in Fig. 15 and in the lower part of Fig. 16, it will be understood that the slide 4825 is thereby moved forwardly to operate the lever 4862 which in turn operates the levers 4863, 4865 and 4866. However, the lever 4864 remains stationary. As a result the coding slides 4885 and 4886 are moved forwardly while the coding slide 4884 remains in its rearward position to interrupt leftward movement of the type box when the third row of type bars is in printing position.

When a character is to be printed by the fourth vertical column of type bars depression of any corresponding key 4541 and its associated key lever prevents leftward movement of the coding slides 4655 and 4656 but permits leftward movement of the coding slide 4654. The slide 4824 of Fig. 16 is thereby caused to move forwardly and actuate the levers 4864–4866 and the coding slides 4884–4886. Accordingly, leftward movement of the type box 5000 is interrupted by the coding slide 4883 such that the fourth column of type bars is brought into printing position.

When a character is to be printed by the fifth row of type bars depression of any of the corresponding keys 4541 and the associated key lever prevents leftward movement of the coding slide 4655 but permits leftward movement of the coding slides 4654 and 4656. As a result, the slides 4824 and 4826 directly actuate the levers 4861 and 4864 which in turn actuate the levers 4863, 4865 and 4866. These in turn draw the coding slides 4883–4886 forwardly but leave the coding slide 4882 in its rearward position. Accordingly, leftward movement of the type box 5000 is interrupted with the fifth column of type bars in printing position.

When a character is to be printed by a type bar in the fifth column of type bars depression of any of the corresponding keys 4541 and the associated key lever prevents leftward movement of the coding slide 4656 but permits leftward movement of the coding slides 4654 and 4655. Accordingly, the slides 4824 and 4825 of Fig. 16 are moved forwardly to actuate directly the levers 4862 and 4864 which in turn actuate the levers 4863, 4865 and 4866. Accordingly, the five lowermost coding slides 4882–4886 are drawn forwardly leaving only the coding slide 4881 in its rearward position. Accordingly, leftward movement of the type box 5000 is interrupted by the coding slide 4881 with the sixth column of type bars in printing position.

Finally, if a character is to be printed by a type bar of the seventh and last column of type bars depression of any of the corresponding keys 4541 and the associated key lever permits leftward movement of all three coding slides 4654–4656 and forward movement of all three slides 4824–4826 of Fig. 16. This causes actuation of all six of the levers 4861–4866 and forward movement of all of the coding slides 4881–4886. Leftward movement of the type box 5000 is therefore interrupted only by the fixed plate 4888 bringing the seventh column of type bars into printing position.

Accordingly, it may be seen that any one type bar of the standard or right-hand group may be brought into printing position, depression of the corresponding key 4541 controlling leftward movement of the coding slides 4651–4653 to bring the desired horizontal row of type bars into printing position and controlling the coding slides 4654–4656 to bring the desired vertical column of type bars into printing position.

As previously explained, depression of the shift key 5130 of Fig. 4 actuates the rocker arm 5100 such that horizontal movement of the type box 5000, as controlled by the coding slides 4654–4656, is to the left. This brings a selected vertical column of the left-hand group of type bars into printing position. It will be apparent that minimum movement of the type box, resulting from the coding slide 4886 being left in its rearward position, will bring the inner or right-hand column of type bars of the left-hand group into printing position.

*Ribbon feed mechanism*

As has previously been explained the left-hand twin cams 545 and 546 of the Butler machine are retained in the present machine but are located, as shown in Fig. 3, outside or to the left of the left side wall 28, and close to the supplementary side wall 4505. These cams are mounted on the extended main power shaft 126 of the Butler machine and accordingly are rotated once during each operating cycle of the calculating machine proper.

It will be apparent in view of the previous description of the drive means for the typewriter printing apparatus that the shaft 4900 of Fig. 17 is made to oscillate once during each operating cycle of the typewriter printing apparatus only. Since the ribbon feed should be operated each time the typewriter printing apparatus is cycled, as well as each time the calculating machine proper is cycled, the ribbon feed should be actuated by rotation of the power shaft 126 and by oscillation of the typewriter printing power shaft 4900.

For this purpose the drive means for the typewriter feed is modified as shown in Fig. 3. Secured to the shaft 4900 adjacent the left-hand end thereof is an arm 5250 which extends generally upwardly therefrom. A link 5251 is pivotally connected at one end to the arm 5250 and at its other end to a second link 5253. The link 5253 is pivotally connected to an arm 5254 which is pivotally mounted on the shaft 542 of the Butler machine. The ribbon feed operating link 740 of the Butler machine is also pivotally connected to the arm 5254 whereby it may be seen that clockwise movement of the shaft 4900 during the initial portion of an operating cycle of the typewriter printing apparatus draws the link 740 rearwardly to actuate the typewriter feed apparatus.

A third link 5255 is pivotally connected to the adjoining ends of the links 5251 and 5253 and extends downwardly to a pivotal connection on the three-armed lever 4531 previously described. When the shaft 126 and hence the cams 545 and 546 and the three-armed lever 4541 remain stationary, the link 5251 supports the connected ends of the links 5251 and 5253 whereby the return counterclockwise movement of the shaft 4900 and the arm 5250 drives the ribbon feed link 740 forwardly to its normal position. Accordingly, it will be seen that operation of the typewriter printing apparatus actuates the ribbon feed mechanism.

Rotation of the shaft 126 through a complete revolution, during an operating cycle of the calculating machine proper tilts the three-armed lever 4531 first clockwise and then counterclockwise as the cam rollers 543 and 544 follow the respective cams 545 and 546. This first draws the link 5255 downwardly to move the link 740 rearwardly and then raises the link 5255 to force the link 740 forwardly. Accordingly, it will be seen that the ribbon feed apparatus is caused to operate during each operation of the calculating machine proper.

Since the typewriter printing apparatus, and in particular the type box 5000 must be arranged alongside or parallel to the printing apparatus for the calculating machine proper, the length of exposed ribbon 714 must be increased as compared to the arrangement provided in the Butler machine. For this reason the left-hand ribbon reel and all associated apparatus is moved outside or to the left of the position occupied in the Butler machine, all as shown in Fig. 32. The entire apparatus is supported on a supplementary bracket 5260 secured to the supplementary side wall 4505. As may be seen in Fig. 32 the bracket 5260 supports the left-hand ribbon reel shaft 703 as well as various operating parts such as the shaft 742 and operating lever 741 of the ribbon feed mechanism. This of course calls for various minor changes over the Butler machine such as extension of the ribbon feed slides 743 all of which are obvious and require no detailed explanation.

Because of the increased length of exposed ribbon 714 it is desirable that it be supported intermediate the ribbon posts 715. This is accomplished in the illustrated embodiment of the invention by a simple flat bracket 5261 which is secured between the ribbon posts and has upwardly extending arms 5262. These arms are slightly rearward of the rearward surfaces of the ribbon posts 715 such that they bear against the forward surface of the ribbon.

Ribbon lift mechanism

As in the case of the Butler machine, the ribbon may be lifted into printing position by apparatus shown in part in Fig. 32. This apparatus includes the actuating lever 722, the arm 720, and the shaft 147. The arm 722 actuates the ribbon lift mechanism during an operation of the calculating machine proper in the same manner as in the Butler machine.

It is also desired that the ribbon be lifted into printing position during each operation of the typewriter printing apparatus. For this purpose an arm 5270 is secured to the typewriter printing drive shaft 4900 as seen in Figs. 17 and 32. Clockwise rotation of the shaft 4900 during the first portion of a typewriter printing operating cycle causes the arm 5270 to bear against a stud secured to the lower rearward end of an arm 5271 secured to the shaft 147. A spring 5272 secured between studs on the arms 5270 and 5271 urges the two arms into engagement and normally urges the shaft 147 into its normal position. It will readily be seen that by these means the shaft 147 is made to oscillate during a typewriter printing operation such that the ribbon will be raised to printing position.

At the left-hand side of the machine the ribbon lift mechanism is modified somewhat with respect to the Butler machine. A two-armed lever 5273 is secured to the shaft 147 immediately outside or to the left of the supplementary side plate 4505. This lever is forked at its forward end to engage the stud 719 at the lower end of the left-hand ribbon reel shaft 703 whereby clockwise movement of the shaft 147 raises the ribbon and subsequent clockwise rotation lowers the ribbon to its normal position. The rearward end of the two-armed lever 5273 carries a stud 5274 which is engageable with a slide 5275 whose construction and function is described subsequently.

It will now be seen that both the ribbon feed apparatus and the ribbon lift apparatus are readily operable by an operation of either the calculating machine proper or the typewriter printing apparatus. In the present machine provision is made for raising the ribbon for printing black characters only by the typewriter printing apparatus, no provision being made for selectively bringing the red portion of the ribbon into printing position.

Carriage throw-back and line spacing

In the illustrated embodiment of the invention the apparatus for effecting carriage throw-back and line spacing is substantially the same as that employed in the Butler machine. In Fig. 33 the clutch members 1615 and 1697 of the Butler machine are shown along with the gears 1608, 1610 and 1692. Because of the alteration of the power supply in the present machine, as opposed to the Butler machine, modified apparatus is shown for transmitting power from the power supply to these gears and clutches.

Secured to the upper portion of the gear 1692 is a bevel gear 5280. This meshes with a second bevel gear 5281 which is secured to a shaft 5282. This shaft is supported in a bearing structure 5283 which is supported on the plate 1265 of the Butler machine. A belt pulley 5284 is secured to the outer or left-hand end of the shaft 5282, and a belt 5285 connects the pulley 5284 with another pulley 5286 which is secured to the inner end of the previously mentioned shaft 4514. This shaft is supported in bearings 5287 secured to the side plate 28 and the auxiliary side plate 4505. A suitable adjustably mounted idler pulley is provided to obtain the proper tension in the belt 5285 as shown. As previously indicated and as shown in Fig. 1 the pulley 4512 on the shaft 4514 is constantly driven by the main power supply.

The controls for carriage throw-back and line spacing are the same in the present machine as in the Butler machine with the exception that a manual control of vertical line spacing is provided, this being desirable in a typewriter printing machine. A line space key 5288 is provided in the typewriter keyboard as shown in Fig. 9. This cooperates with a special key lever 5289 having a downwardly extending arm at its rearward end. It will be seen that depression of the vertical space key 5288 causes counterclockwise movement of the key lever 5289 and rearward movement of the downwardly extending arm thereof. This causes operation of control apparatus seen best in Figs. 34 and 35.

The key lever 5289 may there be seen to bear against a yoke or bail 5290 supported on a stud 5291 which is secured to the right-hand side wall 27. The left-hand end of the yoke 5290 is turned back under and branches into a rearwardly extending arm and an upwardly extending arm. The upwardly extending arm of the yoke 5290 is connected to the forward end of a spring 5292 which passes under the stud 5291 and connects to a fixed frame member whereby the yoke 5290 is urged in a counterclockwise direction. The upwardly extending arm of the yoke 5290 also has a stud and slot connection with a member 5293 (see Fig. 35). This member carries an upwardly extending lug which normally bears against the stud 5291 and has a rearward edge normally bearing against the lower portion of the yoke 5290.

When the key lever 5289 rocks the yoke 5290 in a clockwise direction against the action of the spring 5292, the forward end of the member 5293 is first moved forwardly by the lower portion of the yoke 5290 bearing against the rearward edge thereof, and at the same time is raised by its slot and stud connection with the yoke. Prior to full depression of the line spacing key 5288, the rearward edge of the member 5293 is raised above the lower portion of the yoke whereby the member 5293 may spring rearwardly under the influence of a spring 5294 which is connected between the member 5293 and the rearwardly extending arm of the yoke 5290. Accordingly, when the line spacing key 5288 is depressed the member 5293 is first moved forwardly and then springs rearwardly to its normal position.

When the line spacing key 5288 is released, the key lever 5289 and the yoke 5290 return to their normal positions under the influence of the spring 5292. The lower portion of the yoke 5292 may slide rearwardly with respect to the member 5293 to its normal position with respect thereto, the slot and key connection between these two parts having sufficient vertical play to permit such operation. When the yoke 5290 thus returns to its normal position, the spring 5294 which has already moved the member 5293 rearwardly such that its upwardly extending lug is again in engagement with the stud 5291, draws the forward end of the member 5293 downwardly such that its rear edge again lies in front of the lower portion of the yoke 5290.

The momentary forward movement of the member 5293 thus attained by depression of the line spacing key 5288 provides momentary forward movement of a rod 5295 whose forward end is connected thereto. The rearward end of the rod 5295 is pivotally connected to a two-armed lever 5296 which comprises upwardly and downwardly extending arms and an interconnecting shaft portion. As shown in Fig. 34, the shaft portion is pivotally mounted in a bracket 5297 which is secured to the cross-brace 47 of the Butler machine.

When the rod 5295 draws the downwardly extending arm of the lever 5296 forwardly, the upwardly extending arm of this lever forces an arm 5298 upwardly, the arm 5298 being integral with the arm 1712 of the Butler patent which is secured to the shaft 1709. The momentary clockwise movement of the arm 1712 thus induced by the depression of the line spacing key 5288 causes a single line spacing operation through the apparatus shown in Fig. 149 of the Butler patent without requiring an operating cycle of either the typewriter printing apparatus or the calculating machine proper.

*Carriage tabulation return and letter space escapement*

In the illustrated machine certain of the apparatus for effecting carriage tabulation and return is the same as that incorporated in the Butler machine. Such apparatus, shown in Fig. 33, includes the gears 1301 and 1306, associated clutch apparatus, and pinions 1316 and 1322 cooperating with the rack 1078. The driving apparatus, however, is modified with respect to that of the Butler machine in order to accommodate the typewriter printing apparatus.

One factor requiring modified apparatus is that tabulation in the Butler machine is accomplished by mechanical columnar stops which for practical reasons permit a minimum tabulating movement considerably in excess of that required in a typewriter printing apparatus. Furthermore, the Butler machine follows conventional practice in employing 1/8" spacing between columns of numbers whereas it is conventional in typewriter printing to employ 1/10" spacing between adjacent letters.

For these reasons a hysteresis clutch 5300 is employed in the drive sequence for the carriage tabulation and return apparatus. Since hysteresis clutches are well known in the art it is believed to be unnecessary to disclose or describe a suitable form of hysteresis clutch in detail. For the purpose of this application it is believed sufficient to point out that at least one element of the clutch may be selectively excited by electricity to produce a drag of any reasonable desired value between the two clutch members.

The field portion of the hysteresis clutch 5300 is secured to the shaft 4513 and hence is constantly driven. Also secured to the shaft 4513 is a pair of slip rings 5301 cooperating with a pair of brush holding arms 5302 through which the clutch may be electrically energized. The driven portion of the clutch may be rotatably mounted on the shaft 4513, or preferably is secured to a separate shaft, aligned with the shaft 4513, and rotatable with respect thereto, in accordance with well known mechanical construction. In any case, the driven portion of the clutch has secured thereto a belt pulley 5303. This pulley is drivingly connected through a belt 5304 to a pulley 5305, and a suitable adjustably mounted idler pulley is arranged to maintain proper tension on the belt 5304. The pulley 5305 is secured to one end of a short shaft 5306 which is rotatably mounted in a bearing structure 5307 secured to the plate 1265. At the other end of the shaft 5306 is a bevel gear 5308 meshing with the bevel gear 1300 of the Butler machine.

As will subsequently be explained, the tabulating clutch is normally engaged, in the present machine, and the hysteresis clutch 5300 is normally partially energized such that a constant but small tabulating force is normally applied to the rack 1078. The rack 1078 and the associated carriage are restrained from tabulating movement by this constant small force and from return movement, through a ratchet arrangement which may be selectively released to permit tabulating or return movement of the carriage. This ratchet arrangement and various controls therefor are illustrated in Figs. 37, 38 and 39.

Two concentric and oppositely directed ratchet wheels 5330 and 5331 are secured together, and the upper ratchet wheel 5331 is secured to a disc 5332 through a rubber-like washer 5333 bonded to the two latter members. A pinion 5335 meshing with the rack 1078 has secured to its lower end a plate 5336. This plate is secured to the disc 5332 through pin and slot connections and may be angularly adjusted with respect to the disc 5332 and the ratchet wheels 5330–5331 by an eccentric 5337 which is adjustably secured to the disc 5332 and which is arranged to cooperate with a slot in the plate 5336 as shown.

The entire unitary structure from the pinion 5335 to the lower ratchet wheel 5330 is rotatably mounted on a shaft 5338 which is supported by a bracket 5339 at its lower end and by the race 44 at its upper end.

The upper ratchet wheel 5331 is normally prevented from clockwise or tabulating movement by a pawl 5341, and the lower ratchet wheel 5330 is prevented from counterclockwise or return carriage movement by a pawl 5340.

It is desired of course that the pawl 5341 be operated to release the ratchet wheel 5331 to permit a tabulating movement following the printing of each successive character by the typewriter printing apparatus and that the hysteresis clutch 5300 be energized in advance. Control movement for the latter purpose is derived from the rearwardly extending arm of the three-armed lever 4971 of Fig. 17. The rearward portion of the rearwardly extending arm of the lever 4971 is shown in Fig. 37. A stud is secured to the forwardly extending arm of a lever 5342 and overlies the rearward end of the lever 4971.

The lever 5342 is pivotally mounted on a fixed pin and has an upwardly extending arm arranged immediately forwardly of a rightwardly bent lug at the forward end of a slide 5343. This slide is mounted on the auxiliary side wall 4505 through suitable slot and pin connections, and carries at its rearward end an insulating button operatively engageable with a switch 5344. The slide 5343 is biased forwardly by a suitable spring such that it moves to its normal or forward position when it is released by the lever 5342 and other control members described below.

It will now be seen that near the beginning of an operating cycle of the typewriter printing apparatus, the rearwardly extending arm of the three-armed lever 4971 of Fig. 17 pivots the lever 5342 such that its upwardly extending arm forces the slide 5343 rearwardly to close the switch 5344. This switch controls the flow of electric power to the hysteresis clutch 5300, whereby the hysteresis clutch becomes fully energized to exert a substantial carriage tabulating force starting near the beginning of the operating cycle of the typewriter printing apparatus. This is shown in the wiring diagram of Fig. 45.

The ratchet wheel 5330 is released by the pawl 5340 through control apparatus seen in part in Fig. 17. A lever 5345 is there shown, pivotally supported on a fixed pin, and having a forwardly directed arm lying intermediate the two cams 4930 and 4931. This arm has a cam surface on its upper edge which is engageable by a stud 5346 on the cam 4931. It will be seen that engagement of the stud 5346 with the lever 5345 and actuation of that lever by the stud occurs late in the operating cycle of the typewriter printing apparatus.

A spring 5347 normally urges clockwise movement of the lever 5345, which is limited by engagement of a rearwardly extending arm thereof with one of the spacing studs 4506. An upwardly extending arm of the lever 5345 has a pin and slot connection with a short link 5348. A spring 5349 has one end connected to the upwardly extending arm of the lever 5345 through the pin of the slot and pin connection last referred to, and is connected at its other end to the left-hand end of a lever 5350 which extends through a small slit in the link 5348. Returning to Fig. 37 it may be seen that the lever 5350 is pivotally mounted on a pin 5351 and extends therebeyond to form a cam surface engageable with a stud 5352 secured to one end of the pawl 5341. Since the latter pawl is pivotally mounted intermediate its ends as shown, it will be seen that forward movement of the link 5348 pivots the lever 5350 about the pin 5351 to cam the stud 5352 and the pawl 5341 in a clockwise direction such that the upper ratchet wheel 5331 is free to rotate. Since the hysteresis clutch 5300 has already been excited earlier in the cycle, it will be seen that the carriage will be permitted to move in a tabulating direction. The timing of the above described operations is such that the pawl 5341 releases the ratchet wheel 5331 only momentarily, long enough to permit a single letter space escapement.

*Back space operation*

Back spacing is power operated under manual control, and is initiated by depression of a back space key 5370, shown near the center of Fig. 4. This key is secured to a yoke 5371 which is pivotally mounted on a stud 5372. This yoke carries a stud 5373 adjacent the back space key 5370 which is arranged to bear down against an upwardly extending portion of the arm 4605 which is associated with the space bar 4600. Accordingly, depression of the back space key 5370 initiates a spacing operation in the same manner as though the space bar were deperssed. However, the direction of movement of the carriage is reversed by other control apparatus associated with the back space key, now to be described.

At the left-hand end of the yoke 5371 is a downwardly extending arm 5375. The arm 5375 may also be seen in Fig. 36 where it is shown bearing against a stud 5376 in the upper end of a lever 5377 pivotally mounted on a pin 5378. The lower end of the lever 5377 is pivotally secured to the forward end of a rod 5379 whose rearward end is pivotally connected to the lower end of a lever 5380.

The upper end of the lever 5380 may be seen in Fig. 37. A slide 5381 is mounted on the side wall 28 through suitable pin and slot connections and is urged rearwardly by a spring 5382. The slide 5381 is normally restrained from moving rearwardly by a leftwardly extending lug thereon lying in front of the lever 5380. It may now be seen that when the back space key 5370 of Fig. 4 is depressed, the arm 5375 is moved rearwardly to pivot the lever 5377 and the lever 5380 of Fig. 36 clockwise. This swings the upper end of lever 5380 (Fig. 37) rearwardly, whereupon the slide 5381 is permitted to move rearwardly under the influence of the spring 5382. This causes an insulated stud on the rearward end of the slide 5381 to operate a switch 5383.

This actuates a solenoid 5384, shown in Fig. 19, to cause counterclockwise movement of a lever 5385 pivotally mounted through a yoke construction on a fixed stud 5386. The lever 5385 has a slot which receives a stud 5387 mounted at the center of a lever 5388. Upward movement of the solenoid causes the forward end of the lever 5388 to rise such that a stud 5389 carried by the lower end of a lever 5390 is moved into the vertical leg of an L-shaped slot in the lever 5388. The lever 5390 is pivotally mounted on the same stud as is the lever 5345 of Fig. 17 and carries a cam roller 5392 which cooperates with a cam 5393 secured to the sleeve 4912 of Fig. 17, whereby it is rotated through 360° during each operating cycle of the typewriter printing apparatus.

It will be apparent that when the lever 5388 is in its lower or normal position, the stud 5389 may move back and forth in the horizontal leg of the L-shaped slot therein, whereby no motion is transmitted from the lever 5390 to the lever 5388 as the lever 5390 is pivoted by rotation of the cam 5393. However, when the back space key 5370 is depressed, the forward end of the arm 5388 is raised by the solenoid 5384 such that the stud 5389 is in the vertical portion of the L-shaped slot of the lever 5388. Oscillation of the lever 5390 by the cam 5393 then draws the lever 5388 first forwardly and then rearwardly.

Forward movement of the lever 5388 causes clockwise movement of an arm 5394, which is secured to a shaft 5395, against the action of a spring 5396 secured to the upper end of the lever 5394.

The lever 5394 may also be seen in Fig. 37, and the shaft 5395 is shown to extend inwardly and, at its right-hand end, has secured thereto an arm 5397. The upper end of the arm 5397 carries a rightwardly bent lug alternately engageable with either of two slides 5400 and 5401 seen in Fig. 40. Normally the upper slide 5401, which controls return movement of the carriage, is in position to be engaged by the lug on the upward end of the arm 5397. The forward end of the slide 5401 operates through an arm 5402 to operate the return shaft 1349 of the Butler machine. The slide 5400, which controls tabulation movement, is connected through an arm 5403 to the tabulating shaft 1348 of the Butler machine and its operation is described below.

Reference to the Butler patent reveals that counterclockwise movement of the shaft 1349 effects engagement of the return clutch 1317–1319 and disengagement of the tabulating clutch 1311–1313, as shown in Figs. 127 and 129 thereof. Accordingly, depression of the back space key 5370 of Fig. 4 causes engagement of the return clutch and disengagement of the tabulating clutch.

Since depression of the back space key 5370, Fig. 4, initiates an operation of the typewriter printing apparatus the same as does depression of the space bar, all as previously described, the three-armed lever 4971 of Figs. 17 and 37 causes actuation of the switch 5344 of Fig. 37 through apparatus previously described. This in turn fully energizes the hysteresis clutch 5300. Since the tabulating clutch has been disengaged and the return clutch has been brought into engagement, the force exerted by the fully energized hysteresis clutch urges the rack 1078 of the carriage in the return direction. The only operation remaining in order to effect a back spacing movement of the carriage is the release of the ratchet wheel 5330 by the pawl 5340.

This is accomplished through an arm 5404 secured to the return shaft 1349 and shown in Fig. 37. When the shaft is moved counterclockwise a rightwardly extending lug on the upper end of the arm 5404 bears against a stud 5405 secured to a lever 5406 seen best in Fig. 39. This causes the lever 5406 to pivot clockwise about a pin 5407 with the result that another stud or pin 5408 on the arm 5406 draws on a link 5409 which is pivotally connected to the rearward end of the pawl 5340. This pivots the pawl 5340 about a pin intermediate its ends such that the ratchet engaging end of the pawl is withdrawn away from the ratchet to permit rotation thereof in a return movement of the carriage.

The extent of the return movement of the carriage is limited by a control apparatus operated by the arm 5380 of Figs. 36 and 37 which is operated directly by the back space key 5370. As the upper end of the arm 5380 of Fig. 37 moves rearwardly in response to depression of the back space key, it swings a lever 5410 in a clockwise direction about the pin 5351. The right-hand end of the lever 5410 bears against one arm of a three-armed lever 5411 to cause counterclockwise movement thereof about the shaft 5338. A rightwardly extending arm of the lever 5411 carries a stud 5412 which is received in a slot in a lever 5413 which is pivotally mounted at one end on a stud 5414. The other end of the lever 5413 carries a stud 5415 which in turn pivotally supports a pawl 5416 having a yoke formation cooperating with the stud 5415. A spring 5417, connected between the pawl 5416 and the stud 5414, urges the forward end of the pawl 5416 to the left about the stud 5415.

It will now be seen that as the upper end of the lever 5380 moves rearwardly to pivot the lever 5410 clockwise and the three-armed lever 5411 counterclockwise, the stud 5412 on the rightwardly extending arm of the lever 5411 moves along the slot in the lever 5413 and cams the lever 5413 counterclockwise. This moves the hooked forward end of the pawl 5416 into engagement with the tabulating ratchet wheel 5331.

When the pawl 5340 is actuated to permit counterclockwise rotation of the ratchet wheels and back space or return movement of the carriage, a tooth on the ratchet wheel 5331 wedges the hooked end of the pawl 5416 radially outwardly and hence pivots the pawl in a counterclockwise direction about the stud 5415. This moves the rearward end of the pawl to the left such that a stud secured to the rearward end thereof cams a lever 5420 in a clockwise direction.

Figure 42:
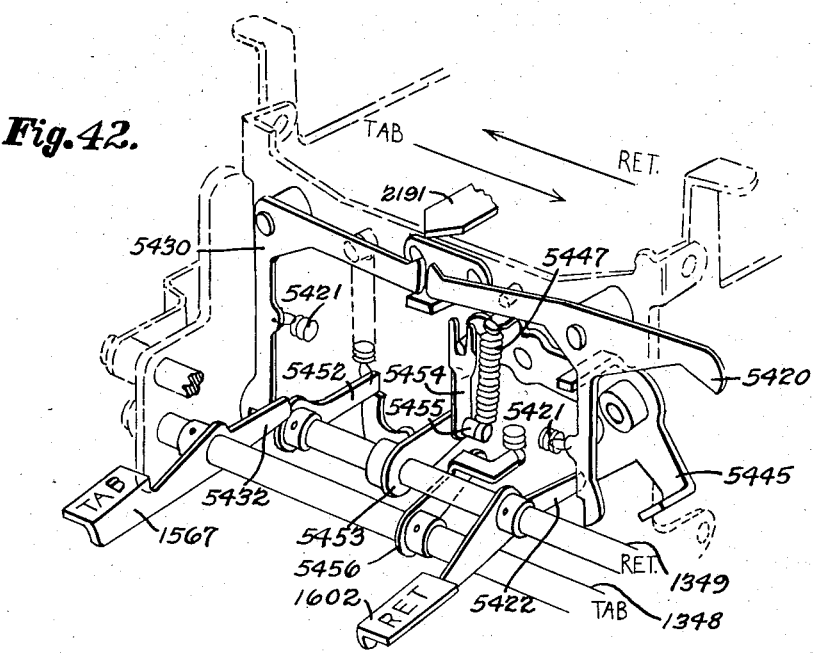
Fig. 42 is a perspective view of other carriage control apparatus as viewed from a point above, rearward and to the left thereof.

The lever 5420 also appears in Fig. 42 where it is seen to have a downwardly extending arm and a spring 5421 secured thereto which biases the lever in a counterclockwise direction. The downwardly extending arm of the lever 5420 also has a downwardly facing shoulder engageable with an arm 5422 secured to the shaft 1349. When the pawl 5416 of Fig. 37 pivots the lever 5420 in a clockwise direction against the action of the spring 5421 the downwardly facing shoulder on the downwardly extending arm of the lever 5420 is removed from a position overlying the arm 5422 whereby the shaft 1349 is free to return in a clockwise direction to its normal position. It will be seen that when the shaft 1349 was first moved in a counterclockwise direction to its actuated position by depression of the back space key 5370, the arm 5422 was locked by the lever 5420 in its lower position, and that actuation of the pawl 5416 by return movement of the ratchet wheel 5331 pivots the latch lever to release the return shaft 1349.

Referring again to Fig. 19 it will be seen that rotation of the cam 5393 through an operating cycle permits the return of of the cam roller 5392, the lever 5390, the lever 5388, the arm 5394, the shaft 5395, and, in Fig. 40, the arm 5397 to their normal positions in advance of the end of the operating cycle.

However, in Fig. 40, the slide 5401, the arm 5402, and the shaft 1349 and, in Fig. 42, the arm 5422 are retained in their actuated positions by the lever 5420. Accordingly, when the pawl 5416 is pivoted counterclockwise by rotation of the ratchet wheel 5331 and actuates the lever 5420, the shaft 1349 is free to return immediately to its normal position. This causes the return clutch of Fig. 33 to disengage and permits reengagement of the tabulating clutch. This also permits return of the pawl 5340 to its normal position whereby return movement of the carriage is immediately interrupted.

In the case of letter space escapement, described above, a very brief release of the ratchet wheel 5331 by the pawl 5341 such as is effected by the rapid movement of the typewriter printing drive through one cycle, is sufficient to assure a complete letter space escapement. Since the ratchet wheel 5331 normally bears against the pawl 5341, the slightest movement of the wheel during a momentary withdrawal of the pawl causes the pawl to reengage the wheel on the sloping side of the tooth last engaged. Tabulating movement then continues until the pawl engages the front of the next tooth.

In the case of back space movement the pawl 5340 must be held away from the ratchet wheel 5330 until the latter has moved through a substantial part of one tooth space. This is necessitated by the unavoidable and appreciable clearance between the pawl 5340 and the adjacent tooth front. Such clearance is necessary to permit both pawls 5340 and 5341 to move readily to latching position, and the clearance is present at the pawl 5340 since the ratchet wheels are normally biased in the tabulating direction by the normally engaged tabulating clutch and the partially energized hysteresis clutch. It is for this reason that the lever 5420 is made to lock the return shaft 1349 and the arm 5404 in actuated position and thereby to retain the pawl 5340 in released position until the pawl 5416 is actuated by actual return movement of the ratchet wheels through a substantial portion of one tooth space.

The three-armed lever 5411 must also be latched in actuated position such that it may continue to support the pawl 5416 in its active position until the latter is operated by ratchet wheel movement. For this purpose a rearward extending arm of the lever 5411 is provided with an upwardly extending lug engageable by a rearward extending arm of the lever 5406, as seen best in Fig. 39. The lever 5406 thereby latches the lever 5411 and hence the pawl 5416 in active position until the latter is operated by ratchet wheel movement to actuate the lever 5420 and release the return shaft 1349, the lever 5406 and the three-armed lever 5411.

As is explained below, the lever 5406 is also rocked forward when the tabulating shaft 1348 is actuated. In such case the lever 5406 locks the three-armed lever 5411 in normal position as seen in Fig. 39 to prevent depression of the back space key until the tabulating movement of the carriage is completed.

Carriage controls

Figure 43:
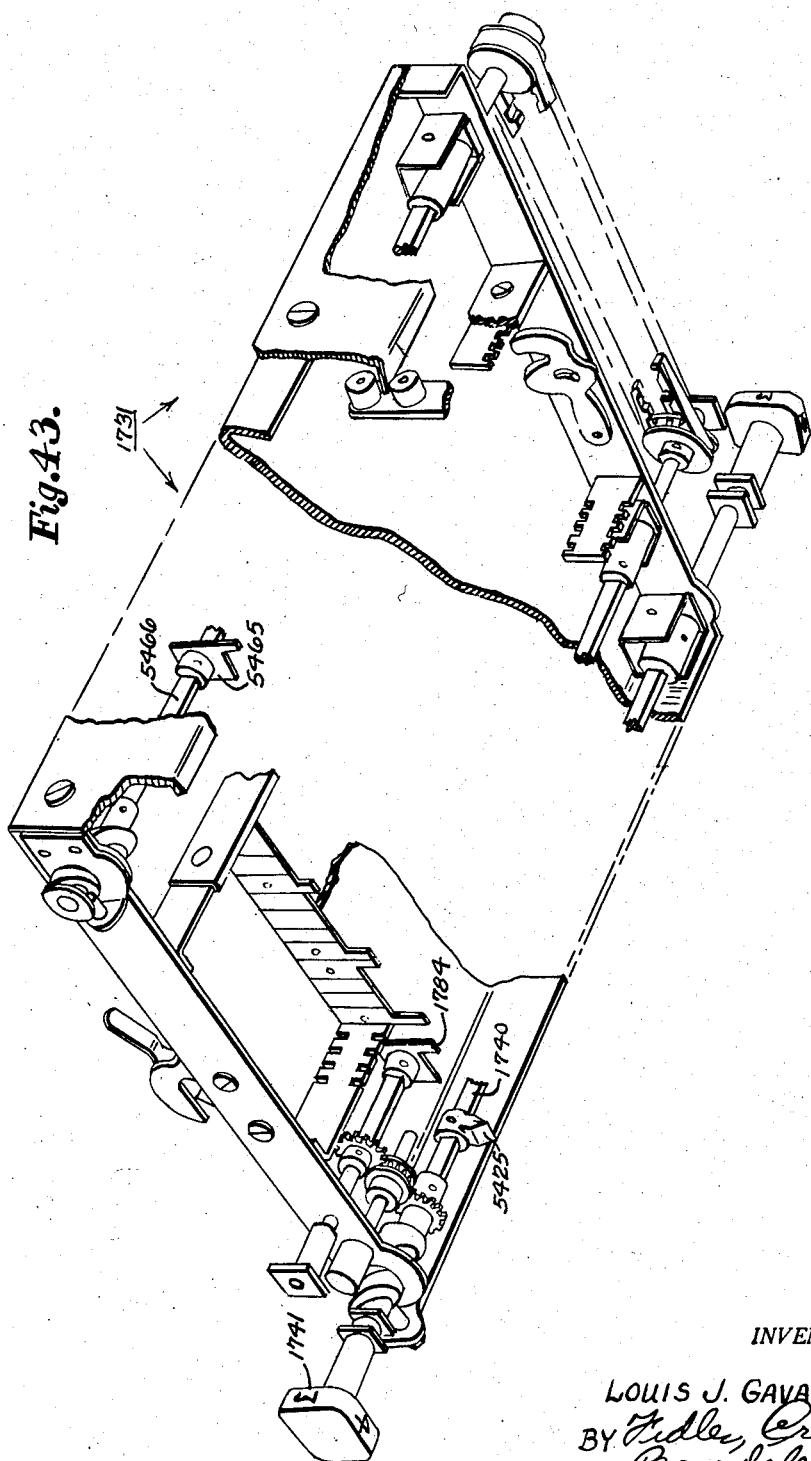
Fig. 43 is a perspective view of certain carriage control apparatus as viewed from a point below, forward and to the left thereof.

As previously indicated the carriage when moving in the tabulating or return direction and whether from one letter space to the next or from one columnar position to another is not mechanically arrested by columnar stops and stop dogs such as are shown in Figs. 129–132 of the Butler patent but is instead arrested by the ratchet wheels 5330 and 5331 cooperating with the corresponding pawls 5340 and 5341. However, controls for the pawls 5340 and 5341, similar in construction to the columnar stops and stop dogs of the Butler machine, are employed in the present machine. These include trip studs 5425 which are adjustably secured to the square rod 1740 of the Butler machine as shown in Fig. 43. These trip studs cooperate with a lever 5420 of Fig. 42 and a similar lever 5430. The spring 5421, previously referred to, is connected at its opposite ends to the downwardly extending arms of the levers 5420 and 5430 such that both downwardly extending arms are urged inwardly thereby.

It has previously been explained that the lever 5420 has a downwardly facing shoulder which cooperates with the arm 5422 to maintain the return shaft 1349 in its actuated position. The opposed lever 5430 has a similar downwardly facing shoulder which cooperates with an arm 5432 secured to the tabulating shaft 1348. Accordingly, the lever 5430 may cooperate with the arm 5432 to maintain the tabulating shaft 1348 in its actuated position. In a normal operation of the calculating machine proper or in any special operation thereof calling for tabulating or return movement of the carriage, the proper one of the two shafts 1348 and 1349 may be actuated in the same manner as in the Butler machine. The corresponding lever 5430 or 5420 springs inwardly to maintain that shaft in actuated position.

When the return shaft 1349 is in actuated position the previously described arm 5404 of Fig. 37 bears against the stud 5405, pivots the arm 5406 to draw on the link 5409 to release the ratchet wheel 5330. A similar arm 5434 is arranged on the tabulating shaft 1348 and serves a similar purpose. When the tabulating shaft 1348 is moved to actuated position a leftwardly turned lug at the upper end of the arm 5434 bears against a stud 5435 on the lever 5406 (see Fig. 39) such that that lever is again pivoted in a clockwise direction. This draws on a link 5436 which is pivotally connected to the lever 5406 through a pin 5437. The link 5436 is pivotally connected to the pawl 5341 whereby the latter is retracted from the ratchet wheel 5331. Accordingly, when the tabulating shaft 1348 is in its actuated position, the pawl 5341 is retracted from the ratchet wheel 5331 to permit tabulating movement of the carriage.

It will be noted that so long as the lever 5420 or the lever 5430 is permitted to retain the return shaft 1349 or the tabulating shaft 1348 respectively in its actuating position, both of the pawls 5341 and 5340 remain retracted from the ratchet wheels to permit carriage movement. It is of no account that both of the pawls 5340 and 5341 will be retracted from the corresponding ratchet wheels when either the tabulating shaft or the return shaft is in its actuated position since the direction of movement of the carriage is controlled by operation of the tabulating clutch and return clutch of Fig. 33.

Each of the levers 5420 and 5430 of Fig. 42 has an inwardly directed pointed lug or tip which is engageable by any one of the trip lugs 5425 of Fig. 43 when the latter is carried therepast by movement of the carriage. It will readily be seen that when either of the levers 5420 or 5430 is pivoted to a position wherein it maintains the corresponding shaft 1349 or 1348 in actuated position, the pointed tip at the end of the inwardly extending arm is elevated. When a trip lug 5425 passes the raised end of the inwardly extending arm of the lever 5420 or 5430, it strikes the pointed tip and thrusts it downwardly to pivot the downwardly extending arm outwardly and release the corresponding arm 5422 or 5432 and the corresponding shaft 1349 or 1348. This permits the return of the previously retracted pawl 5340 or 5341 of Fig. 37 to ratchet engaging position to halt the movement of the carriage. The rubber-like disk 5333 arranged immediately above the ratchet wheels, as seen in Fig. 38, serves as a shock absorber in halting the movement of the carriage. A slide 2191 of the Butler machine may be seen in Fig. 42. This slide serves as an interlock, preventing operation of the calculating machine proper except when a trip lug cams it forwardly.

The hysteresis clutch 5300 is also energized whenever either the tabulating shaft 1348 or the return shaft 1349 is moved to its actuated position. This is accomplished through the arms 5404 or 5434 of Fig. 37 and through the lever 5406 and the link 5436. It will be noted that the link 5436 extends beyond its pivotal connection with the rearward end of the pawl 5341 and carries a stud which engages one arm of a bell crank 5437 pivotally mounted on the stud 5351. A leftwardly extending arm of the bell crank 5437 is operatively engaged with the slide 5343 through an upstanding lug on the latter and through a spring 5438. It will now be seen that each time that one of the shafts 1348 or 1349 is actuated to release the pawls 5340 and 5341, the bell crank 5437 will be operated to actuate the slide 5343 and the switch 5344 to fully energize the hysteresis clutch.

Figure 41:
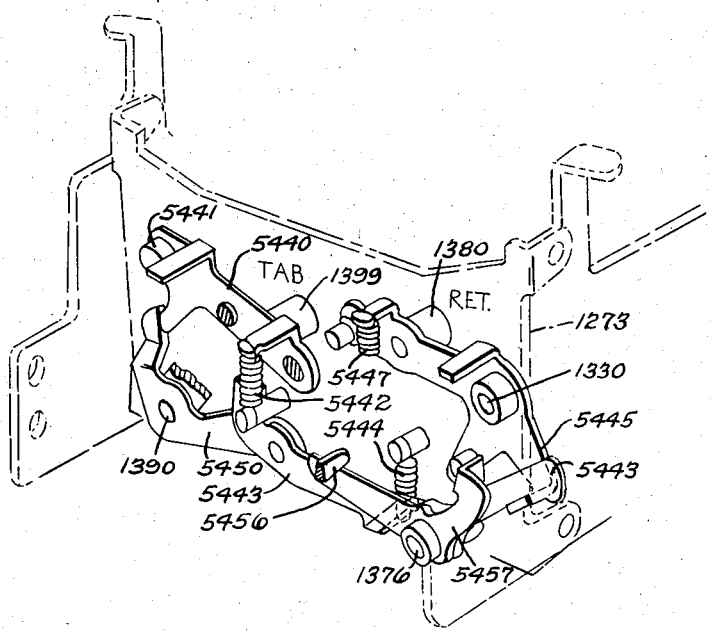
Fig. 41 is a perspective view of carriage control apparatus as viewed from a point above, rearward and to the left thereof.

It has previously been stated that the tabulating clutch of Fig. 33 is normally engaged. The immediate controls for both the tabulating clutch and the return clutch are shown in Fig. 41. A lever 5440 is pivotally mounted on the back plate 1273 of the gear box through a stud 5441. The free end of this arm carries the stud 1399 of the Butler machine for operating the tabulating clutch. The stud 1399 is urged and is normally maintained downwardly by a spring 5442 connected between a rearwardly extending lug on the lever 5440 and a suitable stud secured to the wall 1273.

A lever 5443 is pivotally mounted on the shaft 1376 of the Butler patent and is urged in a counterclockwise direction by a spring 5444. The lever 5443 has a leftwardly extending arm whose hooked end is engageable with a rearwardly bent lug on the leftwardly extending arm of a lever 5445, this lever being mounted on the pin 1330 of the Butler patent. The rightwardly extending arm of the lever 5445 carries the stud 1380 of the Butler patent which operates the return clutch. A spring 5447, further described below, is connected to a rearwardly turned lug on the lever 5445 and urges the stud 1380 downwardly.

It will be seen that clockwise movement of the arm 5443 about the shaft 1376 will release the lever 5445 such that the spring 5447 may draw the stud 1380 downwardly to cause engagement of the return clutch. Such movement of the lever 5443 also raises the stud 1399 to disengage the tabulating clutch through a lever 5450 pivotally mounted on the stud 1390. The lever 5450 has a pin and slot connection at the right-hand end with the lever 5443 and has an upwardly extending arm engageable with a downwardly extending lug on the arm 5440. Accordingly, a clockwise movement of the lever 5443 causes counterclockwise movement of the lever 5450 and clockwise movement of the arm 5440 to raise the stud 1399 and release the tabulating clutch.

These operations are initiated by counterclockwise movement of the return shaft 1349 of Fig. 42 to its actuated position. Such movement of the shaft 1349 causes an arm 5452 to bear down against an upwardly turned lug on the right-hand end of the arm 5443. It will therefore be seen that actuation of the return shaft 1349 causes disengagement of the tabulating clutch and engagement of the return clutch.

Another arm 5453 is secured to the return shaft 1349 and extends forwardly therefrom. A link 5454 is pivotally connected to the arm 5453 through a pin 5455 and its upper forked end receives a stud which is secured to the right-hand end of the lever 5445. When the return shaft 1349 is rocked clockwise, back to its normal position, the arm 5453 moves upwardly, raising the link 5454 and rocking the lever 5445 in a counterclockwise direction. This disengages the return clutch, and causes reengagement of the tabulating clutch through the levers 5443 and 5450. It will be noted that the spring 5447, previously referred to, is connected between the lever 5445 and the stud 5455 on the arm 5453, whereby the lever 5445 is urged clockwise to engage the return clutch when the return shaft 1349 is actuated.

An arm 5456 is shown in Fig. 41 to engage the inner arm of a bell crank 5457, pivotally mounted on the stud 1376. This arm is secured to the tabulating shaft 1348 of Fig. 42 and depresses the bell crank 5457 when the tabulating shaft is actuated. This causes a forwardly bent lug on the upwardly and outwardly extending arm of the bell crank 5457 to bear against a stud on the lever 5445 and disengage or prevent engagement of the return clutch. This construction serves in part as a safety measure to prevent simultaneous engagement of the return and tabulating clutches, and in part to permit manual movement of the carriage. Such manual movement is made possible by simultaneous depression of the two keys 1509 and 1518 of the Butler machine. This actuates both shafts 1348 and 1349 through controls described in the Butler patent, and through the arms 5452 and 5456 disengages both the return and tabulating clutches.

*Typewriter skip tabulation and return*

In the Butler machine provision is made for skip tabulation and return by apparatus shown largely in Fig. 159 of the Butler patent. The apparatus includes downwardly extending notched arms 1566, 1960 and 1973 shown in the present Fig. 40. These notched arms are supported on yokes 1562, 1958 and 1971 respectively and may swing inwardly to maintain the tabulating lever 1567 in its upward or actuated position. Tabulating movement of the carriage is then terminated when the active one of these notched arms is tripped by a release disk 1784 shown in Fig. 43 of the present application and in Fig. 155 of the Butler patent. Similar notched arms are associated with the return lever 1602 of the Butler machine, any one of which may support the return lever in actuated position until it is tripped.

In the present machine, further skip tabulation and return controls are desired in order to position the carriage for typewriter printing in various columns on a ledger sheet or similar accounting paper. Apparatus employed for this purpose in the specific machine disclosed herein includes an additional notched arm 5461 associated with the tabulating lever 1567 and three additional notched arms 5462, 5463 and 5464 associated with the return lever 1602. Each of these notched arms is an integral part of a construction including a control arm at the rear and an interconnecting bail portion, each entire construction being identified by a single reference numeral 5461, 5462, 5463 or 5464. These notched arm constructions serve to maintain the tabulating lever 1567 or the return lever 1602 in actuated position until tripped by a release disc 5465 adjustably positioned on a shaft 5466 best seen in Fig. 43. It should be noted also that the yoke 5461 is secured to a yoke 5465 at the ends of the rearward arms of each by a slot and pin connection best seen in Fig. 47.

Actuation of the notched arm constructions 5461-5464 is controlled by four keys 5471-5474 seen in Figs. 2 and 9. These keys are mounted on standard key stems and are associated with key levers which are the same as those previously described with the exception of one detail explained below. The key levers associated with these four keys also operate the same as the previously described key levers. More particularly, they enter the roller race such that the depression of more than one key and key lever is prevented, and they bear down on the bail 4570 when depressed to trigger an operating cycle of the typewriter printing apparatus. Furthermore, these key levers are urged upwardly by the spring 4562 or 4563 of Fig. 4, and they serve to retain the first six coding slides 4651-4656 of Fig. 14 in their normal positions while permitting leftward movement of the seventh coding slide 4657 to prevent actuation of the typewriter printing power shaft 4900 of Fig. 17.

Figure 44:
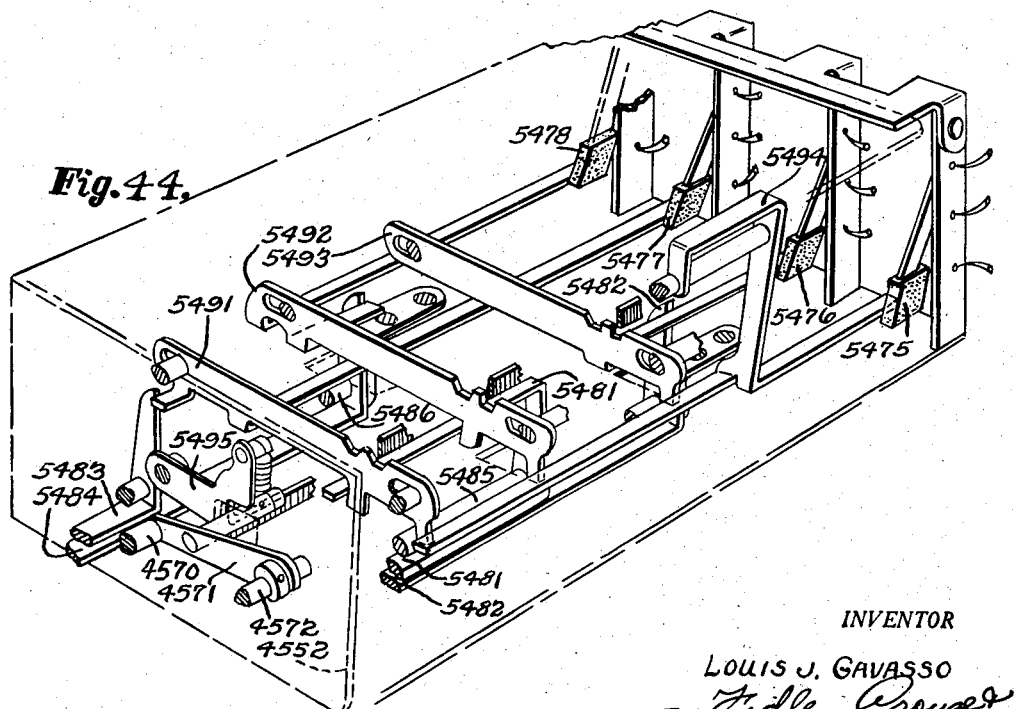
Fig. 44 is an exploded perspective view of certain carriage control apparatus as viewed from a point above, forward and to the left thereof, this apparatus being arranged at the right-hand end of the typewriter printing keyboard.

Depression of any one of the keys 5471-5474 causes operation of various combinations of four switches 5475-5478 shown schematically in Fig. 44. Such operation is effected through various bails and slides described immediately below.

When the return key 5471 is depressed it rocks a bail 5481 counterclockwise about a shaft 5485 upon which it is pivotally mounted. Depression of return key 5472 rocks a similar bail 5482 in a counterclockwise direction about the same shaft 5485.

Depression of the return key 5473 causes counterclockwise movement of a bail 5483 pivoted on a shaft 5486, and finally depression of the tabulating key 5474 causes counterclockwise rotation of a bail 5484 about the same shaft 5486.

All of the bails 5481-5484 are located below the bottom wall 4550 of the typewriter keyboard and extend to the right beyond the right-hand side wall 4552 where they may be seen in Fig. 44. The bail 5481 is there seen to include an upstanding arm portion and a leftwardly bent lug which lies immediately to the rear of downwardly extending ears on a pair of slides 5491 and 5492. The bail 5482 may also be seen to have an upstanding arm which lies immediately to the rear of a rightwardly extending lug on a third slide 5493.

The three slides 5491-5493 are slidably mounted on the right-hand side wall 4552 through suitable pin and slot constructions as shown. Each of these three slides has a rightwardly extending lug which serves to actuate one of the three switches 5476-5478. More particularly, the slide 5493 has a rightwardly extending lug which serves to actuate the switch 5476, while the slide 5491 has a rightwardly extending lug actuating the switch 5477 and the slide 5492 has a rightwardly extending lug serving to actuate the switch 5478.

A yoke 5494 is pivotally mounted on a stud secured to the right-hand side wall 4552. This yoke extends downwardly and branches into leftwardly and rightwardly extending lugs, the leftwardly extending lug lying immediately forward of downwardly extending ears on the forward ends of the slides 5491-5493 while the rightwardly extending lug serves to actuate the switch 5475.

The switches 5475-5478 may be of any conventional design but are preferably of the general type having an actuating arm engageable by a corresponding lug of the slides 5491, 5492 or 5493 or of the yoke 5494. The actuating arm of each switch is spring biased rearwardly against the corresponding lug such that the slides and the yoke are thereby urged rearwardly toward their normal positions. This avoids the necessity of separate springs associated with the slides and the yoke.

Figure 46:
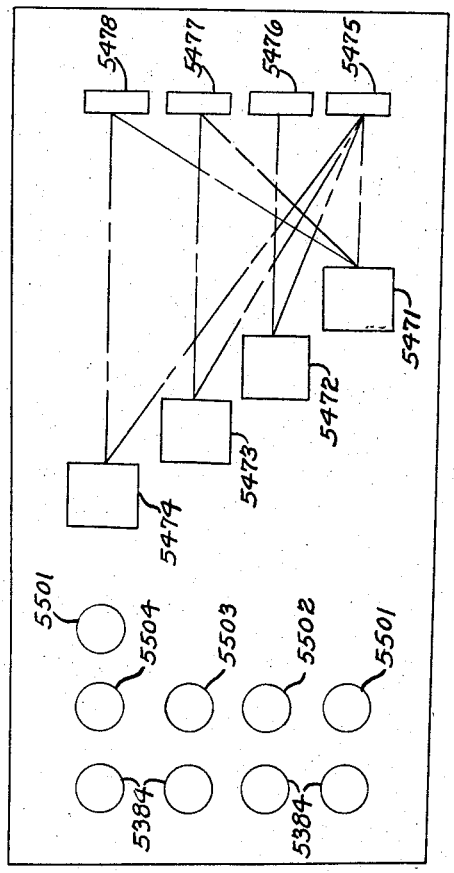
Fig. 46 is a diagram indicating the association of certain electrical control apparatus of the machine.

It will now be seen that depression of the return key 5471 rocks the bail 5481 to draw the slides 5491 and 5492 forwardly to actuate switches 5475, 5477 and 5478. A schematic representation of this switch operation is shown in Fig. 46, the three switches thus actuated by the return key 5471 being connected by dotted lines to the representation of that key. Depression of the return key 5472 rotates the bail 5482 to actuate the slide 5493. This causes operation of two of the switches 5475 and 5476 as represented in Fig. 46.

Depression of the return key 5473 causes counterclockwise rotation of the bail 5483 which has an upwardly extending arm engageable with the leftwardly extending lug on the slide 5491 whereby two switches 5475 and 5477 are operated. Finally, depression of the tabulating key 5474 causes counterclockwise rotation of the bail 5484 which has an upstanding arm engageable with a rightwardly turned lug on the slide 5492. Rocking of the bail 5484 therefore causes operation of two switches 5475 and 5478, all as is schematically represented in Fig. 46.

At the left of Fig. 44 and secured to the shaft 4572 may be seen the right-hand arm 4571 supporting the bail 4570, all as described above with reference to Fig. 4. The arm 4571 carries a rightwardly extending stud which is engageable with a downwardly facing shoulder on an arm 5495, pivotally mounted on the right-hand side wall 4552. The arm 5495 is biased downwardly by a suitable spring as shown such that its downwardly facing shoulder bears against the stud carried by the arm 4571. The arm 5495 is also provided with a rightwardly extending lug which overlies the slides 5491-5493.

Normally the bail 4570 is raised and the lug portion of the arm 5495 is elevated above the slides 5491-5493. However, when one of the keys 5471-5474, or when any of the normal keys 4541 is depressed, the bail 4570 is lowered drawing the arm 5495 and its rightwardly extending lug downwardly such that the lug enters either one of two upwardly opening slots or recesses in the slides 5491-5493 such that the slides are maintained in their indexed positions through the first portion of the operating cycle of the typewriter printing apparatus. It will be apparent that the lug on the arm 5495 serves essentially the same purpose as the bail 4570 and is in effect a continuation thereof.

Referring again to Fig. 9, and associated Fig. 11, the key levers 4555 associated with the return and tabulating key 5471-5474 differ from the conventional key levers 4555 in that they have a downwardly extending rearward portion for supporting a slide 5496 which is secured thereto through suitable pin and slot connections. In the enlarged view of Fig. 11 it will be seen that the slide 5496 has two recesses in the rearward side of the upper slot therein for receiving the upper pin secured to the key lever whereby the slide 5496 tends to lock in either of two vertically displaced positions with respect to the associated key lever. A rearwardly extending ear on the slide 5496 has a hole punched therethrough whereby an operator or maintenance man using a hook may readily move the slide 5496 to its upper or lower position.

When a slide 5496 is in its lower position, a rearwardly extending lug thereon is in position to engage the bail 5290 and move it rearwardly when the key lever is rocked by the associated key 5471, 5472, 5473 or 5474. The bail 5290 is described above in connection with Fig. 34. Rearward movement of the upper portion of the bail 5290 initiates a line spacing operation. Accordingly, a selected one or more of the key levers 5471–5474 may upon depression cause a line spacing operation as well as a return or tabulating movement as determined by the adjusted position of the slide 5496 on the associated key lever.

The keys 5471–5474 acting through the switches 5475–5478 control a series of solenoids 5501, 5502 and 5503 which in turn control the yokes and notched arms 5461–5464 of Fig. 40. The keys 5471–5474 acting through the switches 5475–5478 also control the previously described relay 5384 of Fig. 19, this relay also being actuated by the back space key 5370 of Fig. 4 to initiate return movement through the shaft 5395, the arm 5397, the link 5401, and the return shaft 1349, all of Fig. 40.

The same keys and switches also control a relay 5504 seen in Fig. 37 which serves to move the link 5401 of Fig. 40 out of engagement with the arm 5397 and bring the link 5400 into engagement therewith, such that energization of the solenoid 5384 of Fig. 19 will cause actuation of the tabulating shaft 1348 of Fig. 40 through the link 5400 rather than actuation of the return shaft 1349 through the link 5401. These relays, associated apparatus, and their functions are described immediately below.

As previously indicated Fig. 46 indicates in schematic form the switches or combinations thereof which are operated by depression of the individual keys 5471–5474. It also indicates which of the above mentioned relays are operated as a result of depression of the respective keys 5471–5474. The circuits through which these various relays are actuated by the various switches are shown in Fig. 45.

Figure 45:
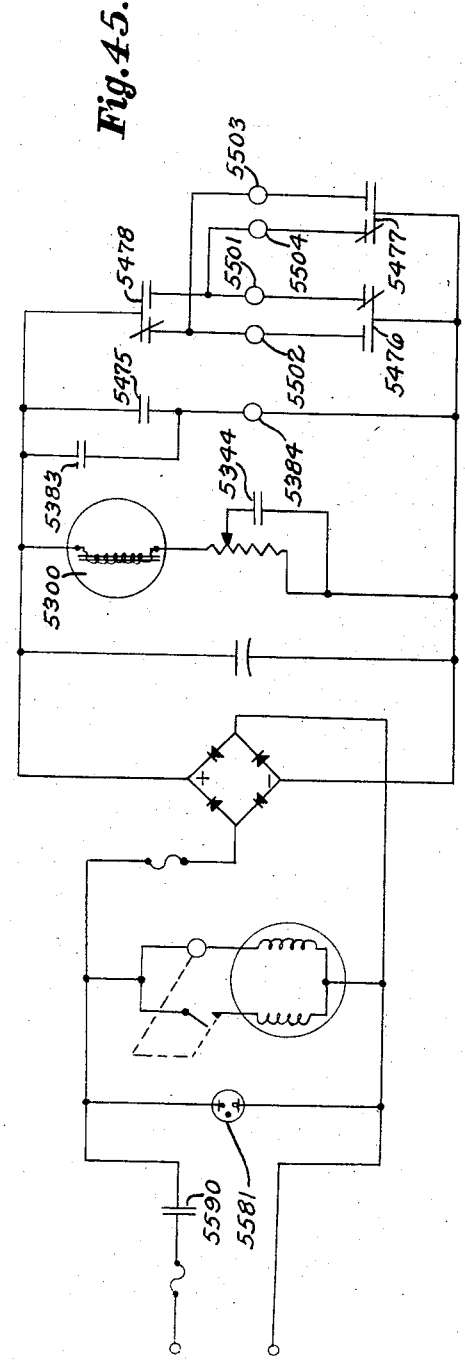
Fig. 45 is a circuit diagram for certain electrically controlled apparatus of the machine.

It will be seen in Fig. 45 that the switch 5475 has a single pair of normally open contacts. However, the switches 5476–5478 all have two pairs of contacts, one pair normally open and one pair normally closed. As previously indicated, depression of any of the keys 5471–5474 actuates the switch 5475 to close its normally open contacts. It will be seen in Fig. 45 that this causes energization of the relay 5384 of Fig. 19. This in turn actuates the arm 5397 of Fig. 40, the link 5401 and the return shaft 1349. Alternatively, and by means subsequently to be described, the arm 5397 may actuate the link 5400 to operate the tabulating shaft 1348. Accordingly, it will be seen that depression of any one of the four keys 5471–5474 causes operation of either the tabulating shaft 1348 or the return shaft 1349. This in turn brings the proper tabulating clutch or return clutch into engagement through the apparatus of Figs. 41 and 42, operates the pawls 5340 and 5341 of Fig. 37 to release the ratchet wheels 5330 and 5331 and energizes the hysteresis clutch 5300 of Fig. 33 all as previously described.

Depression of the key 5471 also actuates the switch 5478 whereby the left-hand contacts of Fig. 45 are opened and the right-hand contacts are closed. This key also actuates the switch 5477 whereby the left-hand contacts thereof are opened. Accordingly, the relay 5501 is energized while the three relays 5502–5504 remain deenergized. This is as indicated in Fig. 46.

When the key 5472 is depressed it actuates the switch 5476 to close its left-hand contacts and open its right-hand contacts. It will therefore be seen that the relay 5502 will be energized while the relays 5501, 5503 and 5504 will remain deenergized, as indicated in Fig. 46.

When the key 5473 is depressed the switch 5477 is actuated to open its left-hand contacts and close its right-hand contacts whereby the solenoid 5503 will be energized while the solenoids 5501, 5502 and 5504 remain deenergized.

When the key 5474 is depressed the switch 5478 is actuated to open its left-hand contacts and close its right-hand contacts with the result that the relays 5501 and 5504 are energized while the relays 5502 and 5503 remain deenergized.

The relays 5501, 5502 and 5503 are mounted on a suitable bracket 5505 as seen in Fig. 40. When the relay 5501 is energized it withdraws a clapper from a position immediately below a lug which extends upwardly and then leftwardly from the yoke 5464. Accordingly, this yoke is permitted to rock in a counterclockwise direction such that its hooked arm may move under the return lever 1602. Energization of the relay 5501 also withdraws its clapper laterally from a position immediately below a leftwardly extending lug on the yoke 5465 such that it may rock counterclockwise and the yoke 5461 may rock clockwise to move its downwardly extending hooked arm under the tabulating key 1567. It will be understood that only one of the levers 1567 or 1602 will be elevated and that only the associated hooked arm 5461 or 5464 will be able to move inwardly under the associated lever.

When the relay 5502 is energized it withdraws a clapper from a position immediately below a lug which extends upwardly and leftwardly from the yoke 5463 such that its downwardly extending hooked arm can move under the return lever 1602. Similarly, the relay 5503 when energized withdraws a clapper from a position immediately under a lug extending upwardly and leftwardly from the yoke 5462 such that its hooked arm may move under the return lever 1602.

It will now be seen that energization of a selected one of the relays 5501–5503 will release a selected one of the yokes 5461–5464 for movement into holding position with respect to the tabulating lever 1567 or the return lever 1602. The selected yoke will remain in holding position until a disc 5465 of Fig. 43 strikes the inner rearward end of that yoke to return it to its normal position, whereupon it releases the tabulating lever 1567 or the return lever 1602 to halt tabulating or return movement of the carriage.

When the key 5474 is depressed, it causes energization not only of the solenoids 5384 and 5501 but also the relay 5504 shown in Fig. 37. It may there be seen that energization of the relay 5504 raises the horizontal arm of a lever 5506 which is pivotally mounted on the back plate 45 and which is biased downwardly, or in a clockwise direction, by a spring 5507. The right-hand end of the lever 5506 may be seen in Fig. 40 and is pivotally connected to a slide 5510 connected through a slot and pin to the back wall 45. The slide 5510 has a recess in its left side which receives the rearward ends of the links 5400 and 5401. Normally the return link 5401 is in position to be operated by the arm 5397 following energization of the relay 5384 of Fig. 19. However, when the relay 5504 of Fig. 37 is energized it raises the lever 5506 and the slide 5510 to move the rearward end of the tabulating link 5400 into operating position with respect to the arm 5397.

Accordingly, it will be seen that when the key 5474 is depressed to actuate the three relays shown in Fig. 46, the relay 5504 causes the tabulating link 5400 of Fig. 40 to be moved into operating position with respect to the arm 5397, the relay 5384 of Figs. 46 and 19 is energized to cause operation of the arm 5397 of Fig. 40 such that the tabulating shaft 1348 is actuated, and the relay 5501 of Fig. 40 releases the yokes 5461 and 5464. Release of the latter yoke is ineffective since the return lever 1602 remains in its downward position, but release of the yoke 5461 permits its hooked arm to move under the tabulating lever 1567. A tabulating operation is therefore initiated and will continue until a disc 5465 depresses the inner rearward end of the yoke 5461.

It is intended that the key 5474 be depressed following a typewriter printing operation and in preparation for the printing of figures by the calculating machine proper. Accordingly, the disc 5465 associated with this function is so positioned with respect to its supporting shaft 5466 that it actuates the yoke 5461 when the carriage is in proper position for the first numerical entry by the calculating machine proper. Since the typewriter printing would normally be ahead or to the left of the numerical entry, movement of the carriage from the typewriter operating position to the first numerical entry position is basically a tabulating movement, and from the point of view of the operator would in fact be a tabulating movement. However, because of the necessary substantial lateral spacing between the typewriter printing hammer and the right-hand printing hammer 605 of the Butler machine, it may be necessary that the carriage be given a return movement to bring it into proper position. For example, if the space between the typewriter printing hammer and the right-hand printing hammer of the calculating machine proper is 4", and the typewriter printing in a particular case were to be 1" short of the proper position for the first numerical entry, it would actually be necessary to give the carriage a 3" return movement rather than a 1" tabulating movement.

Accordingly, depression of the key 5474 may require either a tabulating or a return movement, depending upon the existing position of the carriage. This is accomplished through apparatus seen in Figs. 40 and 47.

A skid 5520 is arranged for substantially vertical movement, the skid being pivotally connected near its upper end to a yoke 5521, subsequently to be described, and being pivotally connected at its lower end to a three-armed lever 5522 which is pivotally mounted on a pin 5523. Also pivotally mounted on the pin 5523 is an arm 5525 whose lower portion is urged by a spring 5526 into contact with a rearwardly extending lug on the lower arm of the three-armed lever 5522.

The skid 5520 is arranged to be contacted by a disc 5465 moving parallel to those discs which engage the inner ends of the rearward arms of the yokes 5461–5464. In fact the skid 5520 and the four last-mentioned yokes constitute five additional "lanes" over and above the twenty-five lanes incorporated in the Butler machine.

When a disc 5465 bears against the upper surface of the skid 5520, it causes the three-armed lever 5520 and the arm 5525 to rock in a clockwise direction such that the lower end of the arm 5526 overlies the upper one of two stepped shoulders on the slide 5510, previously described.

The disc 5465 of Fig. 43 which cooperates with the skid 5520 is so positioned along its supporting shaft 5466 that the skid 5520 is fully depressed when the carriage is in such position that it must be moved in the return direction in order to obtain the desired "tabulation" from a typewriting position to the first number printing position or column. Accordingly, when the operator presses the key 5474 to effect such tabulation, if return movement is actually required, the skid 5520 will be depressed, the arm 5525 will overlie the upper shoulder on the slide 5510 and when the solenoid 5504 of Fig. 37 is energized it will be unable to raise the lever 5506 and the slide 5510 to bring the tabulating link 5400 into operating position with respect to the arm 5397. Accordingly, when the arm 5397 operates in response to energization of the relay 5384 of Fig. 19, it will actuate the return link 5401, and the yoke 5464 will latch the return lever 1602 in its actuated position, while the yoke 5461, also released by the solenoid 5501, will be barred from movement toward actuated position since the tabulating lever 1567 will not have been raised.

Because of the limited length of the skid 5520 several discs 5465 may be desired in order to assure that the skid 5520 will be depressed over a substantial range of carriage positions.

Another operating condition which must be provided for is that in which the carriage, after a typewriter printing operation and subsequent letter space escapement, is already in the proper position for the printing of the first number. In such case neither a tabulating movement nor a return movement is desired.

Figure 47:
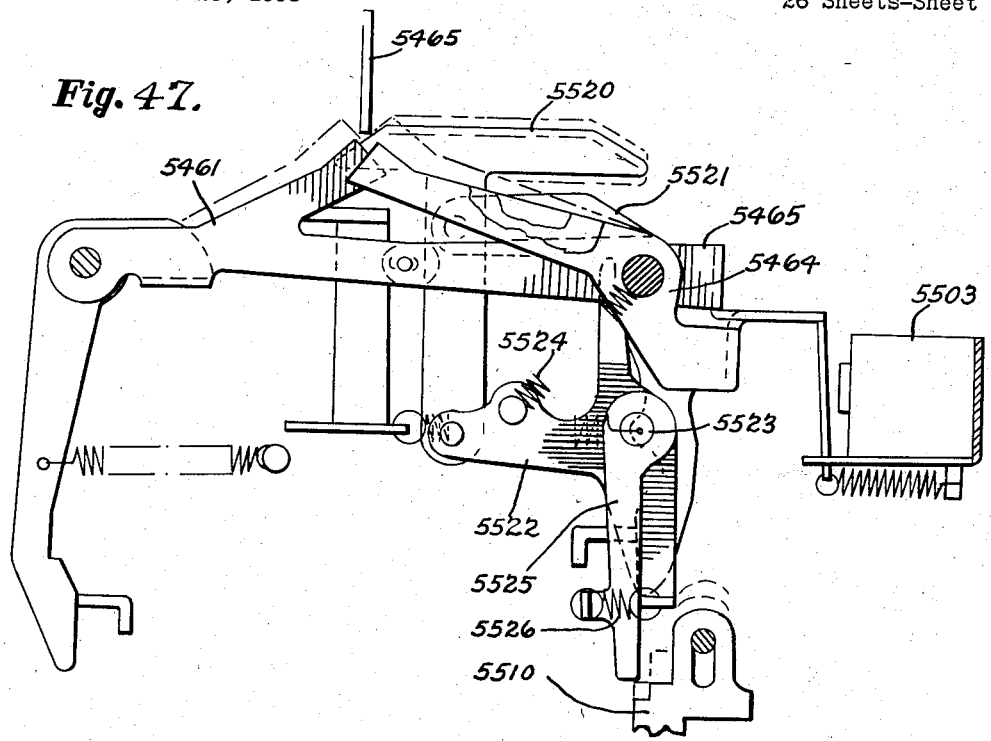
Fig. 47 is a rear elevational view of a portion of the apparatus of Fig. 40.

Under these conditions the disc 5465 which actuates the skid 5520 will overlie the sloping right-hand edge of the skid with the result that the skid is partially depressed, as seen in Fig. 47. This brings the lower end of the arm 5525 into a position in which it overlies the lower of the two stepped shoulders on the slide 5510. Accordingly, when the operator depresses the key 5474 and actuates the solenoid 5504 of Fig. 37, the arm 5506 will be able to raise the slide 5510 to an intermediate position wherein the rightwardly turned lug on the upper end of the arm 5397 of Fig. 40 will pass between the hooked rear ends of the slides 5400 and 5401 with the result that neither of these links and neither the tabulating shaft 1348 nor the return shaft 1349 is actuated by the arm 5397.

Since the tabulating shaft 1348 and return shaft 1349 are not actuated, the arms 5404 and 5434 of Fig. 37 will not move to release the pawls 5340 and 5341. However, release of the pawl 5341 by other, previously described, control means must be prevented. Depression of the key 5474 initiates a typewriter printing machine operation which actuates the cams 4930 and 4931 of Fig. 17 and hence the arm 5345, the link 5348 and the arm 5350 to release the pawl 5341 to permit a tabulating movement, all as previously described. Means must be provided to prevent such releasing of the pawl 5341 under the conditions just described, namely when the key 5474 is depressed and the carriage is already in the proper position.

For this purpose the arm 5506 is provided with an upwardly extending arm which is engageable with a rearwardly extending lug on an arm 5530 pivotally mounted on and in front of the back plate 45, the lug extending through a suitable opening therein. The lever 5530 has an upwardly extending arm cooperable with a slide 5532 whose rearward end is longitudinally slidable within a slot in the rear wall 45. The forward end of the slide 5532 is pivotally connected to the right-hand end of the lever 5350 whereby clockwise movement of the lever 5350 to cam the pawl 5341 out of engagement with the ratchet wheel 5351 drives the slide 5532 rearwardly. Normally this sliding movement is permitted. However, if the are 5506 is actuated by the relay 5504, the upwardly extending arm of the lever 5506 bears against the lug on the lever 5530 such that the upwardly extending arm of the lever 5530 is moved to the right to a position wherein it is engageable with a shoulder on the slide 5532 to prevent rearward movement thereof. This occurs even though the lever 5506 is permitted to move only to its intermediate position, as under the conditions described immediately above wherein no tabulating or return movement of the carriage is desired.

In this case the arm 5350 and the link 5348 will remain stationary even though the lever 5345 of Fig. 17 is caused to rock in a counterclockwise direction. This relative movement between these parts is permitted by the pin and slot connection between the lever 5345 and the link 5348 but is normally prevented by the spring 5349. It should be noted that barring of release of the pawl 5341 by the lever 5350 in no way interferes with with release of the pawls 5340 and 5341 by the tabulating shaft 1348 and the return shaft 1349 through the lever 5406 of Figs. 37 and 39.

It will be noted that the shoulder near the rearward end of the slide 5532 is wide enough that it may strike and be arrested by the lever 5530 when the latter is moved to its intermediate position, under the conditions described above, and may permit full movement of the lever 5530 when the solenoid 5504 moves the slide 5510 to its full raised position.

It has now been explained that upon depression of the key 5474, the carriage may be moved in the tabulating direction, in the return direction, or remain stationary, depending upon which of these three functions is called for in view of the preceding position of the carriage.

Still another condition which must be considered in order to obtain proper operation in that in which a single letter space return movement is required upon depression of the key 5474. Where a substantial movement of the carriage is required in the return direction (or in the tabulating direction) movement is interrupted by engagement of a disc 5465 with the actuated yoke 5461-5464 or the skid 5520 when the carriage is still approximately one-half of a letter space from its desired tabular position because of the carriage momentum which must be dealt with. A single letter space movement in the tabulating direction is readily obtained since the tabulating clutch is normally engaged as previously explained. However, if a single letter space movement in the return direction is called for, difficulty is encountered because the carriage does not develop sufficient momentum during its half letter space movement prior to disengagement of the return clutch, and because the tabulating clutch would normally reengage immediately upon disengagement of the return clutch. The net result is that the return movement through a single letter space is started but the carriage then falls back to its original position under the influence of the reengaged tabuluating clutch unless special provision is made therefor.

Figure 49:
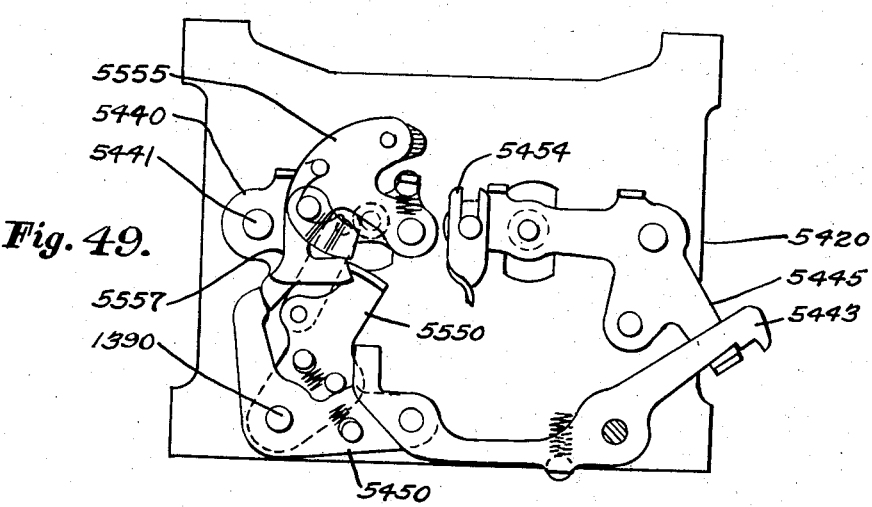
Figure 50:
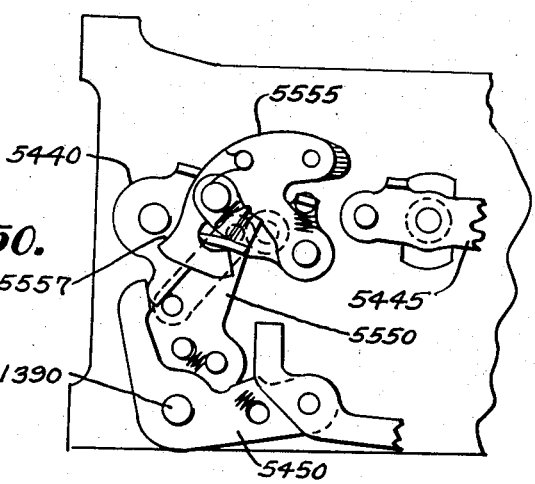

In the illustrated embodiment of the invention this difficulty is overcome by providing time delay apparatus which delays the reengagement of the normally engaged tabulating clutch upon disengagement of the return clutch. This apparatus is best seen in Figs. 48, 49 and 50 and is described immediately below.

Figure 48:
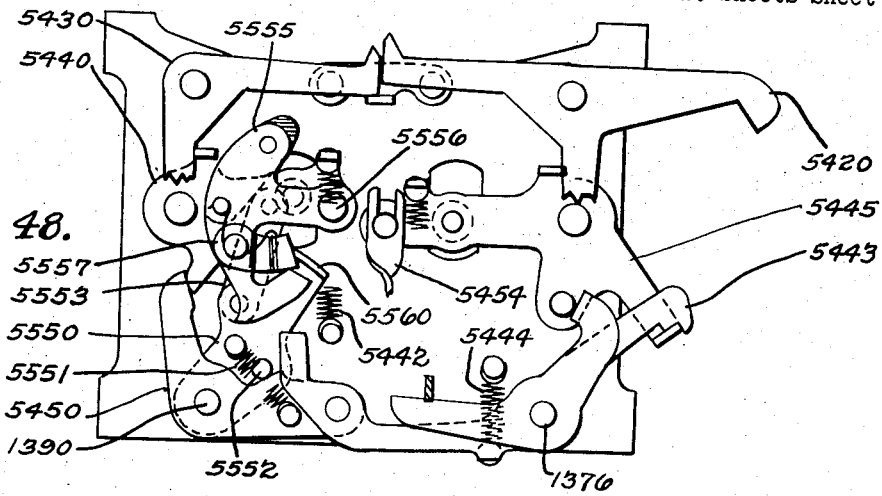
Figs. 48, 49 and 50 are rear elevational views of certain carriage control apparatus in various operating positions thereof.

In Fig 48 the lever 5445 is shown with its clutch-engaging stud 1380 (see Fig. 41) in its lower position in which it causes engagement of the return clutch. The lever 5440 is in its raised position wherein its clutch-engaging stud 1399 (see Fig. 41) is raised and the tabulating clutch is disengaged. The levers 5443 and 5450 are in their corresponding positions.

Also seen in Fig. 48 is an arm 5550 pivotally mounted on the stud 1390. A spring 5551 is connected to the arm 5550 as shown to urge the arm 5550 inwardly, and a pin 5552 secured to the arm 5550 limits such inward movement as it bears against the upper edge of the inward arm of the lever 5450. The arm 5550 is connected to the lever 5440 through a toggle link 5553 which is pivotally connected to both the lever 5440 and the arm 5550. It will be seen that with the various parts in the positions illustrated in Fig. 48, the arm 5550 and the toggle link 5553 prevent downward movement of the arm 5440, the two members being toggled.

A weighted arm 5555 is pivotally mounted on the inner end of the arm 5440 through a pin 5556. This weighted arm carries a pawl 5557 which is pivotally mounted thereon and spring-biased in a counterclockwise direction by a suitable light spring. Counterclockwise movement of the pawl is limited by its engagement with the lower portion of the weighed arm as shown, the pawl being offset forwardly to bring its inner end into alignment with the weighed arm 5555. Downward pivotal movement of the weighted arm 5555 about the pin 5556 is limited by engagement of the pawl 5557 with a lug 5560 on the arm 5550.

When the lever 5445 is moved upwardly by the link 5454, from the position of Fig. 48 to the position of Fig. 49, the lever 5443 is released to permit counterclockwise rocking movement thereof and clockwise movement of the lever 5450. Such movement of these levers is necessarily accompanied, however, by movement of the arm 5550 since the lever 5450 bears against the stud 5552 carried by the arm 5550. As the arm 5550 begins pivotal movement, its lug 5560 forces the pawl 5557, and hence the weighted arm 5555, to move in a counterclockwise direction about the pin 5556, to the position shown in Fig. 49.

It will be seen that in the intermediate position shown in Fig. 49, the return clutch has been released and the tabulating clutch has not yet reengaged, since the toggle formed by the arm 5550 and the toggle link 5553 is still effective in holding the lever 5440 upwardly. At this point the lug 5560 of the arm 5550 has moved off the pawl 5557 and against the lower portion of the weighted arm 5555 as shown in Fig. 49. Still further pivotal movement of the arm 5550 brings the lower portion of the weighted arm 5555 against the stud 5441, after which the lug 5560 rides along the sloping face of the weighted arm 5555, the weighed arm 5555 thereby being cammed downwardly. At this time the toggle formed by the arm 5550 and the toggle link 5553 is broken to a sufficient extent that the weighed arm 5555 and the lever 5440 may move downwardly to the position shown in Fig. 50 whereby the tabulating clutch is reengaged. During the final movement of the weighted arm 5555 and the lever 5440 the upper edge of the lug 5560 engages under the lip of the pawl 5557 such that the lug 5560 may move outwardly below the pawl 5557 and into a recess in the weighted arm 5555.

Since the entire operation just described is effected under the influence of the springs 5442 and 5444, it will be seen that a given amount of weight applied to the weighted arm 5555 will cause some fixed time delay in the reengagement of the tabulating clutch starting from the time of disengagement of the return clutch. Differing weights may be secured to the weighted arm 5555 to effect different time delays as desired.

Control apparatus has now been described which delays reestablishment of the tabulating force, after disengagement of the return drive while the platen carriage is still short of its desired columnar position, to permit the carriage to complete its movement to desired position by inertia, even though the carriage may have moved only a short distance and hence has acquired little inertia. Such apparatus is of particular value in a combined calculating and typewriter printing machine such as that described herein. In such a machine, it may frequently occur that the carriage is required to move a very short distance in a return direction following a typing operation.

It will be apparent that the invention may be varied in its physical embodiment without departing from the spirit of the invention, and it is desired, therefore, that the invention be limited only by the scope of the appended claims.

The invention having thus been described, what is claimed and desired to be secured by Letters Patent is:

1. In a machine having a platen carriage movable in a tabulating direction and in a return direction, and normally energized power means for moving said carriage: apparatus for controlling tabulating and return movement of said carriage and normally applying a tabulating force to said carriage comprising releasable restraining means for preventing tabulating movement of said carriage, a normally engaged tabulating clutch connecting said power means and said carriage to urge said carriage normally in a tabulating direction against said restraining means and thereby to insure precise positioning of said carriage, releasable escapement means normally preventing return movement of said carriage, a normally disengaged return clutch for connecting said power means and said carriage, control means for releasing said escapement means, disengaging said tabulating clutch and engaging said return clutch to effect return movement of said carriage to a desired position, said control means being responsive to the arrival of said carriage at a position short of said desired position to disengage said return clutch, to initiate reengagement of said tabulating clutch and to reactuate said escapement means, and time delay means for delaying reestablishment of said tabulating force to permit said carriage to move by inertia to said desired position.

2. In a machine having a platen carriage movable in a tabulating direction and in a return direction, and normally energized power means for moving said carriage: apparatus for controlling tabulating and return movement of said carriage comprising releasable restraining means for preventing tabulating movement of said carriage, a normally engaged tabulating clutch connecting said power means and said carriage to urge said carriage normally in a tabulating direction against said restraining means and thereby to insure precise positioning of said carriage, releasable escapement means normally preventing return movement of said carriage, a normally disengaged return clutch for connecting said power means and said carriage, control means for releasing said escapement means, disengaging said tabulating clutch and engaging said return clutch to effect return movement of said carriage to a desired position, said control means being responsive to the arrival of said carriage at a position short of said desired position to disengage said return clutch, to initiate reengagement of said tabulating clutch and to reactuate said escapement means, and time delay means for delaying reengagement of said tabulating clutch to permit said carriage to move by inertia to said desired position.

3. In a machine having a platen carriage movable in a tabulating direction and in a return direction, and normally energized power means for moving said carriage: apparatus for controlling tabulating and return movement of said carriage comprising a normally energized hysteresis clutch connected to said power means, releasable restraining means for preventing tabulating movement of said carriage, a normally engaged tabulating clutch connecting said hysteresis clutch and said carriage to urge said carriage normally in a tabulating direction against said restraining means and thereby to insure precise positioning of said carriage, releasable escapement means normally preventing return movement of said carriage, a normally disengaged return clutch for connecting said hysteresis clutch and said carriage, control means for releasing said escapement means, disengaging said tabulating clutch and engaging said return clutch to effect return movement of said carriage to a desired position, said control means being responsive to the arrival of said carriage at a position short of said desired position to disengage said return clutch, to initiate reengagement of said tabulating clutch and to reactuate said escapement means, and time delay means for delaying reengagement of said tabulating clutch to permit said carriage to move by inertia to said desired position.

4. In a machine having a platen carriage movable in a tabulating direction and in a return direction, and normally energized power means for moving said carriage: apparatus for controlling tabulating and return movement of said carriage comprising releasable restraining means for preventing tabulating movement of said carriage, a tabulating clutch, means biasing said tabulating clutch toward normal, engaged position, said tabulating clutch connecting said power means and said carriage to urge said carriage normally in a tabulating direction against said restraining means, thereby to insure precise positioning of said carriage, releasable escapement means normally preventing return movement of said carriage, a normally disengaged return clutch for connecting said power means and said carriage, control means for releasing said escapement means, disengaging said tabulating clutch and engaging said return clutch to effect return movement of said carriage to a desired position, said control means being responsive to the arrival of said carriage at a position short of said desired position to disengage said return clutch, to reactuate said escapement means and to permit reengagement of said tabulating clutch by said biasing means, and time delay means including an inertia element for delaying reengagement of said tabulating clutch by said biasing means to permit said carriage to move by inertia to said desired position.

5. The platen carriage control apparatus of claim 4 in which said biasing means include an arm for actuating said tabulating clutch and a spring biasing said arm in a clutch engaging direction, in which said inertia element is pivotally mounted on said arm, and in which said time delay means include cam means actuated by said arm and said spring for moving said inertia element with respect to said arm, whereby clutch engaging movement of said arm by said spring causes movement of said inertia element first in one direction and then in another direction with respect to said arm.

6. In a machine having a platen carriage movable in a tabulating direction and in a return direction, normally energized power means for moving said carriage, releasable restraining means for preventing tabulating movement of said carriage, a normally engaged tabulating clutch connecting said power means and said carriage to urge said carriage normally in a tabulating direction against said restraining means and thereby to insure precise positioning of said carriage, releasable escapement means normally preventing return movement of said carriage, and a normally disengaged return clutch for connecting said power means and said carriage: control means for releasing said escapement means, disengaging said tabulating clutch and engaging said return clutch to effect return movement of said carriage to a desired position, said control means being responsive to the arrival of said carriage at a position short of said desired position to disengage said return clutch, to initiate reengagement of said tabulating clutch and to reactuate said escapement means, and time delay means for delaying reestablishment of said tabulating force to permit said carriage to move by inertia to said desired position.

No references cited.